(12) United States Patent
Duvaut et al.

(10) Patent No.: US 7,372,899 B2
(45) Date of Patent: May 13, 2008

(54) REDUCED SYMBOL RATE HANDSHAKE SIGNALING IN ADSL SYSTEMS

(75) Inventors: Patrick Duvaut, Tinton Falls, NJ (US); Massimo Sorbara, Freehold, NJ (US); Laurent Francis Alloin, Monmouth Beach, NJ (US); Peter Kleewein, deceased, late of Eatontown, NJ (US); by Wolfgang Kleewein, legal representative, Eatontown, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 749 days.

(21) Appl. No.: 10/626,771

(22) Filed: Jul. 25, 2003

(65) Prior Publication Data

US 2004/0174903 A1     Sep. 9, 2004

Related U.S. Application Data

(60) Provisional application No. 60/398,124, filed on Jul. 25, 2002, provisional application No. 60/399,135, filed on Jul. 30, 2002.

(51) Int. Cl.
*H04B 1/38* (2006.01)
*H04K 1/10* (2006.01)
*H04J 11/00* (2006.01)

(52) U.S. Cl. .................. 375/222; 375/260; 370/210

(58) Field of Classification Search ............... 375/219, 375/222, 260; 370/206, 208, 210; 379/27.01, 379/32.04, 93.08, 160, 406.13, 406.14
See application file for complete search history.

(56) References Cited

U.S. PATENT DOCUMENTS

| 4,069,392 | A  | * | 1/1978 | Goldenberg et al. | 370/295 |
| 6,847,679 | B1 | * | 1/2005 | Kim | 375/222 |
| 6,999,548 | B2 | * | 2/2006 | Simmons | 375/375 |
| 7,050,489 | B1 | * | 5/2006 | Sjoberg et al. | 375/222 |
| 7,050,782 | B1 | * | 5/2006 | Adas et al. | 455/343.1 |
| 2002/0072386 | A1 | * | 6/2002 | Ginesi et al. | 455/522 |
| 2003/0064737 | A1 | * | 4/2003 | Eriksson et al. | 455/501 |

OTHER PUBLICATIONS

International Search Report dated Dec. 12, 2003 for Application No. PCT/US03/23105.

* cited by examiner

*Primary Examiner*—Young T. Tse
(74) *Attorney, Agent, or Firm*—Thomas, Kayden, Horstemeyer & Risley LLP

(57) ABSTRACT

In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection is provided by the present invention. The method comprises transmitting handshake signaling from the HSTU-C to the HSTU-R via a first subset of carrier sets at a first symbol rate and transmitting handshake signaling from the HSTU-C to the HSTU-R via a second subset of carrier sets at a second symbol rate, the second symbol rate being less than the first symbol rate.

19 Claims, 26 Drawing Sheets

DBMOL Downstream Spectral Mask

AOL Downstream Spectral Mask

TABLE 11: Spectral compatibility of A.X24 with first group systems in G.992.1 mode

| loop (km) | TCM-ISDN | | A.992.1 U/S | | A.992.1 D/S | | C DBM 992.1 U/S | | C DBM 992.1 D/S | | C FBM 992.1 U/S | | C FBM 992.1 D/S | |
|---|---|---|---|---|---|---|---|---|---|---|---|---|---|---|
| | Ref table | | Ref table | | Ref table | | Ref table | | Ref table | | Ref table | | Ref table | |
| 0.5  | 144 | 144 | 832 | 832 | 5632 | 6752 | 832 | 832 | 6048 | 6752 | 288 | 288 | 2496 | 2496 |
| 0.75 | 144 | 144 | 832 | 832 | 4032 | 6560 | 832 | 832 | 4960 | 6560 | 288 | 288 | 2432 | 2432 |
| 1    | 144 | 144 | 800 | 832 | 2400 | 6144 | 800 | 832 | 3808 | 6144 | 288 | 288 | 2272 | 2272 |
| 1.25 | 144 | 144 | 768 | 832 | 1504 | 5952 | 768 | 832 | 3168 | 5952 | 288 | 288 | 2208 | 2208 |
| 1.5  | 144 | 144 | 704 | 800 | 960  | 5856 | 736 | 800 | 2784 | 5856 | 288 | 288 | 2144 | 2144 |
| 1.75 | 144 | 144 | 640 | 800 | 608  | 5536 | 704 | 800 | 2432 | 5536 | 288 | 288 | 2048 | 2048 |
| 2    | 144 | 144 | 576 | 768 | 384  | 5312 | 672 | 768 | 2208 | 5312 | 288 | 288 | 1952 | 1952 |
| 2.25 | 144 | 144 | 512 | 736 | 192  | 4896 | 640 | 736 | 1984 | 4896 | 288 | 256 | 1792 | 1792 |
| 2.5  | 144 | 144 | 448 | 704 | 96   | 4192 | 576 | 704 | 1664 | 4192 | 288 | 256 | 1536 | 1536 |
| 2.75 | 144 | 144 | 352 | 672 | 32   | 3424 | 544 | 672 | 1344 | 3424 | 256 | 224 | 1248 | 1248 |
| 3    | 144 | 144 | 288 | 608 | 0    | 2784 | 480 | 608 | 1120 | 2784 | 256 | 224 | 1024 | 1024 |
| 3.25 | 0   | 0   | 256 | 576 | 0    | 2272 | 448 | 576 | 928  | 2272 | 256 | 192 | 832  | 832  |
| 3.5  | 0   | 0   | 192 | 512 | 0    | 1792 | 416 | 512 | 800  | 1792 | 224 | 192 | 640  | 640  |
| 3.75 | 0   | 0   | 160 | 448 | 0    | 1408 | 384 | 448 | 672  | 1408 | 224 | 160 | 512  | 512  |
| 4    | 0   | 0   | 128 | 416 | 0    | 1024 | 352 | 416 | 512  | 1024 | 224 | 160 | 384  | 384  |
| 4.25 | 0   | 0   | 96  | 384 | 0    | 736  | 320 | 384 | 416  | 736  | 192 | 128 | 256  | 256  |
| 4.5  | 0   | 0   | 64  | 352 | 0    | 480  | 288 | 352 | 320  | 480  | 192 | 128 | 160  | 160  |
| 4.75 | 0   | 0   | 64  | 320 | 0    | 288  | 288 | 320 | 256  | 288  | 192 | 96  | 96   | 96   |
| 5    | 0   | 0   | 32  | 288 | 0    | 128  | 288 | 288 | 128  | 128  | 192 | 96  | 32   | 32   |

Fig. 5

TABLE 12: Spectral compatibility of A.X$_{24}$ with first group systems in G992.2 mode

| loop (km) | A.992.2 U/S Ref table | A.992.2 U/S | A.992.2 D/S Ref table | A.992.2 D/S | C DBM 992.2 U/S Ref table | C DBM 992.2 U/S | C DBM 992.2 D/S Ref table | C DBM 992.2 D/S | C FBM 992.2 U/S Ref table | C FBM 992.2 U/S | C FBM 992.2 D/S Ref table | C FBM 992.2 D/S |
|---|---|---|---|---|---|---|---|---|---|---|---|---|
| 0.5 | 832 | 832 | 2848 | 3008 | 832 | 832 | 2912 | 3008 | 288 | 288 | 1088 | 1088 |
| 0.75 | 832 | 832 | 2464 | 3008 | 832 | 832 | 2656 | 3008 | 288 | 288 | 1088 | 1088 |
| 1 | 800 | 832 | 2016 | 3008 | 800 | 832 | 2368 | 3008 | 288 | 288 | 1088 | 1088 |
| 1.25 | 768 | 832 | 1504 | 2944 | 768 | 832 | 2048 | 2944 | 288 | 288 | 1088 | 1088 |
| 1.5 | 704 | 800 | 960 | 2912 | 736 | 800 | 1696 | 2912 | 288 | 288 | 1088 | 1088 |
| 1.75 | 640 | 800 | 608 | 2848 | 704 | 800 | 1504 | 2848 | 288 | 288 | 1056 | 1056 |
| 2 | 576 | 768 | 288 | 2816 | 672 | 768 | 1280 | 2816 | 288 | 288 | 1056 | 1056 |
| 2.25 | 512 | 736 | 128 | 2752 | 640 | 736 | 1184 | 2752 | 288 | 288 | 1024 | 1024 |
| 2.5 | 448 | 704 | 64 | 2656 | 576 | 704 | 1120 | 2656 | 288 | 288 | 1024 | 1024 |
| 2.75 | 352 | 672 | 32 | 2560 | 544 | 672 | 1024 | 2560 | 256 | 256 | 960 | 960 |
| 3 | 288 | 608 | 0 | 2432 | 480 | 608 | 992 | 2432 | 256 | 256 | 928 | 928 |
| 3.25 | 256 | 576 | 0 | 2240 | 448 | 576 | 928 | 2240 | 256 | 224 | 896 | 896 |
| 3.5 | 192 | 512 | 0 | 1984 | 416 | 512 | 832 | 1984 | 224 | 224 | 832 | 832 |
| 3.75 | 160 | 448 | 0 | 1632 | 416 | 448 | 736 | 1632 | 224 | 192 | 736 | 736 |
| 4 | 128 | 416 | 0 | 1248 | 384 | 416 | 608 | 1248 | 192 | 192 | 576 | 576 |
| 4.25 | 96 | 384 | 0 | 896 | 352 | 384 | 480 | 896 | 192 | 160 | 448 | 448 |
| 4.5 | 64 | 352 | 0 | 608 | 352 | 352 | 384 | 608 | 160 | 128 | 320 | 320 |
| 4.75 | 64 | 320 | 0 | 352 | 352 | 320 | 320 | 352 | 128 | 128 | 224 | 224 |
| 5 | 32 | 288 | 0 | 192 | 320 | 288 | 192 | 192 | 192 | 96 | 128 | 64 |

Fig. 6

TABLE 12: Spectral compatibility of $A.X_1$ with first group systems in G.992.1 mode

| loop (km) | TCM-ISDN Ref.table | A.992.1 U/S Ref.table | A.992.1 U/S | A.992.1 D/S Ref.table | A.992.1 D/S | C-DBM.992.1 U/S Ref.table | C-DBM.992.1 U/S | C-DBM.992.1 D/S Ref.table | C-DBM.992.1 D/S | C-FBM.992.1 U/S Ref.table | C-FBM.992.1 U/S | C-FBM.992.1 D/S Ref.table | C-FBM.992.1 D/S |
|---|---|---|---|---|---|---|---|---|---|---|---|---|---|
| 0.5 | 144 | 832 | 832 | 5632 | 7104 | 832 | 832 | 6048 | 7104 | 288 | 288 | 2496 | 2624 |
| 0.75 | 144 | 832 | 832 | 4032 | 7104 | 832 | 832 | 4960 | 7104 | 288 | 288 | 2432 | 2624 |
| 1 | 144 | 800 | 832 | 2400 | 7104 | 800 | 832 | 3608 | 7104 | 288 | 288 | 2272 | 2624 |
| 1.25 | 144 | 768 | 832 | 1504 | 7104 | 768 | 832 | 3168 | 7104 | 288 | 288 | 2208 | 2624 |
| 1.5 | 144 | 704 | 832 | 960 | 7104 | 736 | 832 | 2784 | 7104 | 288 | 288 | 2144 | 2624 |
| 1.75 | 144 | 640 | 832 | 608 | 7104 | 704 | 832 | 2432 | 7104 | 288 | 288 | 2048 | 2624 |
| 2 | 144 | 576 | 832 | 384 | 6752 | 672 | 832 | 2208 | 6752 | 288 | 288 | 1952 | 2496 |
| 2.25 | 144 | 512 | 800 | 192 | 6112 | 640 | 800 | 1984 | 6112 | 288 | 288 | 1792 | 2240 |
| 2.5 | 144 | 448 | 800 | 96 | 5184 | 576 | 800 | 1664 | 5184 | 288 | 288 | 1536 | 1920 |
| 2.75 | 144 | 352 | 768 | 32 | 4224 | 544 | 768 | 1344 | 4224 | 288 | 288 | 1248 | 1536 |
| 3 | 0 | 288 | 736 | 0 | 3456 | 480 | 736 | 1120 | 3456 | 256 | 288 | 1024 | 1280 |
| 3.25 | 0 | 256 | 704 | 0 | 2816 | 448 | 704 | 928 | 2816 | 256 | 256 | 832 | 1024 |
| 3.5 | 0 | 192 | 672 | 0 | 2240 | 416 | 672 | 800 | 2240 | 256 | 256 | 640 | 832 |
| 3.75 | 0 | 160 | 608 | 0 | 1760 | 416 | 608 | 672 | 1760 | 224 | 224 | 512 | 640 |
| 4 | 0 | 128 | 544 | 0 | 1344 | 384 | 544 | 512 | 1344 | 224 | 224 | 384 | 480 |
| 4.25 | 0 | 96 | 512 | 0 | 928 | 352 | 512 | 416 | 928 | 192 | 192 | 256 | 352 |
| 4.5 | 0 | 64 | 448 | 0 | 640 | 352 | 448 | 320 | 640 | 160 | 192 | 160 | 224 |
| 4.75 | 0 | 64 | 416 | 0 | 384 | 352 | 416 | 256 | 384 | 160 | 192 | 96 | 128 |
| 5 | 0 | 32 | 384 | 0 | 192 | 320 | 384 | 128 | 192 | 128 | 128 | 32 | 64 |

Fig. 7

ADSL+ PSD for CO Deployment (Overlapped Mode)

Performance for overlapped/non overlapped 2.208 MHz ADSL extended spectrum system ADSL+ PSD for CO Deployment ADSL+ Over POTS PSD for CO Deployment (Non-Overlapped Mode)

ADSL+ Over POTS PSD for CO Deployment (Non-Overlapped Mode)

ADSL+ over POTS PSD for Cabinet Deployment (Non-Overlapped Mode)

ADSL+ over ISDN PSD for CO Deployment

ADSL+ over ISDN PSD for Cabinet Deployment

PILOT 64 SNR vs distance, 24 TCM-ISDN

Testing loops for PILOT 64 and TTR 48 Limitations in FDM Mode

REDUCED SYMBOL RATE HANDSHAKE SIGNALING IN ADSL SYSTEMS

CROSS REFERENCE TO RELATED APPLICATIONS

The present invention claims benefit of U.S. Provisional Application No. 60/398,124, filed Jul. 25, 2002, and U.S. Provisional Application No. 60/399,135, filed Jul. 30, 2002, the entireties of which are incorporated by reference herein.

FIELD OF THE PRESENT INVENTION

The present invention relates generally to asynchronous digital subscriber line (ADSL) systems, and in particular, to systems and methods for improving transmission performance in such systems.

BACKGROUND OF THE PRESENT INVENTION

With the increasing popularity of the Internet and other content-heavy electronic communication systems, there has been a substantial need for reliable and affordable high bandwidth mediums for facilitating data transmissions between service providers and their customers. In relation to the requirement that such mediums be affordable to consumers, it was determined that the most cost-effective manner for providing service to customers was by using infrastructure already present in most locations. Accordingly, over recent years, the two such mediums most widely meeting these requirements include the cable television (CATV) and the conventional copper wire telephone systems such as a "plain old telephone service" (POTS) or an integrated services digital network (ISDN).

Relating specifically to the adaptation of POTS telephone lines and IDSN lines to carry data at high-bandwidth or 'broadband' data rates, a number of Digital Subscriber Line (DSL) standards and protocols have been proposed. DSL essentially operates by formatting signals using various time domain equalization techniques to send packets over copper wire at high data rates. A substandard of conventional DSL is known as Asymmetric Digital Subscriber Line (ADSL) and is considered advantageous for its ability to provide very high data rates in the downstream (i.e., from service provider to the user) direction by sacrificing speed in the upstream direction. Consequently, end user costs are minimized by providing higher speeds in the most commonly used direction. Further, ADSL provides a system that applies signals over a single twisted-wire pair that simultaneously supports conventional POTS or ISDN service as well as high-speed duplex (simultaneous two-way) digital data services.

Two of the proposed standards for ADSL are set forth by the International Telecommunications Union, Telecommunication Standardization Section (ITU-T). A first conventional ADSL standard is described in ITU-T Recommendation G.992.1—"Asymmetric Digital Subscriber Line (ADSL) Transceivers", the body of which is incorporated herein by reference. A second, more recently proposed standard is the G.992.2 or 'G.lite' standard, further described in ITU-T Recommendation G.992.2—"Splitterless Asymmetric Digital Subscriber Line (ADSL) Transceivers", also bodily incorporated by reference herein. The G.lite standard is a variant of the G.992.1 standard, with modifications directed primarily to work in a splitterless environment (i.e., without a splitter at the remote user end to separate the voice traffic from the digital data traffic).

Prior to any transmission of actual data between the central office ADSL transceiver unit (ATU-C) and the remote ADSL transceiver unit (ATU-R), the two entities must first undergo an initialization procedure designed to familiarize the two entities with each other, identify the bandwidth capabilities for the current session, and further facilitate the establishment of a valid connection. Pursuant to ADSL standards provided by the International Telecommunication Union—Telecommunication Standardization Sector (ITU-T), these initialization procedures comprise the following: 1) a handshake procedure; 2) a transceiver training session; 3) a channel analysis session; 4) an exchange session; and finally 5) an actual data transmission session commonly referred to as "showtime."

Specifics of the handshake procedure are set forth in ITU-T Recommendation G.994.1—"Handshake Procedures for Digital Subscriber Line (DSL) Transceivers", the body of which is incorporated by reference herein. The handshake procedure is designed to enable peer components to initiate a communications session between each other and generally includes the exchange of several specific types of messages having predetermined formats. Examples of such messages include the following: capabilities list and capabilities list request messages; mode select and mode request messages; various acknowledge and negative acknowledge messages, etc. Each of the above messages is generally formulated by a protocol processor responsible for ensuring compliance with the requirements for protocol communication.

Because the various ITU-T recommendations identified above are designed to provide guidance to ADSL developers in various geographic locations, different circumstance may exists which impact the method with which the general recommendations are implemented. Accordingly, Annexes to the recommendations have been created that specifically itemize the effect of particular scenarios upon the adoption of the general recommendations. For example, due to noise and other interference generated by these ISDN systems, as well as the potential adverse impact ADSL deployment may have on these existing systems, relatively severe performance limitations have been placed upon ADSL implementation in these regions. Of particular interest in the present application is the effect of a large network of conventional TCM-ISDN (Time Compression Multiplex ISDN) telephone lines on ADSL development. Annex C of the G.992.1 Recommendation directly relates to such circumstances.

As is understood in the art, the data stream of TCM-ISDN is transmitted in one or more TCM-ISDN Timing Reference (TTR) periods. In such systems, the CO transmits data streams in the first half of the TTR period and the CPE (customer premise equipment) transmits data streams in the second half of the TTR period. Accordingly, for the corresponding ADSL system, the ATU-C typically receives NEXT (near-end cross talk) noise from the ISDN in the first half of the TTR period and FEXT (far-end cross talk) noise from the ISDN in the second half of the TTR period. Conversely, ATU-R typically receives FEXT noise from the ISDN in the first half of the TTR period and NEXT noise from the ISDN in the second half of the TTR period. In order to compensate for the effects of the NEXT and FEXT noise, the ATU-C often estimates the $FEXT_R$ (FEXT noise at receiver) and $NEXT_R$ (NEXT noise at receiver) duration at ATU-R, and the ATU-R estimates $FEXT_C$ (FEXT noise at CO) and $NEXT_C$ (NEXT noise at CO) duration at ATU-C, considering propagation delay of the subscriber line. Thereafter, the ATU-C transmits symbols by synchronizing with the $TTR_C$ and the ATU-R transmits symbols by synchronizing with the $TTR_R$ which is generated based upon the received TTR$_C$. FIG. 1 illustrates a conventional timing model for ISDN/ADSL systems.

Due the differing effects of NEXT and FEXT on ADSL transmissions, Annex C of the G.992.1 Recommendation suggests implementing a Dual Bitmapped (DBM) process for framing data prior to transmission using a discrete multitone (DMT) transmission process. In this manner, symbols are created differently depending upon whether they are transmitted during a NEXT period or a FEXT period, with the ATU-C transmitting FEXT$_R$ symbols using a Bitmap-F$_R$ (in FEXT$_R$ duration), and transmitting NEXT$_R$ symbols using Bitmap-N$_R$ (in NEXTR duration) according to the result of initialization. Similarly, the ATU-R transmits FEXT$_C$ symbols using Bitmap-F$_C$ (in FEXT$_C$ duration), and transmits NEXT$_C$ symbols using Bitmap-N$_C$ (in NEXT$_C$ duration) in the same manner. In accordance with Annex C, the FEXT$_{R/C}$ transmission includes 128 symbols, while the NEXT$_{R/C}$ transmission includes 217 symbols, resulting in a combined hyperframe of 345 DMT symbols.

As a means of controlling symbol transmission, Annex C also affords the ATU-C the capability to disable Bitmap-N$_C$ and Bitmap-N$_R$, thereby disabling the transmission of anything but a pilot tone during the NEXT TTR periods. This mode of transmission is conventionally referred to as FBM (FEXT Bitmapped) transmission. The FBM mode uses the DBM technique to transmit data only during FEXT intervals. Accordingly, the ATU-C transmits only the pilot tone during the NEXT$_R$ symbol. Consequently, the ATU-R disables Bitmap-N$_C$ and does not transmit any signal during the NEXT$_C$ symbol. The ATU-C selects the DBM or FBM mode during G.994.1 handshaking using a "DBM" bit.

Another scenario of interest in the present application is that discussed in Annex A to the G.992.1 Recommendation, requirements for ADSL systems operating in a frequency band above the POTS frequency band. As is understood, in order to avoid interference with existing POTS systems, shifts in the ADSL signal Power Spectral Density (PSD) must be made in particular frequency ranges.

Although the recommendations present in the various specification identified above have been implemented to avoid conflict and interference with existing systems, there remains a need in the art of ADSL systems for methods and systems for improving both performance and range of such systems without adversely effecting existing systems, thereby improving upon the recommendations described forth above.

Additionally, there is a need in the art of ADSL systems, for improved systems that maintain compatibility with existing ADSL systems and equipment and which may be implemented with minimal changes to both equipment specification and technical recommendations.

SUMMARY OF THE PRESENT INVENTION

The present invention overcomes the problems noted above, and realizes additional advantages, by providing for methods and systems for improving ADSL performance and reach within the context of Annex C and/or Annex A of the existing G.992.1 Recommendation, without requiring the addition of a new Annex or significant complications to existing equipment or recommendations. These modes of operation are heretofore generalized as C.X modes of operation. The methods and systems disclosed herein may further be beneficially implemented to improve the performance and reach in other contexts by those skilled in the art using the guidelines provided herein.

In a first embodiment, an overlap frequency spectrum is implemented with transmissions made in accordance with Annex C to the G.992.1 Recommendation. In particular, systems implementing both overlap and non-overlap modes are fully supported by the existing G.992.1 Recommendation. Further, the partial overlap spectra of Annex C (FBMsOL, DBMsOL) for providing reduced NEXT interference are defined as a subset of the full-overlap spectrum defined in Annex A of G.992.1. Accordingly, there is no need to define new annexes for operation in overlapped modes for DBM as well as for FBM as it is well supported by the current Annex C definition. In addition, the use of the existing code points for implementing the proposed overlap modes does not violate the operation of the current systems and also enables interoperability with the current frequency division multiplexing (FDM) systems thereby ensuring backward compatibility with current FDM systems.

In accordance with one embodiment of the present invention, a power spectral density (PSD) mask for spectral shaping of a dual bit map (DBM) mode downstream transmission is provided. The PSD mask is represented by the equation:

$$PSD_{DBMsOL} = K_{ADSL\_OL} \times \frac{C}{f_0} \times \frac{\left[\sin\left(\pi\frac{f}{f_0}\right)\right]^2}{\left(\pi\frac{f}{f_0}\right)^2} \times \frac{1}{1+\left(\frac{f}{f_{LP3dB}}\right)^{12}} \times \frac{1}{1+\left(\frac{f_{HP3dB}}{f}\right)^6}, 0 < f < \infty$$

where $PSD_{DBMsOL}$ represents the PSD mask, $K_{ADSL\_OL}$ represents a constant value, C represents a constant value, f represents a frequency of the downstream transmission, $f_0$ represents a constant value, $f_{LP3dB}$ represents a 3 decibel (dB) low pass frequency and $f_{HP3dB}$ represents a 3 dB high pass frequency. $K_{ADSL\_OL}$ preferably has a value between 0.0900 watts and 0.1200 watts and more preferably has a value of 0.1104 watts. The constant $f_0$ preferably has a value between 2.100 megahertz and 2.300 megahertz and more preferably has a value of 2.208 megahertz. The constant $f_{LP3dB}$ has a value substantially equal to $$\frac{f_0}{2}.$$

The constant $f_{HP3dB}$ has preferably has a value between 100 kilohertz and 150 kilohertz and more preferably has a value of 130 kilohertz. The constant C preferably has a value between 0.1 and 10 and more preferably has a value of 2.

In accordance with another embodiment of the present invention, a power spectral density (PSD) mask for spectral shaping of a far end cross talk (FEXT) bit map (FBM) mode downstream transmission is provided. The PSD mask is represented by the equation:

$$PSD_{FBMsOL} = K_{ADSL\_OL} \times \frac{C}{f_0} \times \frac{\left[\sin\left(\pi\frac{f}{f_0}\right)\right]^2}{\left(\pi\frac{f}{f_0}\right)^2} \times$$

$$\frac{1}{1+\left(\frac{f}{f_{LP3dB}}\right)^{12}} \times \frac{1}{1+\left(\frac{f_{HP3dB}}{f}\right)^{8}}, 0 < f < \infty$$

where $PSD_{FBMsOL}$ represents the PSD mask, $K_{ADSL\_OL}$ represents a constant value, C represents a constant value, f represents a frequency of the downstream transmission, $f_0$ represents a constant value, $f_{LP3dB}$ represents a 3 decibel (dB) low pass frequency and $f_{HP3dB}$ represents a 3 dB high pass frequency. where $PSD_{DBMsOL}$ represents the PSD mask, $K_{ADSL\_OL}$ represents a constant value, C represents a constant value, f represents a frequency of the downstream transmission, $f_0$ represents a constant value, $f_{LP3dB}$ represents a 3 decibel (dB) low pass frequency and $f_{HP3dB}$ represents a 3 dB high pass frequency. $K_{ADSL\_OL}$ preferably has a value between 0.0900 watts and 0.1200 watts and more preferably has a value of 0.1104 watts. The constant $f_0$ preferably has a value between 2.100 megahertz and 2.300 megahertz and more preferably has a value of 2.208 megahertz. The constant $f_{LP3dB}$ has a value substantially equal to $$\frac{f_0}{2}.$$

The constant $f_{HP3dB}$ has preferably has a value between 27 kilohertz and 40 kilohertz and more preferably has a value of 32 kilohertz. The constant C preferably has a value between 0.1 and 10 and more preferably has a value of 2.

In an asynchronous digital subscriber line (ADSL) system comprising a central office ADSL Terminating Unit (ATU-C) in bi-directional overlap spectrum discrete multitone (DMT) communication with a remote ADSL Terminating Unit (ATU-R), a method is provided in accordance with yet another embodiment of the present invention. The method comprises the step of transmitting a first handshake tone at either a first DMT tone or a second DMT tone based at least in part on a distance between the ATU-C and ATU-R. In one embodiment, the first handshake tone is transmitted at the first DMT tone when the distance between the ATU-C and ATU-R is less than 6.2 kilometers and the first handshake tone is transmitted at the second DMT tone when the distance between the ATU-C and ATU-R is greater than or equal to 6.2 kilometers. In one embodiment, the first handshake tone is a Pilot tone, the first DMT tone is tone 64 and the second DMT tone is tone 32. In another embodiment, the first handshake tone is a TCM-ISDN Timing Reference (TTR) tone, the first DMT tone is tone 48 and the second DMT tone is tone 24. The ATU-C and the ATU-R preferably are in bidirectional communication via a TCM-ISDN network.

The method further may comprise the step of transmitting a second handshake tone at either a third DMT tone or a fourth DMT tone based at least in part on the distance between the ATU-C and ATU-R. The second handshake tone may be transmitted at the third DMT tone when the distance between the ATU-C and ATU-R may be less than 6.2 kilometers and the second handshake tone is transmitted at the fourth DMT tone when the distance between the ATU-C and ATU-R is greater than or equal to 6.2 kilometers. In one embodiment, the first handshake tone is a Pilot tone and the second handshake tone is a TCM-ISDN Timing Reference (TTR) tone, the first DMT tone is tone 64, the second DMT tone is tone 32, the third DMT tone is tone 48 and the fourth DMT tone is tone 24.

In accordance with yet another embodiment of the present invention, an asynchronous digital subscriber line (ADSL) system is provided. The ADSL system comprises a central office ADSL Terminating Unit (ATU-C) and a remote ADSL Terminating Unit (ATU-R) in bi-directional overlap spectrum discrete multitone (DMT) communication with the ATU-C. The ATU-C is adapted to transmit a first handshake tone at either a first DMT tone or a second DMT tone based at least in part on a distance between the ATU-C and ATU-R and the ATU-R is adapted to receive the first handshake tone at either the first DMT tone or the second DMT tone. In one embodiment, the first handshake tone is transmitted at the first DMT tone when the distance between the ATU-C and ATU-R is less than 6.2 kilometers and the first handshake tone is transmitted at the second DMT tone when the distance between the ATU-C and ATU-R is greater than or equal to 6.2 kilometers. In one embodiment, the first handshake tone is a Pilot tone, the first DMT tone is tone 64 and the second DMT tone is tone 32. In another embodiment, the first handshake tone is a TCM-ISDN Timing Reference (TTR) tone, the first DMT tone is tone 48 and the second DMT tone is tone 24. The ATU-C and the ATU-R preferably are in bidirectional communication via a TCM-ISDN network.

The ATU-C further may be adapted to transmit a second handshake tone at either a third DMT tone or a fourth DMT tone based at least in part on the distance between the ATU-C and ATU-R. The second handshake tone may be transmitted at the third DMT tone when the distance between the ATU-C and ATU-R may be less than 6.2 kilometers and the second handshake tone is transmitted at the fourth DMT tone when the distance between the ATU-C and ATU-R is greater than or equal to 6.2 kilometers. In one embodiment, the first handshake tone is a Pilot tone and the second handshake tone is a TCM-ISDN Timing Reference (TTR) tone, the first DMT tone is tone 64, the second DMT tone is tone 32, the third DMT tone is tone 48 and the fourth DMT tone is tone 24.

Further, the ATU-C may be adapted to transmit the first handshake tone at the first DMT tone when the distance between the ATU-C and ATU-R is less than 6.2 kilometers and transmit the first handshake tone at the second DMT tone when the distance between the ATU-C and ATU-R is greater than or equal to 6.2 kilometers.

In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection is provided in accordance with an additional embodiment. The method comprises transmitting handshake signaling from the HSTU-C to the HSTU-R via a first subset of carrier sets at a first symbol rate and transmitting handshake signaling from the HSTU-C to the HSTU-R via a second subset of carrier sets at a second symbol rate, the second symbol rate being less than the first symbol rate. The first symbol rate preferably is 539.0625 symbols per second and the second symbol rate preferably is 269.53125 symbols per second. In one embodiment, the handshake signaling is transmitted via the second subset of carrier sets at the second symbol rate after a handshake attempt between the HSTU-C and the HSTU-R performed at the first symbol rate for both the first and second carrier sets has failed. The second subset of carrier sets includes carrier sets with noise greater than noise present in the first subset of carrier sets, where the noise includes near end cross talk. The second subset of carrier sets preferably includes carrier set C43 and the second subset of carrier sets preferably includes carrier set A43. The HSTU-C and HSTU-R preferably are in bidirectional communication via a TCM-ISDN network.

The method further may comprise the step of detecting, at the HSTU-R, a number of phase changes in a given time window of the handshake signaling transmitted by the HSTU-C via the second subset of carrier sets to identify the second symbol rate. The method also may comprise the step of receiving, at the HSTU-C, at least one handshake symbol from the HSTU-R at the identified handshake symbol transmission rate. The step of detecting the number of phase changes in a given time window of the handshake signaling includes separating the handshake signaling transmitted by the HSTU-C into a first set of sub-symbols and a second set of sub-symbols for a given time window, the second set of sub-symbols following the first set of sub-symbols, performing a fast fourier transform on each of the first set of sub-symbols, performing a fast fourier transform on each of the second set of sub-symbols, summing a result of the fast fourier transforms performed on the first set of sub-symbols, summing a result of the fast fourier transforms performed on the second set of sub-symbols, and multiplying the summed result from the first set of sub-symbols with the summed result of the second set of sub-symbols to determine the number of phase changes in the handshake signaling within the time window. The number of phase changes detected within the time window may be proportional to the identified second symbol rate or the second symbol rate may be identified by the HSTU-R when the number of phase changes is at or above a minimum number of phase changes associated with second symbol rate.

In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection robustness is provided. The method comprises transmitting handshake signaling via a first subset of carrier sets of a DMT transmission bandwidth between the HSTU-C and HSTU-R at a first symbol rate, determining a presence of near end cross talk (NEXT) in a second subset of carrier sets of the DMT transmission bandwidth, and transmitting the at least one handshake symbol via the second subset of carrier sets at a second symbol rate so that at least one sub-symbol of the at least one handshake symbol transmitted over the second subset of carrier sets is substantially unaffected by near end cross talk. The first symbol rate preferably is 539.0625 symbols per second and the second symbol rate preferably is 269.53125 symbols per second. The second subset of carrier sets preferably includes carrier sets C43 and/or A43.

In accordance with an additional embodiment of the present invention, an asynchronous digital subscriber line (ADSL) system is provided. The ADSL system comprises a central office High Speed ADSL Terminating Unit (HSTU-C) and a remote High Speed ADSL Terminating Unit (HSTU-R) in bi-directional discrete multitone (DMT) communication with the HSTU-C. The HSTU-C is adapted to transmit handshake signaling to the HSTU-R via a first subset of carrier sets at a first symbol rate and transmit handshake signaling to the HSTU-R via a second subset of carrier sets at a second symbol rate, the second rate being less than the first rate. The first symbol rate preferably is 539.0625 symbols per second and the second symbol rate preferably is 269.53125 symbols per second. The HSTU-C may be further adapted to transmit the handshake signaling via the second subset of carrier sets at the second rate after a handshake attempt between the HSTU-C and the HSTU-R performed at the first rate for both the first and second carrier sets has failed. The second subset of carrier sets preferably includes carrier set C43 and/or A43.

In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection is provided in accordance with yet another embodiment of the present invention. The method comprises detecting, at the HSTU-R, a number of phase changes in a given time window of a handshake signaling transmitted by the HSTU-C to identify a symbol rate of the handshake signaling. The method further may comprise transmitting an acknowledgement symbol from the HSTU-R to the HSTU-C at the identified symbol rate. The method additionally may comprise receiving, at the HSTU-C, at least one handshake symbol at the HSTU-R at the identified symbol rate.

The step of detecting the number of phase changes in a given time window of the handshake signaling transmitted by the HSTU-C to identify a symbol rate of the handshake signaling preferably includes separating the handshake signaling transmitted by the HSTU-C into a first set of sub-symbols and a second set of sub-symbols for a given time window, the second set of sub-symbols following the first set of sub-symbols, performing a fast fourier transform on each of the first set of sub-symbols, performing a fast fourier transform on each of the second set of sub-symbols, summing a result of the fast fourier transforms performed on the first set of sub-symbols, summing a result of the fast fourier transforms performed on the second set of sub-symbols, and multiplying the summed result from the first set of sub-symbols with the summed result of the second set of sub-symbols to determine the number of phase changes of the handshake signaling within the time window. The number of phase changes detected within the time window may be proportional to the identified symbol rate or the identified symbol rate may be identified by the HSTU-R when the number of phase changes is at or above a minimum number of phase changes associated with the identified symbol rate.

In accordance with one embodiment of the present invention, a power spectral density (PSD) mask for spectral shaping of an asynchronous digital subscriber line (ADSL) overlap spectrum transmission over a plain old telephone system (POTS) is provided. The PSD mask is represented at least in part by a plurality of break points, the plurality of break points including:

approximately −97.5 decibel-milliwatts per hertz (dBm/Hz) at approximately 0 kilohertz (kHz);

approximately −97.5 dBm/Hz at approximately 4 kHz;

approximately −92.5 dBm/Hz at approximately 4 kHz;

approximately −36.5 dBm/Hz at approximately 25 kHz;

approximately −36.5 dBm/Hz at approximately 1104 kHz;

approximately −46.5 dBm/Hz at approximately 2208 kHz;

approximately −101.5 dBm/Hz at approximately 3925 kHz;

approximately −101.5 dBm/Hz at approximately 8500 kHz;

approximately −103.5 dBm/Hz at approximately 8500 kHz; and approximately −103.5 dBm/Hz at approximately 11040 kHz.

In accordance with another embodiment of the present invention, a power spectral density (PSD) mask for spectral shaping of an asynchronous digital subscriber line (ADSL) non-overlap spectrum over a plain old telephone system (POTS) is provided. The PSD mask may be represented at least in part by a plurality of break points, the plurality of break points including:

approximately −97.5 decibel-milliwatts per hertz (dBm/Hz) at approximately 0 kilohertz (kHz);
approximately −97.5 dBm/Hz at approximately 4 kHz;
approximately −72.5 dBm/Hz at approximately 80 kHz;
approximately −36.5 dBm/Hz at approximately 138 kHz;
approximately −36.5 dBm/Hz at approximately 1104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

In accordance with an additional embodiment of the present invention, a power spectral density (PSD) mask for spectral shaping of an asynchronous digital subscriber line (ADSL) overlap spectrum over a plain old telephone system (POTS) is provided. The PSD mask may be represented at least in part by a plurality of break points, the plurality of break points including:

approximately −97.5 decibel-milliwatts per hertz (dBm/Hz) at approximately 0 kilohertz (kHz);
approximately −97.5 dBm/Hz at approximately 4 kHz;
approximately −92.5 dBm/Hz at approximately 4 kHz;
approximately −56.5 dBm/Hz at approximately 25 kHz;
approximately −56.5 dBm/Hz at approximately 1104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

In accordance with another embodiment of the present invention, a power spectral density (PSD) mask for spectral shaping of an asynchronous digital subscriber line (ADSL) non-overlap spectrum over a plain old telephone system (POTS) is provided. The PSD mask may be represented at least in part by a plurality of break points, the plurality of break points including:

approximately −97.5 decibel-milliwatts per hertz (dBm/Hz) at approximately 0 kilohertz (kHz);
approximately −97.5 dBm/Hz at approximately 4 kHz;
approximately −92.5 dBm/Hz at approximately 80 kHz;
approximately −56.5 dBm/Hz at approximately 138 kHz;
approximately −56.5 dBm/Hz at approximately 104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

In accordance with yet another embodiment of the present invention, a power spectral density (PSD) mask for spectral shaping of an asynchronous digital subscriber line (ADSL) overlap spectrum over an integrated digital services network (ISDN) is provided. The PSD mask may be represented at least in part by a plurality of break points, the plurality of break points including:

approximately −90 decibel-milliwatts per hertz (dBm/Hz) at approximately 0 kilohertz (kHz);
approximately −90 dBm/Hz at approximately 93.1 kHz;
approximately −62 dBm/Hz at approximately 209 kHz;
approximately −36.5 dBm/Hz at approximately 255 kHz;
approximately −36.5 dBm/Hz at approximately 1104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

In accordance with another embodiment of the present invention, a power spectral density (PSD) mask for spectral shaping of an asynchronous digital subscriber line (ADSL) overlap spectrum over an integrated digital services network (ISDN) is provided. The PSD mask may be represented at least in part by a plurality of break points, the plurality of break points including:

approximately −90 decibel-milliwatts per hertz (dBm/Hz) at approximately 0 kilohertz (kHz);
approximately −90 dBm/Hz at approximately 93.1 kHz;
approximately −62 dBm/Hz at approximately 209 kHz;
approximately −56.5 dBm/Hz at approximately 255 kHz;
approximately −56.5 dBm/Hz at approximately 1104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

The terms "approximate" and "approximately," as used herein, refer to a range that is preferably within ±1%, more preferably within ±3%, even more preferably within ±5% and most preferably within ±10% of the indicated value. For example, "approximately 100 kilohertz" preferably means 99-101 kilohertz, more preferably means 97-103 kilohertz, even more preferably means 95-105 kilohertz, and most preferably means 90-110 kilohertz.

In accordance with one embodiment of the present invention, a power spectral density (PSD) mask for spectral shaping of an asynchronous digital subscriber line (ADSL) overlap spectrum transmission over a plain old telephone system (POTS) is provided. The PSD mask is represented at least in part by a plurality of break points, the plurality of break points including:
 −97.5±5% decibel-milliwatts per hertz (dBm/Hz) at 0±5% kilohertz (kHz);
 −97.5±5% dBm/Hz at 4±5% kHz;
 −92.5±5% dBm/Hz at 4±5% kHz;
 −36.5±5% dBm/Hz at 25±5% kHz;
 −36.5±5% dBm/Hz at 1104±5% kHz;
 −46.5±5% dBm/Hz at 2208±5% kHz;
 −b 101.5±5% dBm/Hz at 3925±5% kHz;
 −101.5±5% dBm/Hz at 8500±5% kHz;
 −103.5±5% dBm/Hz at 8500±5% kHz; and
 −103.5±5% dBm/Hz at 11040±5% kHz.

In accordance with another embodiment of the present invention, a power spectral density (PSD) mask for spectral shaping of an asynchronous digital subscriber line (ADSL) non-overlap spectrum over a plain old telephone system (POTS) is provided. The PSD mask may be represented at least in part by a plurality of break points, the plurality of break points including:
 −97.5±5% decibel-milliwatts per hertz (dBm/Hz) at 0±5% kilohertz (kHz);
 −97.5±5% dBm/Hz at 4±5% kHz;
 −72.5±5% dBm/Hz at 80±5% kHz;
 −36.5±5% dBm/Hz at 138±5% kHz;
 −36.5±5% dBm/Hz at 1104±5% kHz;
 −46.5±5% dBm/Hz at 2208±5% kHz;
 −101.5±5% dBm/Hz at 3925±5% kHz;
 −101.5±5% dBm/Hz at 8500±5% kHz;
 −103.5±5% dBm/Hz at 8500±5% kHz; and
 −103.5±5% dBm/Hz at 11040±5% kHz.

In accordance with an additional embodiment of the present invention, a power spectral density (PSD) mask for spectral shaping of an asynchronous digital subscriber line (ADSL) overlap spectrum over a plain old telephone system (POTS) is provided. The PSD mask may be represented at least in part by a plurality of break points, the plurality of break points including:
 −97.5±5% decibel-milliwatts per hertz (dBm/Hz) at 0±5% kilohertz (kHz);
 −97.5±5% dBm/Hz at 4±5% kHz;
 −92.5±5% dBm/Hz at 4±5% kHz;
 −56.5±5% dBm/Hz at 25±5% kHz;
 −56.5±5% dBm/Hz at 1104±5% kHz;
 −46.5±5% dBm/Hz at 2208±5% kHz;
 −101.5±5% dBm/Hz at 3925±5% kHz;
 −101.5±5% dBm/Hz at 8500±5% kHz;
 −103.5±5% dBm/Hz at 8500±5% kHz; and
 −103.5±5% dBm/Hz at 11040±5% kHz.

In accordance with another embodiment of the present invention, a power spectral density (PSD) mask for spectral shaping of an asynchronous digital subscriber line (ADSL) non-overlap spectrum over a plain old telephone system (POTS) is provided. The PSD mask may be represented at least in part by a plurality of break points, the plurality of break points including:
 −97.5±5% decibel-milliwatts per hertz (dBm/Hz) at 0±5% kilohertz (kHz);
 −97.5±5% dBm/Hz at 4±5% kHz;
 −92.5±5% dBm/Hz at 80±5% kHz;
 −56.5±5% dBm/Hz at 138±5% kHz;
 −56.5±5% dBm/Hz at 1104±5% kHz;
 −46.5±5% dBm/Hz at 2208±5% kHz;
 −101.5±5% dBm/Hz at 3925±5% kHz;
 −101.5±5% dBm/Hz at 8500±5% kHz;
 −103.5±5% dBm/Hz at 8500±5% kHz; and
 −103.5±5% dBm/Hz at 11040±5% kHz.

In accordance with yet another embodiment of the present invention, a power spectral density (PSD) mask for spectral shaping of an asynchronous digital subscriber line (ADSL) overlap spectrum over an integrated digital services network (ISDN) is provided. The PSD mask may be represented at least in part by a plurality of break points, the plurality of break points including:
 −90±5% decibel-milliwatts per hertz (dBm/Hz) at 0±5% kilohertz (kHz);
 −90±5% dBm/Hz at 93.1±5% kHz;
 −62±5% dBm/Hz at 209±5% kHz;
 −36.5±5% dBm/Hz at 255±5% kHz;
 −36.5±5% dBm/Hz at 1104±5% kHz;
 −46.5±5% dBm/Hz at 2208±5% kHz;
 −101.5±5% dBm/Hz at 3925±5% kHz;
 −101.5±5% dBm/Hz at 8500±5% kHz;
 −103.5±5% dBm/Hz at 8500±5% kHz; and
 103.5±5% dBm/Hz at 11040±5% kHz.

In accordance with another embodiment of the present invention, a power spectral density (PSD) mask for spectral shaping of an asynchronous digital subscriber line (ADSL) overlap spectrum over an integrated digital services network (ISDN) is provided. The PSD mask may be represented at least in part by a plurality of break points, the plurality of break points including:
 −90±5% decibel-milliwatts per hertz (dBm/Hz) at 0±5% kilohertz (kHz);
 −90±5% dBm/Hz at 93.1±5% kHz;
 −62±5% dBm/Hz at 209±5% kHz;
 −56.5±5% dBm/Hz at 255±5% kHz;
 −56.5±5% dBm/Hz at 1104±5% kHz;
 −46.5±5% dBm/Hz at 2208±5% kHz;
 −101.5±5% dBm/Hz at 3925±5% kHz;
 −101.5±5% dBm/Hz at 8500±5% kHz;
 −103.5±5% dBm/Hz at 8500±5% kHz; and
 −103.5±5% dBm/Hz at 11040±5% kHz.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is a table depicting the spectral compatibility of the A.X systems into First Group systems when a 24 Intra-Quad Interferers are assumed.

FIG. 6 is a table depicting the spectral compatibility of the A.X systems into First Group systems when a 24 Intra-Quad Interferers are assumed.

FIG. 7 is a table depicting depicts the spectral compatibility of the A.X into First Group systems for the case when Intra-Quad Interferer is assumed $(A.X_1)$

DETAILED DESCRIPTION OF THE PRESENT INVENTION

Figure 1:
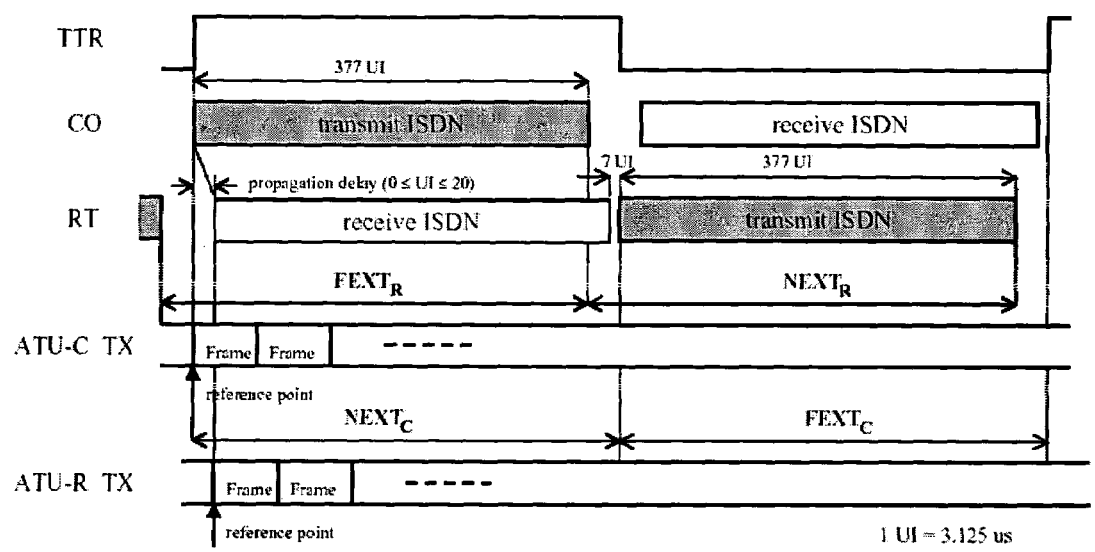
FIG. 1 illustrates a conventional timing model for ISDN/ADSL systems.

The present invention sets forth exemplary systems and methods for modifying the existing G.992.1, G.992.2, and G.994.1 Recommendations as presented by the ITU-T for the purposes of increasing ADSL system performance and reach in geographic regions falling under the requirements of Annexes A and C to the G.992.1 Recommendation. In accordance with the present invention, such modifications relate to the implementation of signals having overlapping and non-overlapping frequency spectra, as well as manipulations of DBM and FBM implementations. The exemplary systems and methods described herein may be implemented in other contexts as appropriate without departing from the spirit or the scope of the present invention.

As an initial matter, it is heretofore submitted that the performance enhancing modifications of the present invention are fully supported by the current G.992.1/G.992.2 standard specifications, thereby resulting in uncomplicated and rapid implementation. In particular, as specified in G.992.1 § C.4.8. relating to Annex C, entitled "A TU-C Downstream transmit spectral mask", the downstream spectral (PSD) mask of Annex C may use the same masks as Annex A. Further, Annex A of G.992.1 specifies in § A.1.2 a PSD mask for overlapped spectrum operation, as well as a PSD mask for reduced NEXT interference into the ADSL upstream band in § A.1.3 (commonly referred to as FDM or non-overlap spectrum). As discussed above, FDM is the predominant mode of operation in Annex C geographic regions, whether it is the DBM or FBM version.

Furthermore, § C.4.8 indicates that when C-MSG1 bit 16 of the initialization sequence undertaken during the handshake process has a value of 0, the PSD mask specified in § A.1.3 may be used. Conversely, when the C-MSG1 bit 16 is set to 1, the PSD mask specified in § A.1.2 may be used. Annex A of G.992.1 states in § A.1.2.1 that the lower end of the pass-band spectrum is a manufacturer discretionary value and that handshake initialization signals may be transmitted with all sub-carriers from index 1 to 255, with index 1 also being vendor discretionary.

In addition to providing support for the adoption of overlapping spectra in Annex C regions, the current G.992.1/G.992.2 standard specifications further enables a proper inter-working of overlap and non-overlap implementations without any modifications to the recommendation. In § 10.1.2 of the main body of G.992.1, entitled "Transparency to methods of separating upstream and downstream signals", it is stated that "Manufacturers may choose to implement this Recommendation [G.992.1] using either frequency-division-multiplexing (FDM) or echo canceling (overlapped spectrum) to separate upstream and downstream signals. The handshaking initialization procedure described here ensures compatibility between these different implementations by specifying all upstream and downstream control signals to be in the appropriate, but narrower, frequency bands that would be used by an conventional FDD (frequency-division duplexing) transceiver, and by defining a time period during which an overlapped spectrum transceiver can train its echo canceller."

The above-reference section indicates that no negotiation is required between transmitter and receiver of different implementations (overlap vs. non-overlap) to interoperate. The downstream transmitter [CO operator] has the choice of transmitting a full spectrum, while the downstream receiver can decide to process the whole or part of the usable spectrum. This aspect is further illustrated in section § 7.11.1.1 (entitled "Data sub-carriers"): "The channel analysis signal defined in § 10.6.6 allows for a maximum of 255 carriers (at frequencies nΔf, n=1 to 255) to be used. The lower limit of n depends on both the duplexing and service options selected. For example, if an overlapped spectrum is used to separate downstream and upstream signals, then the lower limit on n is determined by the POTS splitting filters. However, if frequency division multiplexing (FDM) is used, the lower limit is set by the downstream-upstream separation filters. In all cases the cut-off frequencies of these filters are completely at the discretion of the manufacturer, and the range of usable n is determined during the channel estimation [by the receiver]". This last sentence indicates that the use of the overlap region is ultimately determined by the capability of the receiver to process the lower part of the spectrum. An FDM receiver would not take benefit of the lower spectrum. However, this inability of the receiver does not prevent its proper operation in any circumstance or lower its performance. This aspect has been verified through interoperability lab testing with different vendor's implementations.

Finally, it has been determined that proper interoperability between overlapped and non-overlapped spectrum implementations does not require any special handling or exchange of messages in G.992.1. Information bit 16 assigned in C-MSG1 and R-MSG1 messages of the channel analysis phase indicate the capability of the transmitter/receiver pair to process the lower part of the spectrum. It is also highlighted in the standard that since the initialization sequence allows for inter-working of overlapped and non-overlapped spectrum implementations, information bit 16 assigned in C-MSG1 and R-MSG1 are for information only.

Figure 2:
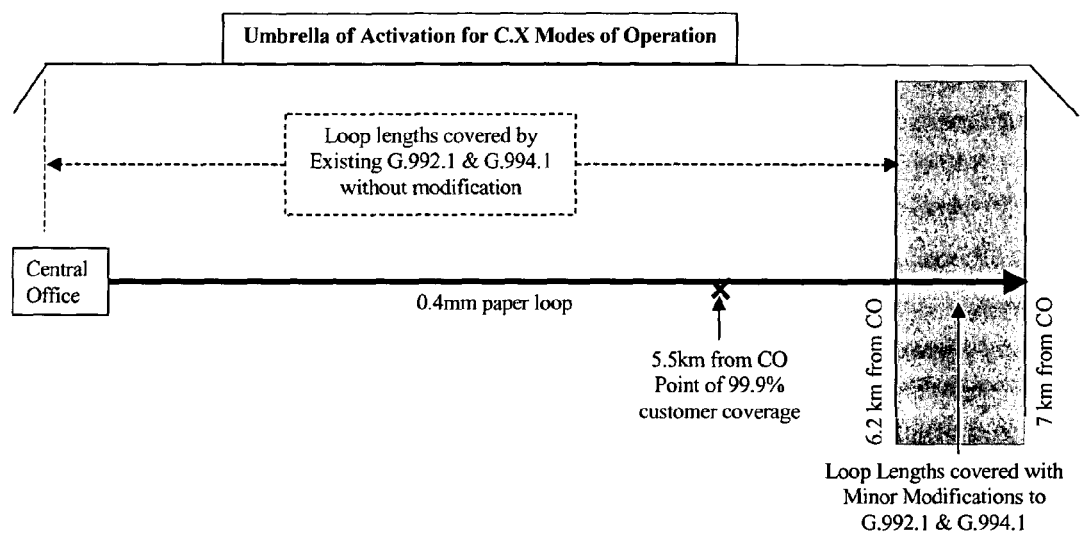
FIG. 2 shows a block diagram illustrating a deployment guideline for ADSL systems

Referring now to FIG. 2, there is shown a block diagram illustrating a deployment guideline for ADSL systems implemented in accordance with the present invention. In view of the above support with then current G.992.1 and G.992.2 Recommendations, it has been determined that 99.9% of customer coverage may be provided with no modification to the existing standards, but merely with a modification to the manner in which the standardized equipment is utilized. These customers typically comprise those within about 6.2 km of the CO. However, as FIG. 1 further indicates, additional loop lengths of between 6.2 and 7 km will also be supported with minor modification to existing standards.

Relating specifically to the handshake initialization procedure required to establish overlapped versus non-overlapped spectra, the sub-channel information fields "G.992.1 Annex C Spectrum frequency downstream Npar(3) coding—Octet 1 thru. 4." may be utilized to inform the CO and CPE of the possibility of using lower frequency bands. This spectrum information indicated in the Npar(3) fields associated with this recommendation is currently of informative nature only. A summary of indication bits and modes is presented in Table 1.

TABLE 1

| Modes | DS Transmission spectrum Overlap/Non-overlap (C-MSG1/R-Msg1 bit 16) | ATU-C/ATU-R overlap capability G.994.1 Spectrum frequency downstream (Npar(3) octet 1 & 2) |
| --- | --- | --- |
| DBM FDM | bit 16 = 0: No Overlap | Bin > 32 |
| FBM FDM | bit 16 = 0: No Overlap | Bin > 32 |
| XOL | bit 16 = 1: Overlap | Bin > 6 |
| XDD | bit 16 = 1: Overlap | Bin > 6 |
| FBM | bit 16 = 1: Overlap | Bin > 6 |

In accordance with the present invention, five different Annex C modes of operation may be supported as Annex C compliant modes. In particular, XOL, XDD, FBM-SOL, DBM-FDM, FBM-FDM are fully supported, with DBM-FDM and FBM-FDM being the convention Annex C modes as described in Annex C of the G.992.1 Recommendation. As set forth in detail above, the first three modes are a subset of the general overlapped spectrum operation defined in G.992.1 Annex A, while the latter two are considered as non-overlapped, or conventional Annex C, spectrum operation. Further, while G.992.1 ensures proper inter-working of overlapped and non-overlapped spectrum implementations, it is left to the downstream transmitter to use or not to use the overlapped spectrum, thereby resulting in easy backward compatibility with downstream transmitters without such capability.

With respect to the above the following points are to be noted: the CO operator typically has the sole control of the spectrum management, i.e. if the operator does not wish to operate in overlapped mode on its loops plant, the operator needs only to limit the ATU-C transmitter in the manner set forth in additional detail below. Accordingly, it is not necessarily required to negotiate the use of overlapped spectrum between transmitter and receiver, as it is transparent to the remote terminal. That is enabling the transmission of the overlapped spectrum generally will not affect adversely the performance or the connectivity of a remote terminal. Therefore, in accordance with one embodiment, the use of any overlapped modes XOL, XDD, FBM-SOL may remain under control of the CO.

The decision to operate in full-duplex XOL, or half-duplex XDD or FBM-SOL, in one embodiment, likewise preferably remains under control of the central office operator, as it is the case for the selection of conventional FBM or DBM modes. Further, because of the diversity of the loop plants and noise environments, the five different Annex C modes of operation may be individually selectable at the direction of the central office. The criteria to select one mode versus another preferably is left to the discretion of the operator. An automatic or intelligent selection of the mode under control of the central office may be implemented and the application is left to the operator's discretion and is within the scope of the present invention.

Relating specifically to the preferred XDD mode of operation, this mode of operation features utilization of overlapping spectrum having downstream full duplex (FEXT and NEXT) and upstream (FEXT only) transmission. As set for the above, selection of this mode is transparent to the downstream transceiver and results in easy and efficient implementation of the mode.

With the use of the overlap spectrum, Annex C describes three half-duplex modes: namely, FBM-FDM, FBM-SOL and XDD, with the latter two being supersets of the first one, while all three modes are a subset of the more generic DBMOL defined in G.992.1. It should be understood that the G.992.1 Recommendation allows alternate or continuous transmission downstream and alternate or continuous transmission upstream as a subset of the DBMOL mode. The following describes the transparent bin selection process that allows inter-working of overlap and non-overlap implementations can be extended to allow proper operation between FBM-FDM, FBM-SOL and XDD.

As explained above, the inter-working of overlap and non-overlap implementations of G.992.1 does not require prior negotiation between transmitter and receiver. While the ATU-C transmits an overlap or a non-overlap spectrum (at the operator's discretion) during the channel estimation phase, the receiver determines the range of usable bins within the downstream transmit spectrum, depending on its capability to handle the received signal in the lower part of the spectrum. The ATU-R communicates to the ATU-C the actual bins used for downstream data allocation. It is this transparent process by the receiver that ensures interoperability between FBM-FDM & FBM-SOL platforms on the one hand, or DBMOL, XOL and DBM-FDM platforms on the other hand without any mode negotiation.

Similar to the modes described above, the principle of "transparent bin-selection" at the receiver for overlapping/non-overlapping spectra also may be applied to ensure that the half-duplex modes, namely FBM-FDM, FBM-SOL and XDD, interoperate seamlessly. Similar to the overlap mode selections the continuous (DBM) or alternate (FBM) pattern of the downstream transmission at "showtime" is determined first by the ATU-C transmit pattern during the handshake initialization and then by the ATU-R's ability to process a signal continuously or alternatively during the channel estimation phase. Specifically, the similarities with the overlap/non-overlap bin-selection process are: 1) during initialization, the selection of transmitting in alternate fashion (FBM) or continuously (DBM) downstream is under control of the ATU-C. It is similar to the choice of using non-overlap or overlap mode by the ATU-C; and 2) the C.X ATU-R receiver selects the bin location used for the transmission downstream in show-time: if the C.X receiver senses signal in both NEXT and FEXT periods during the channel estimation phase, it can allocate bins in both periods and require transmission of data continuously. However, if the ATU-R receiver does not sense signal during the NEXT period, because the ATU-C does not transmit during this period, the ATU-R will allocate bins only during the FEXT period.

The overlap/non-overlap bin-selection process clarifies how XDD or FBM systems can interoperate. Connecting to a C.X ATU-C, an XDD ATU-R capable of processing data continuously may easily request transmission of data downstream continuously, while an FBM ATU-R will not be affected by the ATU-C's transmission during the NEXT period during initialization and will request transmission downstream in FEXT periods only in showtime.

While the control of the ATU-C transmitter allows operation of FBM and DBM downstream, control of the FBM and DBM upstream can be accomplished via the DBM bit defined in G.994.1. This enables independent operation of the ATU-C and ATU-R. Therefore, to accomplish proper inter-working of C.X modes, it is submitted that: 1) the ATU-C keeps complete control of the downstream transmission characteristics: ATU-C decides to transmit downstream continuously or alternatively during initialization independent of the upstream transmission pattern; and 2) the ATU-C controls the upstream transmission pattern through appropriate ATU-C through ATU-R signaling, independently of the downstream transmission pattern.

To achieve this last goal, the ATU-C CL/MS message NPar(2) bit DBM of G.994.1 may be utilized. However, in order to decouple the pattern of the downstream and upstream transmission characteristics, the restriction in the current definition of the DBM bit that requires FBM operation in downstream and in upstream simultaneously preferably is lifted.

For the XDD mode, setting the NPar(2) bit DBM to 1 of G.994.1 generally forces the CPE transmitter to transmit upstream during FEXT only in the initialization and data mode phases. ATU-C will continuously transmit downstream during NEXT and FEXT periods using the overlap spectrum. A C.X ATU-R will be able to allocate bins in FEXT and NEXT and operate continuously in the downstream path and alternately in the upstream path in XDD mode. An FBM only ATU-R will not allocate bins in NEXT and operate in true FBM mode. For the FBM mode, setting the NPar(2) bit DBM to 1 in accordance with G.994.1 typically adapts the CPE transmitter to transmit upstream during FEXT only in the initialization and data mode phases, as it is done for FBM FDM. ATU-C will transmit downstream during FEXT periods.

In Tables C-3 through C-6 of G.994.1 (Tables 2-5, respectively), the following changes are recommended in sections C.7.2.1, C.7.2.2, C.7.3.1 and C.7.3.2 (relating to of ATU-C CL/MS message NPar(2) DBM bit definitions in G.994.1):

C.7.2.1 CL Messages (Supplements § 10.2.1)

TABLE 2

Modifications to Table C-3 (ATU-C CL message NPar(2) bit definitions)

| NPar(2) bit | Definition |
|---|---|
| DBM | If set to ZERO, this bit may indicate Bitmap-$N_R$ and Bitmap-$N_C$ are enabled (Dual Bitmap mode) and are used to transmit data. If set to ONE, this bit may indicate Bitmap-$N_C$ is disabled (FEXT Bitmap mode upstream), i.e. only Bitmap-$F_C$ is used to transmit data by ATU-R. Bitmap-$N_R$ may be enabled (Dual Bitmap mode downstream). This mode selection may be only performed by the ATU-C. If it is set to ONE in a CL message, it must be set to ONE in subsequent MS messages from, either the ATU-C or ATU-R (only applicable for G.992.1 Annex C). |

C.7.2.2 MS Messages (Supplements § 10.2.2)

TABLE 3

Modifications to Table C-4 (ATU-C MS message NPar(2) bit definitions)

| NPar(2) bit | Definition |
|---|---|
| DBM | If set to ZERO, this bit may indicate Bitmap-$N_R$ and Bitmap-$N_C$ are enabled (Dual Bitmap mode) and are used to transmit data. If set to ONE, this bit may indicate Bitmap-$N_C$ is disabled (FEXT Bitmap mode), i.e. only Bitmap-$F_C$ is used to transmit data ATU-R. Bitmap-$N_R$ may be enabled (Dual Bitmap mode downstream). This mode selection may be only performed by ATU-C. This bit may be set to ONE if it was set to ONE in a previous CL message (only applicable for G.992.1 Annex C). |

C.7.3.1CLR Messages (Supplements § 10.3.1)

TABLE 4

Modifications to Table C-5
(ATU-R CLR message NPar(2) bit definitions)

| Npar(2) bit | Definition |
| --- | --- |
| DBM | This bit may be set to ONE. |

C.7.3.2MS Messages (Supplements § 10.3.2)

TABLE 5

Modifications to Table C-6 (ATU-R MS message NPar(2) bit definitions)

| Npar(2) bit | Definition |
| --- | --- |
| DBM | If set to ZERO, this bit may indicate Bitmap-$N_R$ and Bitmap-$N_C$ are enabled (Dual Bitmap mode) and are used to transmit data. If set to ONE, this bit may indicate Bitmap-$N_C$ is disabled (FEXT Bitmap mode upstream), i.e. only Bitmap-$F_C$ is used to transmit data by ATU-R. Bitmap-$N_R$ may be enabled (Dual Bitmap mode downstream). This mode selection may be only performed by ATU-C. This bit may be set to ONE if it was set to ONE in a previous CL message (only applicable for G.992.1 Annex C). |

Relating now to the addition of two reduced NEXT overlapped PSD masks for inclusion in Annex C of G.922.1, there are defined an overlapped mask with spectral shaping for use with FBM mode and another is defined for use with DBM mode. Overlapping of the downstream band with the upstream band allows for performance improvement of the Annex C downstream channel, while the spectral shaping controls the spectral compatibility with other systems in the cable. The shaped overlap mask for use with dual bit map mode of operation is commonly referred to as the DBMsOL mask and the mask for use with FEXT bit map mode of operation is commonly called the FBMsOL mask. Both of these masks are spectrally compatible with the First Group systems (namely Annex A, Annex C DBM, Annex C FBM, and TCM-ISDN) in accordance with the criteria set forth by the Telecommunication Technology Committee (TTC) in Japan, within the definition of C.X modes of operation. It is therefore submitted that the DBMsOL and FBMsOL masks be incorporated in Annex C of G.992.1 and G.992.2 for enhanced performance and reduced NEXT applications.

Figure 3:
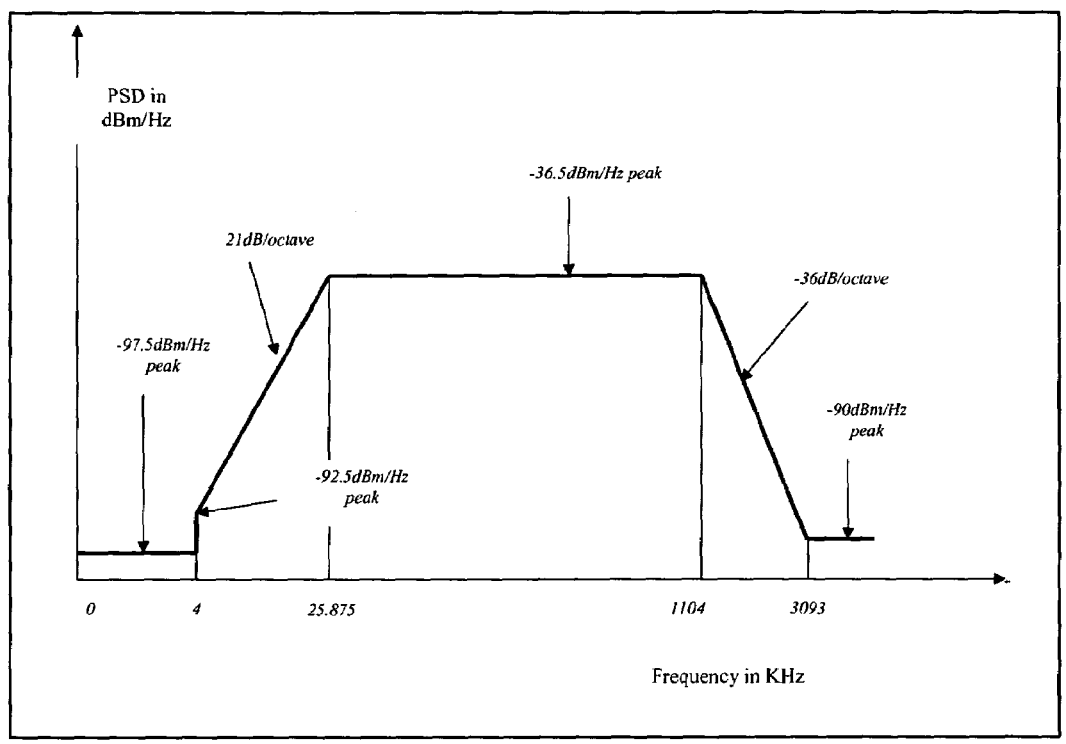
FIG. 3 illustrates a Dual Bit Map Overlap (DBMOL) PSD mask.

The Dual Bit Map Overlap (DBMOL) PSD mask represents to the current ADSL overlap mask that extends the usual downstream bandwidth down to just above the POTS band (25.875 KHz) and is defined in G.992.1, Annex A, section A1.2. The same mask definition is provided in FIG. 3 and Equation 1. Equation 1 provides an explicit form of the ITU ADSL_OL PSD template that matches the mask displayed in FIG. 3, used for DBMOL downstream. Table 6 describes the break points of the PSD mask. Note that unless otherwise indicated, the PSD mask associated with a spectrum management class, as defined by Equation 1 below, is equal to the PSD template plus 3.5 decibels (dB).

$$PSD_{ADSL\_OL,ds\text{-}Disturber} = K_{ADSL\_OL,ds} \cdot \frac{2}{f_0} \cdot \frac{\left[\sin\left(\pi\frac{f}{f_0}\right)\right]^2}{\left(\pi\frac{f}{f_0}\right)^2} \cdot \frac{1}{1+\left(\frac{f}{f_{LP3dB}}\right)^{12}} \cdot \frac{1}{1+\left(\frac{f_{HP3dB}}{f}\right)^8}, \; 0 < f < \infty$$

EQ. 1

-continued $f$: [Hz]

$f_0 = 2.208 \times 10^6$ [Hz], $f_{LP3dB} = \frac{f_0}{2}$ (G.992.1), $f_{HP3dB} = 25.875 \times 10^3$ [Hz], $K_{ADSL\_OL,ds} = 0.1104$ [W]

TABLE 6

Explicit attenuation and levels of DBMOL downstream spectral Mask

| Frequency f(KHz) | PSD (dBm/Hz) Peak values |
| --- | --- |
| 0 < f < 4 | −97.5 dBm/Hz peak |
| 4 < f < 25.875 | −92.5 + 21 log$_2$(f/4) |
| 25.875 < f < 1104 | −36.5 dBm/Hz peak |
| 1104 < f < 3093 | −36.5 − 36 log$_2$(f/1104) |
| 3093 < f | −90 dBm/Hz |

The PSD template associated with the DBM shaped overlap (DBMsOL) mode preferably is defined by Equation 2. The DBMsOL spectral mask level typically is lower than the full overlap mask of DBMOL and thus is ITU-T G.992.1 compliant. DBMsOL exhibits a much greater high pass corner frequency (~130 KHz) than DBMOL (25.875 KHz) to ensure spectral compatibility with First Group system upstream channels. It also uses a 3$^{rd}$ order high-pass filter rolloff as opposed to the 4$^{th}$ order rolloff of the full overlap mask of DBMOL. Based on extensive simulations, this shaped overlap mask has been recognized to be fully spectrally compatible with other systems in the Japan access network, within the C.X modes of operation.

$$PSD_{DBMsOL,ds\text{-}Disturber} = K_{ADSL\_OL,ds} \cdot \frac{2}{f_0} \cdot \frac{\left[\sin\left(\pi \frac{f}{f_0}\right)\right]^2}{\left(\pi \frac{f}{f_0}\right)^2} \cdot$$
$$\frac{1}{1+\left(\frac{f}{f_{LP3dB}}\right)^{12}} \cdot \frac{1}{1+\left(\frac{f_{HP3dB}}{f}\right)^6}, \ 0 < f < \infty$$

EQ. 2

$f$: [Hz]

$f_0 = 2.208 \times 10^6$ [Hz], $f_{LP3dB} = \frac{f_0}{2}$ (G.992.1), $f_{HP3dB} = 130 \times 10^3$ [Hz], $K_{ADSL\_OL,ds} = 0.1104$ [W]

The FBMsOL template preferably follows the generic shape of the PSD template defined by Equation 1. To ensure spectral compatibility with Annex C DBM upstream, FBMsOL moves the high pass corner frequency from approximately 25.875 kHz up to approximately 32 kHz.

In accordance with another embodiment of the present invention, a new high speed dual bit map (HSDBM) system is provided based on ITU-T G.992.1 compliant Annex C dual bit map (DBM) mode, to address the growing need for high speed ADSL in Japan. HSDBM makes use of the overlapped spectra defined in the ITU-T Recommendation G.992.1, and is designed to operate at speeds in excess of 12 megabits/s (Mb/s). Spectral compatibility simulations, using a TTC-compliant simulator, demonstrate that systems implementing the DBM full overlap mask can be deployed up to 1.5 km and maintain spectral compatibility with the First Group systems. Systems deployed using the DBM shaped overlap (DBMsOL) mask can be deployed up to 2.0 km and maintain spectral compatibility with First Group systems. The DBMsOL mask preferably is identical to that used for XOL and XDD systems for C.X. The computed deployment guidelines are such that the HSDBM systems are deployed in the same quadrant as First Group systems.

The DBMOL downstream spectral mask is equivalent to the ADSL overlap mask (ADSL_OL) as defined in G.992.1, Annex A, section A1.2. ADSL_OL extends the downstream bandwidth to the POTS band (25.875 KHz). Equation 3 provides an explicit form of the ITU ADSL_OL PSD template that matches the mask displayed in FIG. 3 used for DBMOL downstream.

$$PSD_{DBMsOL} = K_{ADSL\_OL} \times \frac{C}{f_0} \times \frac{\left[\sin\left(\pi \frac{f}{f_0}\right)\right]^2}{\left(\pi \frac{f}{f_0}\right)^2} \times$$
$$\frac{1}{1+\left(\frac{f}{f_{LP3dB}}\right)^{12}} \times \frac{1}{1+\left(\frac{f_{HP3dB}}{f}\right)^6}, \ 0 < f < \infty$$

EQ. 3 where $PSD_{DBMsOL}$ represents the PSD mask, $K_{ADSL\_OL}$ represents a constant value, C represents a constant value, f represents a frequency of the downstream transmission, $f_0$ represents a constant value, $f_{LP3dB}$ represents a 3 decibel (dB) low pass frequency and $f_{HP3dB}$ represents a 3 dB high pass frequency. $K_{ADSL\_OL}$ preferably has a value between 0.0900 watts and 0.1200 watts and more preferably has a value of 0.1104 watts. The constant $f_0$ preferably has a value between 2.100 megahertz and 2.300 megahertz and more preferably has a value of 2.208 megahertz. The constant $f_{LP3dB}$ has a value substantially equal to $$\frac{f_0}{2}.$$

The constant $f_{HP3dB}$ has preferably has a value between 100 kilohertz and 150 kilohertz and more preferably has a value of 130 kilohertz. The constant C preferably has a value between 0.1 and 10 and more preferably has a value of 2.

The DBMsOL spectral mask preferably uses the same PSD masks as XOL and XDD systems defined by Equation 4 below. However, when compared to the DBMOL mask, the DBMsOL mask uses a $3^{rd}$ order high-pass filter (as opposed to a $4^{th}$ order filter) and a high-pass filter cutoff frequency of approximately 130 kHz (as opposed to 25.875 kHz).

$$PSD_{FBMsOL} = K_{ADSL\_OL} \times \frac{C}{f_0} \times \frac{\left[\sin\left(\pi \frac{f}{f_0}\right)\right]^2}{\left(\pi \frac{f}{f_0}\right)^2} \times$$
$$\frac{1}{1+\left(\frac{f}{f_{LP3dB}}\right)^{12}} \times \frac{1}{1+\left(\frac{f_{HP3dB}}{f}\right)^8}, \ 0 < f < \infty$$

EQ. 4 where $PSD_{FBMsOL}$ represents the PSD mask, $K_{ADSL\_OL}$ represents a constant value, C represents a constant value, f represents a frequency of the downstream transmission, $f_0$ represents a constant value, $f_{LP3dB}$ represents a 3 decibel (dB) low pass frequency and $f_{HP3dB}$ represents a 3 dB high pass frequency. where $PSD_{DBMsOL}$ represents the PSD mask, $K_{ADSL\_OL}$ represents a constant value, C represents a constant value, f represents a frequency of the downstream transmission, $f_0$ represents a constant value, $f_{LP3dB}$ represents a 3 decibel (dB) low pass frequency and $f_{HP3dB}$ represents a 3 dB high pass frequency. $K_{ADSL\_OL}$ preferably has a value between 0.0900 watts and 0.1200 watts and more preferably has a value of 0.1104 watts. The constant $f_0$ preferably has a value between 2.100 megahertz and 2.300 megahertz and more preferably has a value of 2.208 megahertz. The constant $f_{LP3dB}$ has a value substantially equal to $$\frac{f_0}{2}.$$

The constant $f_{HP3dB}$ has preferably has a value between 27 kilohertz and 40 kilohertz and more preferably has a value of 32 kilohertz. The constant C preferably has a value between 0.1 and 10 and more preferably has a value of 2.

HSDBM achieves its high performance by leveraging a combination of DBM full overlap mask up to approximately 1.5 km and DBMsOL mask (a spectrally shaped version of DBMOL) up to approximately 2.0 km. The DBMsOL mask is identical to that used for XOL and XDD systems of C.X. Within it's range of deployment, HSDBM is spectrally compatible with the First Group systems when deployed in the same quadrant. The HSDBM system therefore may be suitable for deployment up to 2 km with the First Group systems in the same quadrant.

In another embodiment of the present invention, a new Annex to G992.1 is defined based on existing G992.1 Annex C, for a 2.208 megahertz (MHz) band ADSL extended spectrum that operates in the same cable bundle as TCM-ISDN. The following describes the changes to G992.1 Annex C to support 512 subcarriers in downstream transmissions.

The current G.992.1 Annex C standard is currently supports downstream bandwidth of 1.104 MHz. In one embodiment of the present invention, the bandwidth preferably is extended to 2.208 MHz by defining NSC=512 as the number of downstream sub channels. All places in the current G.991.1 Annex C standard which refers to the absolute number for the downstream subchannels may be replaced by a function of NSC. The following illustrate such changes:

C.4.7.2 Data Subcarriers (Modifies 7.11.1.1)

The channel analysis signal defined in 10.6.6 allows for a maximum of NSC−1 carriers (at frequencies nΔf, n=1 to NSC−1) to be used.

C.4.7.3 Nyquist Frequency (Modifies 7.11.1.3)

The carrier at the Nyquist frequency (#NSC) may not be used for user data and may be real valued; other possible uses are for further study.

C.4.7.4 Modulation by the Inverse Discrete Fourier Transform (Replaces 7.11.2)

The modulating transform defines the relationship between the 2*NSC real values $x_n$ and the $Z_i$:

$$x_n = \sum_{i=0}^{2*NSC-1} \exp\left(\frac{j\pi n i}{NSC}\right) Z_i \text{ for } n = 0 \text{ to } 2*NSC - 1 \quad \text{EQ. 5}$$

The constellation encoder and gain scaling generate only NSC−1 complex values of $Z_i$. In order to generate real values of $x_n$, the input values (NSC−1 complex values plus zero at DC and one real value for Nyquist if used) may be augmented so that the vector Z has Hermitian symmetry. That is, $$Z_i = \text{conj}(Z'_{2*NSC-i}) \text{ for } i = NSC+1 \text{ to } 2*NSC-1 \quad \text{EQ. 6}$$

C.4.7.5 Synchronization Symbol (Modifies 7.11.3)

The synchronization symbol permits recovery of the frame boundary after micro-interruptions that might otherwise force retraining.

The data symbol rate, $f_{symb}$=4 kHz, the carrier separation, Δf=4.3125 kHz, and the IDFT size, N=2*NSC, are such that a cyclic prefix of 5/64*NSC samples could be used. That is, $$(2+5/64) \times NSC \times 4.0 = 2*NSC \times 4.3125$$

The cyclic prefix may, however, be shortened to 1/8*NSC samples, and a synchronization symbol (with a nominal length of (2+1/8)×NSC samples) is inserted after every 68 data symbols. That is, $$(2+1/8) \times NSC \times 69 = (2+5/64) \times NSC \times 68$$

The data pattern used in the synchronization symbol may be the pseudo-random sequence PRD, ($d_n$, for n=1 to 2*NSC) defined by:

$$d_n = 1 \quad \text{for } n = 1 \text{ to } 9 \quad \text{EQ. 7}$$
$$d_n = d_{n-4} \oplus d_{n-9} \quad \text{for } n = 10 \text{ to } 2*NSC$$

The first pair of bits ($d_1$ and $d_2$) may be used for the DC and Nyquist subcarriers (the power assigned to them is zero, so the bits are effectively ignored); the first and second bits of subsequent pairs then are used to define the $X_i$ and $Y_i$ for i=1 to NSC−1.

The period of the PRD is only 511 bits, so $d_{512}$ may be set be equal to $d_1$. The $d_1$-$d_9$ are re-initialized for each synchronization symbol, so each symbol uses the same data. The two bits that modulate the pilot carrier, may be overwritten by {0,0}, thereby generating the {+,+} constellation.

The minimum set of subcarriers to be used is the set used for data transmission (i.e. those for which $b_i$>0) which $b_i$=0 may be used at a reduced PSD is defined in transmit PSD-related portions Annexes A, B and C. The data modulated onto each subcarrier may be as defined above; it may not depend on which subcarriers are used.

C.4.7.6 Cyclic Prefix (Replaces 7.12)

The last 1/8*NSC samples of the output of the IDFT ($x_n$ for n=2*NSC−1/8*NSC to 2*NSC−1) may be prepended to the block of 2*NSC samples and read out to the digital-to-analogue converter (DAC) in sequence. For example, when NSC=256, the subscripts, n, of the DAC samples in sequence are 480 . . . 511, 0 . . . 511. The cyclic prefix may be used for all symbols beginning with the C-RATES1 segment of the initialization sequence, as defined in 10.6.2.

C.7.4.4 C-REVERB1 (replaces 10.4.5)

C-REVERB1 is a signal that allows the ATU-C and ATU-R receiver to adjust its automatic gain control (AGC) to an appropriate level. The data pattern used in C-REVERB1 may be the pseudo-random downstream sequence (PRD), $d_n$ for n=1 to 2*NSC, defined in EQ. 7.

The bits may be used as follows: the first pair of bits ($d_1$ and $d_2$) is used for the DC and Nyquist subcarriers (the power assigned to them is, of course, zero, so the bits are effectively ignored); then the first and second bits of subsequent pairs are used to define the $X_i$ and $Y_i$ for i=1 to NSC−1 as defined in Table 7-13 of the G.992.1 recommendation.

The period of PRD is only 511 bits, so $d_{512}$ may be set be equal to $d_1$. The bits $d_1$ to $d_9$ may be re-initialized for each symbol, so each symbol of C-REVERB1 is identical. The two bits that modulate the pilot carrier may be overwritten by {0,0}, thus generating the {+,+} constellation.

The duration of C-REVERB1 is 512 (repeating) symbols without cyclic prefix. Note that when NSC=512 the PRD generally has to generate 1024 bit which is two periods of the PRD. Since only the first period of the PRD is initialized with ones for n=1 to 9, the second period will be completely random compared to the first period of the PRD there for the 9 bit PRD generator is sufficient for generating the signals with NSC=512.

C.7.10.3 R-B&G (Replaces 10.9.14)

The purpose of R-B&G is to transmit to ATU-C the bits and gains information, Bitmap-$F_R$ {$b_1$, $g_1$, $b_2$, $g_2$, . . . , $b_{NSC-1}$, $g_{NSC-1}$}, and Bitmap-$N_R$ {$b_{NSC+1}$, $g_{NSC+1}$, $b_{NSC+2}$, $g_{NSC+2}$, . . . , $b_{2*NSC-1}$, $g_{2*NSC-1}$}, to be used on the downstream subcarriers. $b_i$ of Bitmap-$F_R$ indicates the number of bits to be coded by ATU-C transmitter onto the ith downstream subcarrier in $FEXT_R$ symbols; $g_i$ of Bitmap-$F_R$ indicates the scale factor that may be applied to the ith downstream subcarrier in $FEXT_R$ symbols, relative to the gain that was used for that carrier during the transmission of C-MEDLEY. Similarly, $b_i$ of Bitmap-$N_R$ indicates the number of bits onto the (i−NSC)th downstream carrier in $NEXT_R$ symbols; $g_i$ of Bitmap-$N_R$ indicates the scale factor that may be applied to the (i–NSC)th downstream carrier in NEXTR symbols. Because no bits or energy will be transmitted at DC or one-half the sampling rate, $b_0$, $g_0$, $b_{NSC}$, $g_{NSC}$, $b_{2*NSC}$, and $g_{2*NSC}$ are all presumed to be zero, and are not transmitted. Because subcarrier 64 is reserved as the pilot tone, $b_{64}$ and $b_{NSC+64}$, may be set to 0, $g_{64}$ and $g_{NSC+64}$ may be set to $g_{sync}$. The value $g_{sync}$ represents the gain scaling applied to the sync symbol.

The R-B&G information may be mapped in a (2*NSC−2)*16=16352-bit ((2*NSC−2)*2=2044 byte) message m defined by: m={$m_{(2*NSC-2)*16-1}$, $m_{(2*NSC-2)*16-2}$, . . . , $m_1$, $m_0$}={$g_{2*NSC-1}$, $b_{2*NSC-1}$, . . . , $g_{NSC+1}$, $b_{NSC+1}$, $g_{NSC-1}$, $b_{NSC-1}$, . . . , $g_1$, $b_1$}, with the MSB of $b_i$ and $g_i$ in the higher m index and $m_0$ being transmitted first. The message m may be transmitted in (2*NSC−2)*2=2044 symbols, using the transmission method as described in 10.9.8.

When Bitmap-$N_R$ is disabled (FEXT Bitmap mode), $b_i$ and $g_i$ of Bitmap-$N_R$ may be set to zero.

C.8.1.1 Bit Swap Request (Replaces 11.2.3)

The receiver may initiate a bit swap by sending a bit swap request to the transmitter via the AOC channel. This request informs the transmitter which subcarriers are to be modified. The format of the request is shown in Table C.8 of the G.992.1 specification (Table 7 below).

TABLE 7

Table C.8/G.992.1 - Format of the bit swap request message

| Message header | Message field 1-4 | | | |
|---|---|---|---|---|
| {11111111$_2$} (8 bits) | Bitmap index (1 bit) | Extension to Subchannel index (1 bits) | Command (6 bits) | Subchannel index (8 bits) |

The request comprises the nine bytes as follows:

an AOC message header consisting of 8 binary ones;

message fields 1-4, each of which consists of one-bit bitmap index, a seven-bit command followed by a related eight-bit subchannel index. One-bit bitmap index, a second bit is the extension to subchannel index and valid six-bit commands for the bit swap message may be as shown in Table C.9. In Table C.9, the MSB for the bit swap request command represents the Bitmap index. For downstream data, Bitmap index equals 0 indicates Bitmap-$F_R$, and Bitmap index equals 1 indicates Bitmap-$N_R$. Similarly for upstream data, Bitmap index equals 0 indicates Bitmap-$F_C$, and 1 indicates Bitmap-$N_C$. The eight-bit subchannel index is counted from low to high frequencies with the lowest frequency subcarrier having the number zero. The subcarrier index zero may not be used.

the bit swap between $FEXT_{C/R}$ symbols and $NEXT_{C/R}$ symbols is not allowed.

TABLE 8

Table I.9/G.992.1 - Bit swap request command

| Value (8 bit) | Interpretation |
|---|---|
| yz0000000$_2$ | Do nothing |
| yz0000001$_2$ | Increase the number of allocated bits by one |
| yz0000010$_2$ | Decrease the number of allocated bits by one |
| yz0000011$_2$ | Increase the transmitted power by 1 dB |
| yz0000100$_2$ | Increase the transmitted power by 2 dB |

TABLE 8-continued

Table I.9/G.992.1 - Bit swap request command

| Value (8 bit) | Interpretation |
|---|---|
| yz0000101$_2$ | Increase the transmitted power by 3 dB |
| yz0000110$_2$ | Reduce the transmitted power by 1 dB |
| yz0000111$_2$ | Reduce the transmitted power by 2 dB |
| yz001xxx$_2$ | Reserved for vendor discretionary commands |

NOTE y is "0" for $FEXT_{C/R}$ symbols, and "1" for $NEXT_{C/R}$ symbols of the Sliding Window.

z is the extension to subchannel index - The actual subchannel index is z * 256 + subchannex index.

The bit swap request message (i.e. header and message fields) is transmitted five consecutive times. To avoid $g_i$ divergence between ATU-C and ATU-R after several bit swaps, for a $g_i$ update of Δ dB the new $g_i$ value should be given by Equation 8:

$$g_i' = (1/512) \times \text{round}(512 \times g_i \times 10 \exp(\Delta/20)) \qquad \text{EQ. 8}$$

C.7.10.1 R-MSG-RA (Supplements 10.9.2)

Replace Table 10-15 of the Recommendation with Table 9 below.

TABLE 9

Table C.7/G.992.1 - Assignment of 80 bits of R-MSG-RA (Annex C)

| Suffix(ces) of $m_i$ (Note) | Parameter All reserved bits may be set to 0 |
|---|---|
| 79-69 | Reserved for ITU-T |
| 68 | Extension to number of tones carrying data (included) |
| 67-56 | $B_{\text{fast-max}}$ |
| 55-49 | Number of RS overhead bytes, (R) |
| 48-40 | Number of RS payload bytes, K |
| 39-32 | Number of tones carrying data (ncloaded) |
| 31-25 | Estimated average loop attenuation |
| 24-21 | Coding gain |
| 20-16 | Performance margin with selected rate option |
| 15-14 | Reserved for ITU-T |
| 13-12 | Maximum Interleave Depth |
| 11-0 | Total number of bits per DMT symbol, $B_{\max}$ |

NOTE

Within the separate fields the least significant bits have the lowest subscripts.

In accordance with yet another embodiment of the present invention, the spectral compatibility and performance of G.992.1 Annex A systems operating with overlapped spectra (AOL) is described in the Japan access network. The benefit of the overlapped spectrum is the increase in downstream performance when compared to the non-overlapped case in Annex A. Spectral compatibility simulations, using a TTC compliant simulator, show that systems implementing A.X using the full overlap mask defined in G.992.1 Annex A can be deployed up to 1.5 km and maintain spectral compatibility with the First Group systems deployed in the same quadrant. Systems deployed using a spectrally shaped overlap mask can be deployed up to 2.0 km and maintain spectral compatibility with First Group systems when deployed in the same quadrant. The shaped overlap Annex A mask is identical to that used for XOL and XDD systems for C.X. This same shaped overlap mask is spectrally compatible with Annex C DBM up to 4.5 km when deployed in the same quadrant. The family of overlap and shaped overlap masks for Annex A are referred to as A.X.

Annex A systems using full overlap spectrum (AOL) may utilize a G.992.1 mode that allows significant rate increases, especially at small ranges where the upstream bandwidth may accommodate higher bit loading. AOL systems thus may be used for providing high speed Annex A in Japan (e.g., 12 Mbits/s rate services). Provided below are spectral compatibility simulation results that show AOL systems to be spectrally compatible with First Group systems in the Japan network when deployed in the same quadrant up to 1.5 km. First group systems are identified as Annex A (non-overlapped mask), Annex C DBM, Annex C FBM and TCM-ISDN. With additional spectral shaping, the spectral compatibility with Annex C FBM may be improved such that may be deployed up to 2 km in the same quad with First Group systems. The family of overlap and shaped overlap masks for Annex A are referred to as A.X. Shaping may be optimized within the TTC original criterion based on 24 interferers in the same Quad, or within the field criterion based on only one intra-quad interferer.

Figure 4:
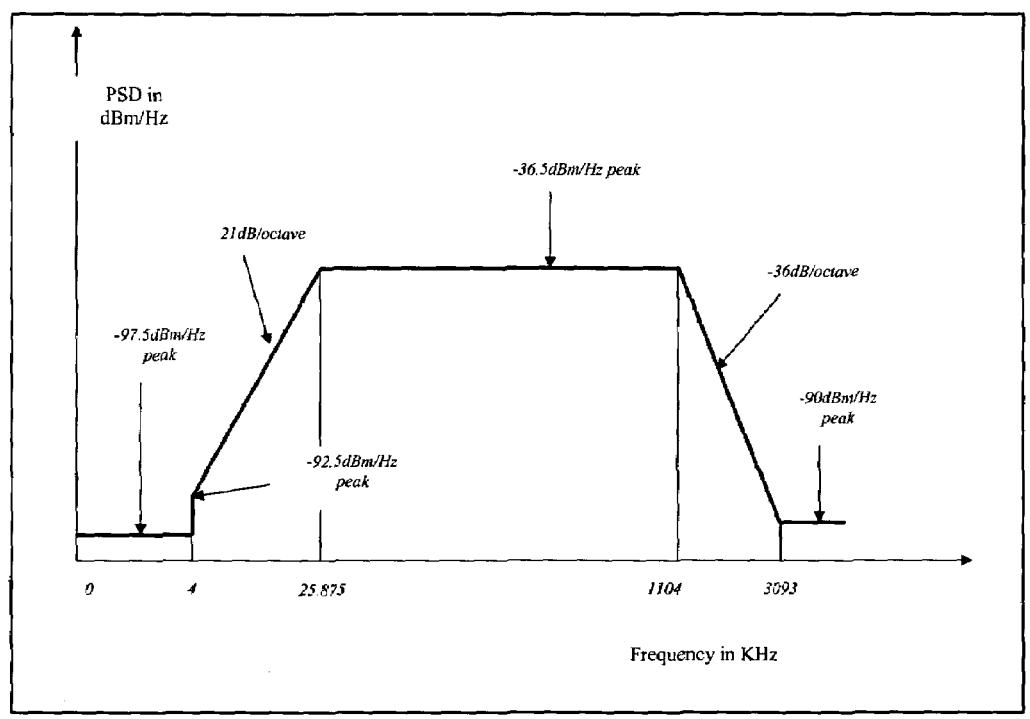
FIG. 4 illustrates an AOL downstream spectral mask.

The current Annex AOL downstream spectral mask is defined in G.992.1, Annex A, section A1.2, and described here in FIG. 4 and Equation 9. The ADSL overlap mask extends the usual downstream bandwidth down to the POTS band (25.875 KHz). Note that unless otherwise stated, the PSD mask associated with a spectrum management class, as defined in FIG. 4 above and Equation 9 below, preferably is equal to the PSD template plus 3.5 dB. Equation 8 provides an explicit form of the ITU ADSL_OL PSD template that matches the mask used for DBMOL downstream transmissions. Table 10 provides explicit attenuation and levels of DBMOL downstream spectral mask.

$$PSD_{ADSL\_OL,ds\text{-}Disturber} = K_{ADSL\_OL,ds} \cdot \frac{2}{f_0} \cdot \frac{\left[\sin\left(\pi \frac{f}{f_0}\right)\right]^2}{\left(\pi \frac{f}{f_0}\right)^2} \cdot$$

$$\frac{1}{1+\left(\frac{f}{f_{LP3dB}}\right)^{12}} \cdot \frac{1}{1+\left(\frac{f_{HP3dB}}{f}\right)^8}, \; 0 < f < \infty \quad \text{EQ. 9}$$

$f$: [Hz]

$f_0 = 2.208 \times 10^6$ [Hz], $f_{LP3dB} = \frac{f_0}{2}$ (G.992.1), $f_{HP3dB} = 25.875 \times 10^3$ [Hz], $K_{ADSL\_OL,ds} = 0.1104$ [W]

TABLE 10

| Frequency f(KHz) | PSD (dBm/Hz) Peak values |
|---|---|
| 0 < f < 4 | −97.5 dBm/Hz peak |
| 4 < f < 25.875 | −92.5 + 21 log$_2$(f/4) |
| 25.875 < f < 1104 | −36.5 dBm/Hz peak |
| 1104 < f < 3093 | −36.5 − 36 log$_2$(f/1104) |
| 3093 < f | −90 dBm/Hz |

The Annex A shaped overlap (AsOL) mask is defined by Equation 10 below. Note that this preferably is the same shaped overlap mask as defined for XOL and XDD systems.

$$PSD_{AsOL,ds\text{-}Disturber} = K_{ADSL\_OL,ds} \cdot \frac{2}{f_0} \cdot \frac{\left[\sin\left(\pi \frac{f}{f_0}\right)\right]^2}{\left(\pi \frac{f}{f_0}\right)^2} \cdot$$

$$\frac{1}{1+\left(\frac{f}{f_{LP3dB}}\right)^{12}} \cdot \frac{1}{1+\left(\frac{f_{HP3dB}}{f}\right)^6}, \; 0 < f < \infty \quad \text{EQ. 10}$$

$f$: [Hz]

$f_0 = 2.208 \times 10^6$ [Hz], $f_{LP3dB} = \frac{f_0}{2}$ (G.992.1), $f_{HP3dB} = 130 \times 10^3$ [Hz], $K_{ADSL\_OL,ds} = 0.1104$ [W]

A.X Spectral Compatibility Results:

Spectral Compatibility Scenario 1: 24 Intra-Quad Interferers (A.X$_{24}$):

The spectral compatibility simulations were done according to TTC specifications (TTC standard JJ10001) and the SEI contribution T465-9-13. Table 11 (FIG. 5) and Table 12 (FIG. 6) depict the spectral compatibility of the A.X systems into First Group systems when a 24 Intra-Quad Interferers are assumed. Note that for loop distances up to 1.5 km the AOL mask preferably is used; for distances greater than 1.5 km, the AsOL mask preferably is used. The entries in Tables 11 and 12 are bit rates expressed in kbps for various 0.4 mm paper Japanese loops. Table 11 and 11 respectively show the spectral compatibility of A.X with First Group systems operating in G992.1 (full rate) and G992.2 (lite) modes. TCM-ISDN values are identical in both modes. The shaded columns refer to the reference values as given in the SEI contribution T465-9-13 (Table 2). The white columns refer to the spectral compatibility of the A.X$_{24}$. The light shaded entries underline the failure to ensure the spectral compatibility.

The results of Tables 11 and 12 show that AOL is spectrally compatible with First Group systems when deployed in the same quad up to 1.5 km. AsOL is spectrally compatible with First Group systems when deployed in the same quad up to 2.0 km. Spectral compatibility is this respect is defined where the computed bit rate is equal to or greater than the performance reference value.

Spectral Compatibility Scenario 2:1 Intra-Quad Interferer (A.X$_1$):

Table 13 (FIG. 7) depicts the spectral compatibility of the A.X into First Group systems for the case when Intra-Quad Interferer is assumed (A.X$_1$). Note that for loop distances up to 1.5 km the AOL mask is used; for distances greater than 1.5 km, the AsOL mask is used. All the values in Table 12 are expressed in kbps for 0.4 mm paper Japanese loops. Table 13 shows the spectral compatibility of A.X with First Group systems operating in G992.1 (full rate) mode. The dark shaded columns refer to the reference values as given in Table 2 of the SEI contribution T465-9-13. The white columns refer to the spectral compatibility of the A.X$_1$. The light shaded entries underline the failure to ensure the spectral compatibility. The results of Table 13 show that AsOL is spectrally compatible with First Group systems when deployed in the same quadrant up to 4.25 km.

The reach of Annex A with shaped spectral overlap (AsOL) typically is limited by TCM-ISDN to a maximum distance of about 3.5 km. When deployed up to 3.5 km, AsOL is spectrally compatible with the downstream channels of all the First Group systems. In the presence of 24 intra-quad crosstalk disturbers from AsOL, Annex C FBM has a very small degradation in bit rate relative to the performance reference value. The quality of service in the upstream channel Annex C FBM at a distance of 3.25 km is 192 kilobits per second (kb/s), which is of relatively satisfactory quality when considering the absolute value of the service. If the ratio of downstream channel bit rate to the upstream channel bit rate (see Table 14 below) is considered, it can be observed that the ratios for the computed Annex C FBM values are comparable to those of the performance reference values for CDBM and Annex A. Given that there is only a small deviation from the performance reference value of Annex C FBM mode, consideration should be given to allow deployment of AsOL systems up to is the performance limiting bound of 3.5 km.

TABLE 14

Ratios of downstream bit rate to upstream bit rate.

| A 992.1 | | CDBM992.1 | | CFBM992.1 | |
|---|---|---|---|---|---|
| Ref | table | Ref | table | Ref | table |
| 6.8 | 8.1 | 7.3 | 8.1 | 8.7 | 8.7 |
| 4.8 | 7.9 | 6.0 | 7.9 | 8.4 | 8.4 |
| 3.0 | 7.4 | 4.8 | 7.4 | 7.9 | 7.9 |
| 2.0 | 7.2 | 4.1 | 7.2 | 7.7 | 7.7 |
| 1.4 | 7.3 | 3.8 | 7.3 | 7.4 | 7.4 |
| 1.0 | 6.9 | 3.5 | 6.9 | 7.1 | 7.1 |
| 0.7 | 6.9 | 3.3 | 6.9 | 6.8 | 6.8 |
| 0.4 | 6.7 | 3.1 | 6.7 | 6.2 | 7.0 |
| 0.2 | 6.0 | 2.9 | 6.0 | 5.3 | 6.0 |
| 0.1 | 5.1 | 2.5 | 5.1 | 4.9 | 5.6 |
| 0.0 | 4.6 | 2.3 | 4.6 | 4.0 | 4.6 |
| 0.0 | 3.9 | 2.1 | 3.9 | 3.3 | 4.3 |
| 0.0 | 3.5 | 1.9 | 3.5 | 2.9 | 3.3 |
| 0.0 | 3.1 | 1.6 | 3.1 | 2.3 | 3.2 |
| 0.0 | 2.5 | 1.3 | 2.5 | 1.7 | 2.4 |
| 0.0 | 1.9 | 1.2 | 1.9 | 1.3 | 2.0 |
| 0.0 | 1.4 | 0.9 | 1.4 | 0.8 | 1.3 |
| 0.0 | 0.9 | 0.7 | 0.9 | 0.5 | 1.0 |
| 0.0 | 0.4 | 0.4 | 0.4 | 0.2 | 0.3 |

The experimental set up is the following: the bit procedure allocation limits the number of allocated bits to fourteen and does not consider any loading below two bits. The coding gain provided by the channel coding scheme is equal to 5 dB. No echo impairment is assumed.

$A.X_{24}$, AOL & Annex A (24 Intra-Quad Interferers Scenario):

Table 15 shows the performances of Annex A, AOL, and $A.X_{24}$ in the presence of −140 dBm/Hz background noise. Note that $A.X_{24}$ represents the use of mask AOL for loop distances up to 1.5 km and mask AxOL for distances greater than 1.5 km.

Table 16 shows the performances of Annex A, AOL, and $A.X_{24}$ in the presence of worst case 24 disturber First Group systems. Note that $A.X_{24}$ represents the use of mask AOL for loop distances up to 1.5 km and mask AxOL for distances greater than 1.5 km.

TABLE 15

| loop (km) | A | AOL | $A.X_{24}$ |
|---|---|---|---|
| 0.5 | 12416 | 13920 | 13920 |
| 0.75 | 12416 | 13920 | 13920 |
| 1 | 12416 | 13920 | 13920 |
| 1.25 | 12384 | 13888 | 13888 |
| 1.5 | 11936 | 13440 | 13440 |
| 1.75 | 11072 | 12608 | 12576 |
| 2 | 9952 | 11456 | 11424 |

TABLE 16

| loop (km) | A | AOL | $A.X_{24}$ |
|---|---|---|---|
| 0.5 | 7360 | 8576 | 8576 |
| 0.75 | 6400 | 7456 | 7456 |
| 1 | 4768 | 5728 | 5728 |
| 1.25 | 3168 | 4064 | 4064 |
| 1.5 | 2048 | 2848 | 2848 |
| 1.75 | 1344 | 2048 | 1504 |
| 2 | 736 | 1344 | 768 |

$A.X_1$ & Annex A (1 Intra-Quad Interferers Scenario):

Table 17 shows typical performances of Annex A and AOL in the presence of −140 dBm/Hz background noise. Table 18 shows typical performances of Annex A and AOL in the presence of worst case 24 disturber First Group systems. Note that $A.X1$ is the same as AOL.

TABLE 17

Performance of AOL &Annex A in AWGN noise environment.

| loop (km) | A | $A.X_1$ |
|---|---|---|
| 0.5 | 12416 | 13920 |
| 0.75 | 12416 | 13920 |
| 1 | 12416 | 13920 |
| 1.25 | 12384 | 13888 |
| 1.5 | 11936 | 13440 |
| 1.75 | 11072 | 12608 |
| 2 | 9952 | 11456 |

TABLE 18

Performance of $A.X_1$ &Annex A in First Group noise environment.

| loop (km) | A | $A.X_1$ |
|---|---|---|
| 0.5 | 9760 | 11232 |
| 0.75 | 8608 | 9920 |
| 1 | 7040 | 8256 |
| 1.25 | 5440 | 6592 |
| 1.5 | 3776 | 4864 |
| 1.75 | 2656 | 3648 |
| 2 | 1728 | 2624 |

Spectral compatibility simulations, using a TTC compliant simulator, have shown that systems implementing A.X using the full overlap mask defined in G.992.1 Annex A can be deployed up to 1.5 km and maintain spectral compatibility with the First Group systems deployed in the same quadrant. Systems deployed using a spectrally shaped overlap mask can be deployed up to 2.0 km and maintain spectral compatibility with First Group systems when deployed in the same quadrant. The shaped overlap Annex A mask is identical to that used for XOL and XDD systems for C.X. This same shaped overlap mask is spectrally compatible with Annex C DBM up to 4.5 km when deployed in the same quadrant. The family of overlap and shaped overlap masks for Annex A are herein referred to as A.X.

Method and System for Extended ADSL Downstream Spectrum and Rate in G.992.1 and Annexes:

The method and system described below relates to providing enhanced performance in extending downstream spectrum compliance and compatibility and enhanced data rate in G.992.1 and annexes applications, such as DSL. Specifically, the method and system provide for 2.208 MHz band ADSL extended spectrum that operates in the same cable bundle as TCM-ISDN. At least one embodiment of the present invention provides an arrangement to enable G992.1 Annex C to support 512 subcarriers in downstream.

G.dmt Annex C standard currently supports downstream bandwidth of 1.104 MHz. The present invention provides for the extension of the bandwidth to 2.208 MHz by defining NSC=512 as the number of downstream sub channels. In considering the present state of the G.992.1 Annex C, all references to the absolute number for the downstream sub channels may be optimally replaced by a function of NSC as set forth below. For instance, one could replace all references in Annex C to the absolute number for the downstream sub channels with the function of NSC as detailed below:

Data Subcarriers (Modifies 7.11.1.1—of G.992.1)

The channel analysis signal defined in 10.6.6 allows for a maximum of NSC−1 carriers (at frequencies nΔf, n=1 to NSC−1) to be used.

Nyquist Frequency (Modifies 7.11.1.3)

The carrier at the Nyquist frequency (#NSC) preferably is not be used for user data and may be real valued; other possible uses are for further study.

Modulation by the Inverse Discrete Fourier Transform (Replaces 7.11.2)

The modulating transform defines the relationship between the 2*NSC real values $x_n$ and the $Z_i$:

$$x_n = \sum_{i=0}^{2*NSC-1} \exp\left(\frac{j\pi ni}{NSC}\right) Z_i \quad \text{for } n = 0 \text{ to } 2*NSC - 1 \qquad \text{EQ. 11}$$

The constellation encoder and gain scaling generate only NSC−1 complex values of $Z_i$. In order to generate real values of $x_n$, the input values (NSC−1 complex values plus zero at DC and one real value for Nyquist if used) may be augmented so that the vector Z has Hermitian symmetry. That is, $$Z_i = \text{conj}(Z'_{2*NSC-i}) \text{ for } i=NSC+1 \text{ to } 2*NSC-1 \qquad \text{EQ. 12}$$

Synchronization Symbol (Modifies 7.11.3)

The synchronization symbol permits recovery of the frame boundary after micro-interruptions that might otherwise force retraining.

The data symbol rate, $f_{symb}$=4 kHz, the carrier separation, Δf=4.3125 kHz, and the IDFT size, N=2*NSC, are such that a cyclic prefix of 5/64*NSC samples could be used. That is, $$(2+5/64) \times NSC \times 4.0 = 2*NSC \times 4.3125 \qquad \text{EQ. 13}$$

The cyclic prefix, however, is shortened to 1/8*NSC samples, and a synchronization symbol (with a nominal length of (2+1/8)×NSC samples) is inserted after every 68 data symbols. That is, $$(2+1/8) \times NSC \times 69 = (2+5/64) \times NSC \times 68 \qquad \text{EQ. 14}$$

The data pattern used in the synchronization symbol is the pseudo-random sequence PRD, ($d_n$, for n=1 to 2*NSC) defined by:

$$d_n = 1 \quad \text{for } n = 1 \text{ to } 9 \qquad \text{EQ. 15}$$

$$d_n = d_{n-4} \oplus d_{n-9} \quad \text{for } n = 10 \text{ to } 2*NSC$$

The first pair of bits ($d_1$ and $d_2$) may be used for the DC and Nyquist subcarriers (the power assigned to them is zero, so the bits are effectively ignored); the first and second bits of subsequent pairs are then used to define the $X_i$ and $Y_i$ for i=1 to NSC−1 as shown in Table 7-13 of G.992.1.

The period of the PRD is only 511 bits, so $d_{512}$ maybe equal to $d_1$. The $d_1$-$d_9$ may be re-initialized for each synchronization symbol, so each symbol uses the same data. The two bits that modulate the pilot carrier, may be overwritten by {0,0}: generating the {+,+} constellation.

The minimum set of subcarriers to be used is the set used for data transmission (i.e. those for which $b_i$>0); subcarriers for which $b_i$=0 may be used at a reduced. PSD as defined in transmit PSD paragraphs of Annexes A, B and C. The data modulated onto each subcarrier may be as defined above; it may not depend on which subcarriers are used.

Cyclic Prefix (Replaces 7.12)

The last 1/8*NSC samples of the output of the IDFT ($x_N$ for n=2*NSC−1/8*NSC to 2*NSC−1) may be prepended to the block of 2*NSC samples and read out to the digital-to-analogue converter (DAC) in sequence. For example, when NSC=256, the subscripts, n, of the DAC samples in sequence are 480 . . . 511, 0 . . . 511.

The cyclic prefix may be used for all symbols beginning with the C-RATES1 segment of the initialization sequence, as defined in 10.6.2.

C-REVERB1 (Replaces 10.4.5)

C-REVERB1 is a signal that allows the ATU-C and ATU-R receiver to adjust its automatic gain control (AGC) to an appropriate level. The data pattern used in C-REVERB1 may be the pseudo-random downstream sequence (PRD), $d_n$, for n=1 to 2*NSC, defined in 7.11.3 and repeated here for convenience:

$$d_n=1 \text{ for n=to 9}$$

$$d_n=d_{n-4} \oplus d_{n-9} \text{ for } n=10 \text{ to } 2*NSC$$

The bits may be used as follows: the first pair of bits ($d_1$ and $d_2$) is used for the DC and Nyquist subcarriers (the power assigned to them is, of course, zero, so the bits are effectively ignored); then the first and second bits of subsequent pairs are used to define the $X_i$ and $Y_i$ for i=1 to NSC−1 as defined in Table 7-13 of G.992.1. The period of PRD is only 511 bits, so $d_{512}$ may be equal to $d_1$. The bits $d_1$ to $d_9$ may be re-initialized for each symbol, so each symbol of C-REVERB1 is identical.

The two bits that modulate the pilot carrier may be overwritten by {0,0}: generating the {+,+} constellation.

The duration of C-REVERB1 is 512 (repeating) symbols without cyclic prefix.

Note: When NSC=512, the PRD has to generate 1024 bit which is two periods of the PRD. Since only the first period of the PRD is initialize with ones for n=1 to 9 the second period will be completely random compare to the first period of the PRD there for the 9 bit PRD generator is sufficient for generating the signals with NSC=512.

R-B&G (Replaces 10.9.14)

The purpose of R-B&G is to transmit to ATU-C the bits and gains information, Bitmap-$F_R$ {$b_1$, $g_1$, $b_2$, $g_2$, ..., $b_{NSC-1}$, $g_{NSC-1}$}, and Bitmap-$N_R$ {$b_{NSC+1}$, $g_{NSC+1}$, $b_{NSC+2}$, $g_{NSC+2}$, ..., $b_{2*NSC-1}$, $g_{2*NSC-1}$}, to be used on the downstream subcarriers. $b_i$ of Bitmap-$F_R$ indicates the number of bits to be coded by ATU-C transmitter onto the ith downstream subcarrier in $FEXT_R$ symbols; $g_i$ of Bitmap-$F_R$ indicates the scale factor that may be applied to the ith downstream subcarrier in $FEXT_R$ symbols, relative to the gain that was used for that carrier during the transmission of C-MEDLEY. Similarly, $b_i$ of Bitmap-$N_R$ indicates the number of bits onto the (i−NSC)th downstream carrier in $NEXT_R$ symbols; $g_i$ of Bitmap-$N_R$ indicates the scale factor that may be applied to the (i−NSC)th downstream carrier in $NEXT_R$ symbols. Because no bits or energy will be transmitted at DC or one-half the sampling rate, $b_0$, $g_0$, $b_{NSC}$, $g_{NSC}$, $b_{2*NSC}$, and $g_{2*NSC}$ are all presumed to be zero, and are not transmitted. Because subcarrier 64 is reserved as the pilot tone, $b_{64}$ and $b_{NSC+64}$, may be set to 0, $g_{64}$ and $g_{NSC+64}$ may be set to $g_{sync}$. The value $g_{sync}$ represents the gain scaling applied to the sync symbol.

The R-B&G information may be mapped in a (2*NSC−2)*16=16352-bit ((2*NSC−2)*2=2044 byte) message m defined by:

$$m = \{m_{(2*NSC-2)*16-1}, m_{(2*NSC-2)*16-2}, \ldots, m_1,$$
$$m_0\} = \{g_{2*NSC-1}, b_{2*NSC-1}, \ldots, g_{NSC+1}, b_{NSC+1},$$
$$g_{NSC-1}, b_{NSC-1}, g_1, b_1\} \quad \text{EQ. 16}$$

with the MSB of $b_i$ and $g_i$ in the higher m index and $m_0$ being transmitted first. The message m may be transmitted in (2*NSC−2)*2=2044 symbols, using the transmission method as described in 10.9.8. When Bitmap-$N_R$ is disabled (FEXT Bitmap mode), $b_i$ and $g_i$ of Bitmap-$N_R$ may be set to zero.

One aspect to this is AOC online adaptation and reconfiguration. Bit swap request (replaces 11.2.3), is addressed as follows. The receiver initiates a bit swap by sending a bit swap request to the transmitter via the AOC channel. This request tells the transmitter which subcarriers are to be modified. The format of the request is shown in Table 19.

TABLE 19

G.992.1 - Format of the bit swap request message

| Message header | Message field 1-4 | | | |
|---|---|---|---|---|
| {11111111$_2$} (8 bits) | Bitmap index (1 bit) | Extension to Subchannel index (1 bits) | Command (6 bits) | Subchannel index (8 bits) |

The request may comprise nine bytes as follows:
an AOC message header consisting of 8 binary ones;
message fields 1-4, each of which consists of one-bit bitmap index, a seven-bit command followed by a related eight-bit subchannel index. One-bit bitmap index, a second bit is the extension to subchannel index and valid six-bit commands for the bit swap message may be as shown in Table 24. In Table 24, the MSB for the bit swap request command represents the Bitmap index. For downstream data, that the Bitmap index equals 0 indicates Bitmap-$F_R$, and Bitmap index equals 1 indicates Bitmap-$N_R$. Similarly for upstream data, Bitmap index equals 0 indicates Bitmap-$F_C$, and 1 indicates Bitmap-$N_C$. The eight-bit subchannel index is counted from low to high frequencies with the lowest frequency subcarrier having the number zero. The subcarrier index zero may not be used.

the bit swap between $FEXT_{C/R}$ symbols and $NEXT_{C/R}$ symbols is not allowed.

TABLE 20

G.992.1 - Bit swap request command

| Value (8 bit) | Interpretation |
|---|---|
| yz0000000$_2$ | Do nothing |
| yz0000001$_2$ | Increase the number of allocated bits by one |
| yz0000010$_2$ | Decrease the number of allocated bits by one |
| yz0000011$_2$ | Increase the transmitted power by 1 dB |
| yz0000100$_2$ | Increase the transmitted power by 2 dB |
| yz0000101$_2$ | Increase the transmitted power by 3 dB |
| yz0000110$_2$ | Reduce the transmitted power by 1 dB |
| yz0000111$_2$ | Reduce the transmitted power by 2 dB |
| yz001xxx$_2$ | Reserved for vendor discretionary commands |

NOTE
y is "0" for $FEXT_{C/R}$ symbols, and "1" for $NEXT_{C/R}$ symbols of the Sliding Window.
z is the extension to subchannel index - The actual subchannel index is z * 256 + subchannex index.

The bit swap request message (i.e. header and message fields) may be transmitted five consecutive times. To avoid $g_i$ divergence between ATU-C and ATU-R after several bit swaps, for a $g_i$ update of Δ dB the new $g_i$ value should be given by:

$$g_i' = (1/512) \times \text{round}(512 \times g_i \times 10 \exp(\Delta/20)) \quad \text{EQ. 17}$$

Modifying R-MSG-RA exchange state supports up to 511 tones carrying data and maximum rate supported for dual latency increased to 24480 Kbps.

R-MSG-RA (Supplements 10.9.2)
Replace Table 10-15 with Table 21.

TABLE 21

G.992.1 - Assignment of 80 bits of R-MSG-RA (Annex C)

| Suffix(ces) of $m_i$ (Note) | Parameter All reserved bits may be set to 0 |
|---|---|
| 79-69 | Reserved for ITU-T |
| 68 | Extension to number of tones carrying data (ncloaded) |
| 67-56 | $B_{fast-max}$ |
| 55-49 | Number of RS overhead bytes, (R) |
| 48-40 | Number of RS payload bytes, K |
| 39-32 | Number of tones carrying data (ncloaded) |
| 31-25 | Estimated average loop attenuation |
| 24-21 | Coding gain |
| 20-16 | Performance margin with selected rate option |
| 15-14 | Reserved for ITU-T |
| 13-12 | Maximum Interleave Depth |
| 11-0 | Total number of bits per DMT symbol, $B_{max}$ |

NOTE
Within the separate fields the least significant bits have the lowest subscripts.

The embodiment of the present invention as described above provides necessary changes to Annex C to G992.1, for ADSL extended spectrum that will cover 2.208 MHz band, and will operate in the same cable bundle as TCM-ISDN.

Based on the suggested changes to Annex C to G992.1 for 2.208 MHz, ADSL extended spectrum that operates in the same cable bundle as TCM-ISDN allows overlap mode of operation between downstream and upstream. This aspect of the present invention provides performance gain that can be achieved for downstream rates when using overlapped mode of operation as compared to non-overlapped mode. The overlapped mode of operation is part of the suggested 2.208 MHz ADSL extended spectrum that operates in the same cable bundle as TCM-ISDN.

Figure 8:
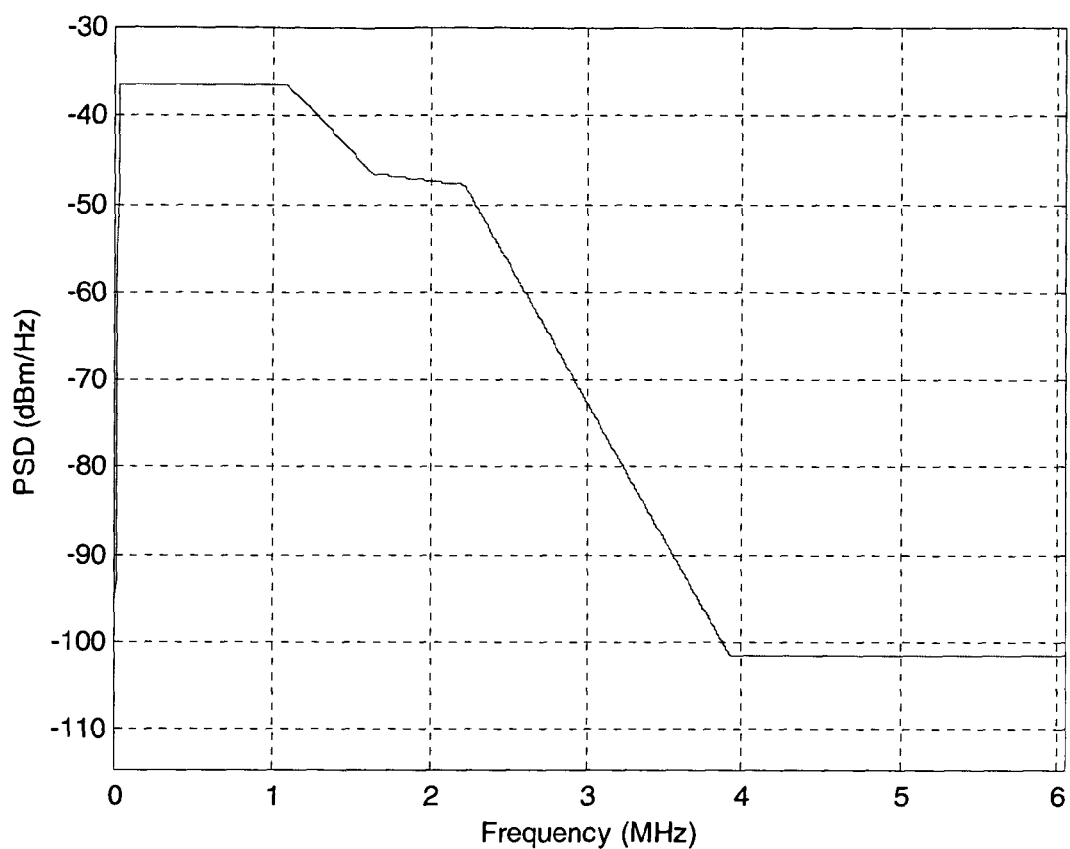
FIG. 8 depicts the use of the ADSL+ overlapped mode PSD mask for CO deployment.

To establish the performance gain of the invention, simulations were run for 2.208 MHz bandwidth system using DBM mode with the following configuration parameters:

ADSL+PSD Mask:
  The use of the ADSL+ overlapped mode PSD mask for CO deployment of FIG. 8
  Total power: 21.25 dBm
  Margin=6 dB
  SNR Gap=9.75 dB
  Coding gain=5 dB (assuming Trellis+RS coding)
  White noise power=−140 dBm/Hz
  0.4 mm paper cable loop
  Noise: 24 TCM ISDN noise+20 SELF NEXT+20 SELF FEXT
  Start bin for overlapped mode −6
  Start bin for overlapped mode −32
  Dual bit map calculation method: Cfext*126/340+Cnext*214/340

Figure 9:
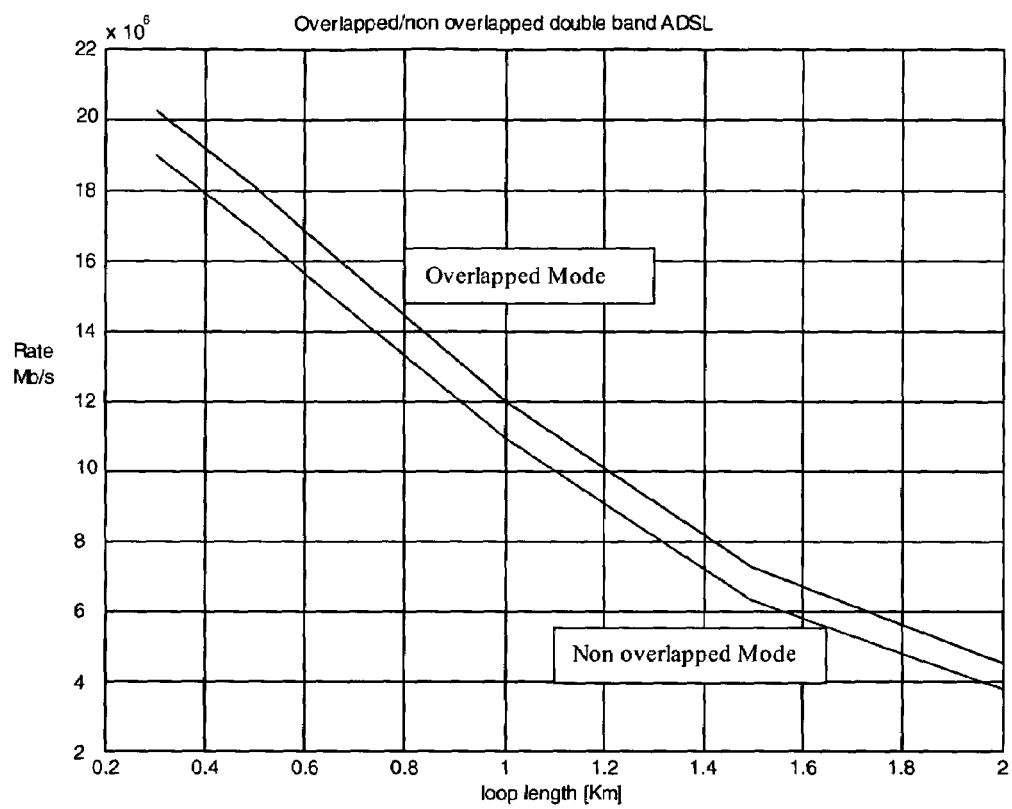
FIG. 9 illustrates the performance of 2.208 MHz band ADSL extended spectrum operating in the same bundle as TCM-ISDN.

FIG. 9 illustrates the performance of 2.208 MHz band ADSL extended spectrum operating in the same bundle as TCM-ISDN. As can be seen from FIG. 9, the overlapped mode improves the system performance, in the downstream direction by at least 1 Mbps.

PSD Mask for ADSL+:
Another aspect of the present invention provides a PSD mask for use in ADSL+ assuming an implementation with 512 carriers. In one embodiment, PSD masks are used for operation over POTS and over ISDN. In addition, a PSD for CO deployments and a separate PSD for remote terminal deployments may be employed. This inventive embodiment contemplates PSD mask definitions for use in ADSL+ assuming an implementation with 512 carriers. In addition, the present invention uses definition of separate PSD masks for CO deployments and remote terminal deployments.

For ADSL+ operation over POTS, a mask is defined with the downstream mask overlapped with the upstream and a non-overlapped mask. Further overlapped and non-overlapped masks are defined for central office deployments and for remote terminal deployments. Further masks for ADSL+ operation over POTS are defined.

For ADSL+ operation over ISDN, non-overlapped masks are preferred. As with ADSL over POTS, a mask for deployment from the CO and another for deployment from the cabinet.

ADSL+ Over POTS PSD:
PSD masks for ADSL+ operation over POTS are defined in the following. Note that in these cases, the corresponding template is 3.5 dB lower than the mask. Masks are defined for overlap mode, non-overlapped (FDM) mode, CO deployment, and Cabinet deployment.

Figure 10:
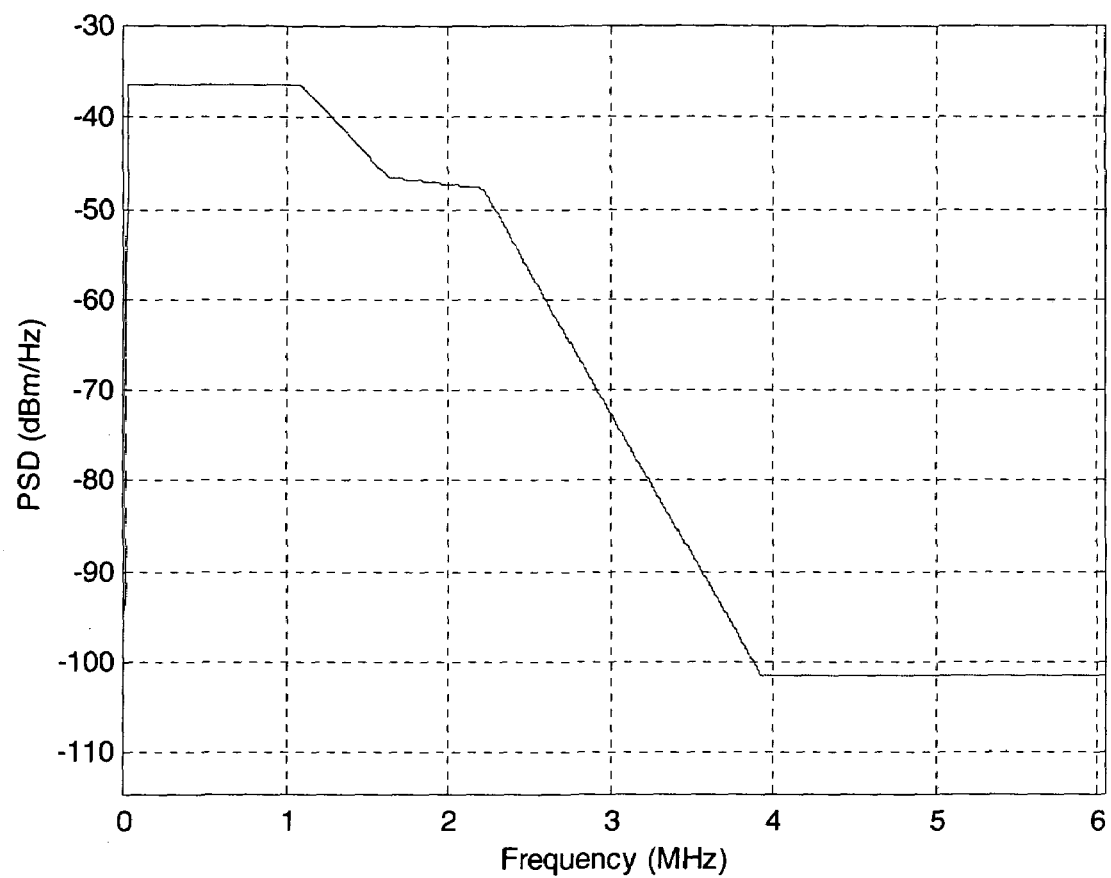
FIG. 10 depicts an overlapped ADSL+PSD mask for CO deployment.
Figure 11:
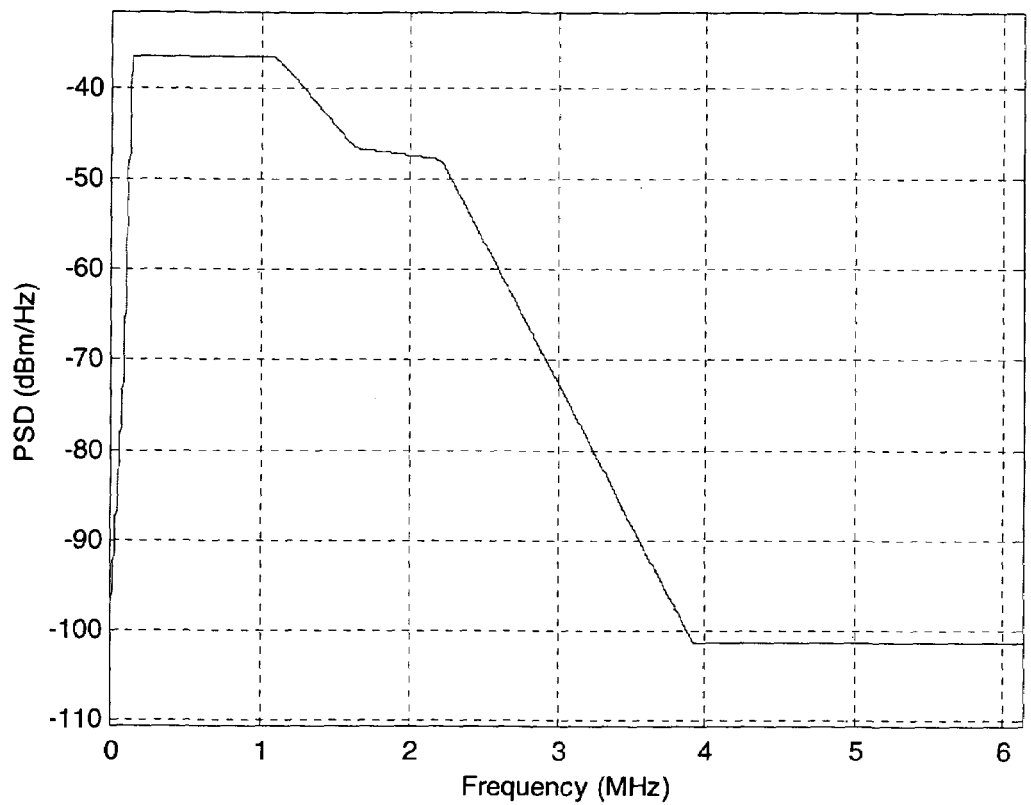
FIG. 11 depicts a non-overlapped ADSL+PSD mask for CO deployment

Deployment from CO:
With ADSL+ deployed from the CO, the PSD mask follows that of CO Mask 2 from T1.424/Trial-Use up to the maximum in band frequency of 2.208 MHz. Table 22 lists the preferred approximate breakpoints for the overlapped ADSL+PSD Mask for CO deployment derived from CO Mask 2 of T1.424/Trial-Use. The mask is plotted in FIG. 10. The maximum power for this mode of operation may be established, it may be fixed or adaptively determined. Table 23 lists the preferred approximate breakpoints for the non-overlapped ADSL+PSD Mask for CO deployment. The mask is plotted in FIG. 11. The maximum power for this mode of operation may be established, it may be fixed or it may be adaptively determined.

TABLE 22

ADSL+ Over POTS PSD for CO Deployment (Overlap Mode)

| Frequency (kHz) | Mask (dBm/Hz) |
| --- | --- |
| 0 | −97.5 |
| 4 | −97.5 |
| 4 | −92.5 |
| 25 | −36.5 |
| 1104 | −36.5 |
| 2208 | −46.5 |
| 39.25 | −101.5 |
| 8500 | −101.5 |
| 8500 | −103.5 |
| 11040 | −103.5 |

TABLE 23

ADSL+ Over POTS PSD for CO Deployment (Non-overlapped Mode)

| Frequency (kHz) | Mask (dBm/Hz) |
| --- | --- |
| 0 | −97.5 |
| 4 | −97.5 |
| 80 | −72.5 |
| 138 | −36.5 |
| 1104 | −36.5 |
| 2208 | −46.5 |
| 39.25 | −101.5 |
| 8500 | −101.5 |
| 8500 | −103.5 |
| 11040 | −103.5 |

Deployment from the Cabinet
When ADSL+ is deployed from a Cabinet, the PSD preferably follows that of Cabinet Mask 2 from T1.424/Trial-Use up to the maximum in band frequency of 2.208 MHz.

Figure 12:
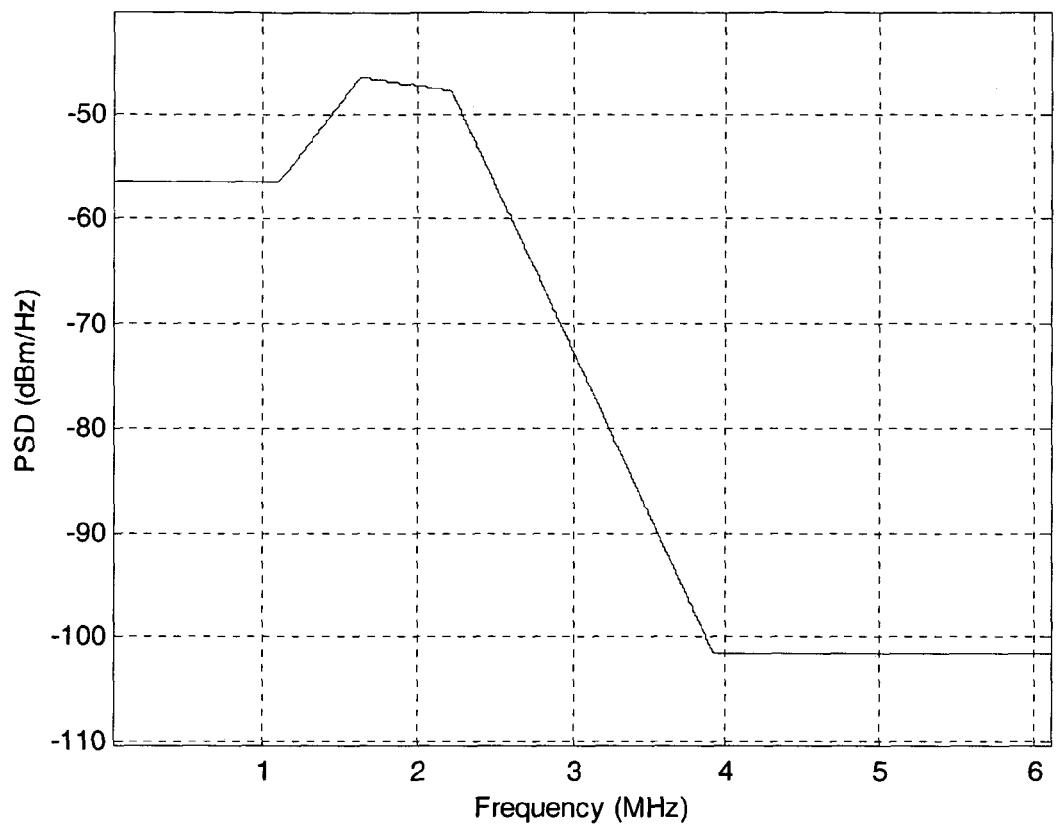
FIG. 12 depicts an ADSL+ Over POTS PSD mask for CO deployment in non-overlapped mode.

Table 24 lists the preferred approximate breakpoints for the overlapped ADSL+PSD Mask for Cabinet deployment. The corresponding PSD mask is plotted in FIG. 12. The maximum power for this mode of operation may be established, it may be fixed or it may be adaptively determined.

Figure 13:
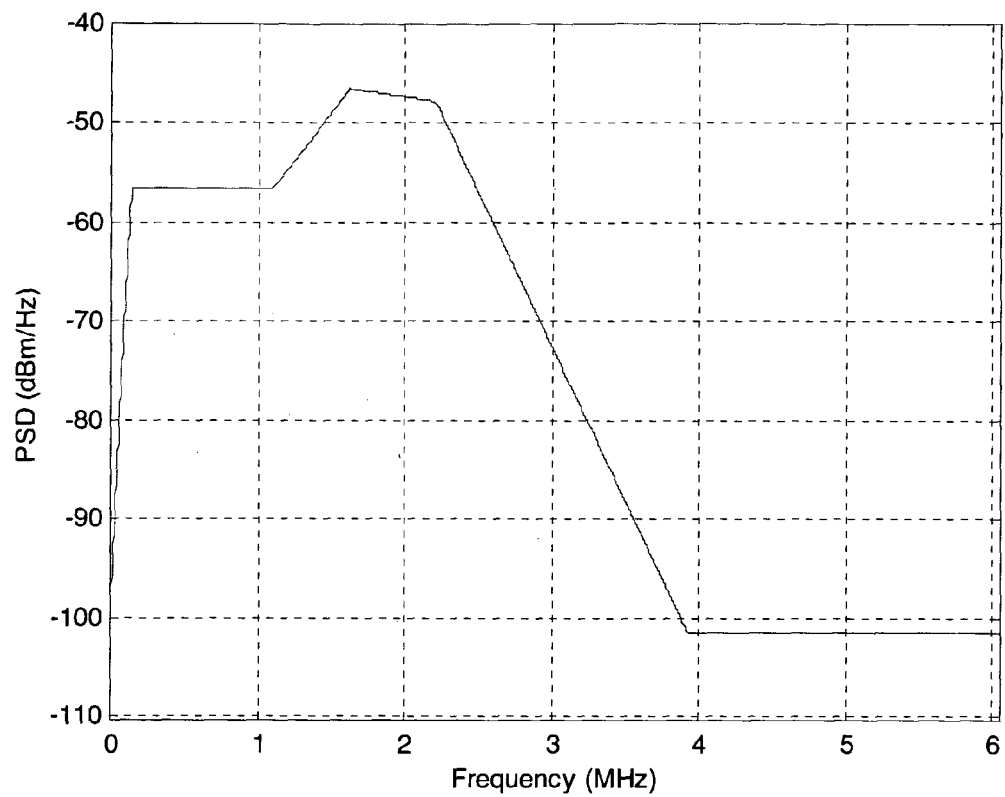
FIG. 13 depicts an ADSL+ Over POTS PSD mask for cabinet deployment in non-overlapped mode.

Table 25 lists the preferred approximate breakpoints for the non-overlapped ADSL+PSD Mask for Cabinet deployment operating. The mask is plotted in FIG. 13. The maximum power for this mode of operation may be established, it may be fixed or it may be adaptively determined.

TABLE 24

ADSL+ over POTS PSD for Cabinet Deployment (Overlapped Mode)

| Frequency (kHz) | Mask (dBm/Hz) |
| --- | --- |
| 0 | −97.5 |
| 4 | −97.5 |
| 4 | −92.5 |
| 25 | −56.5 |
| 1104 | −56.5 |
| 2208 | −46.5 |
| 39.25 | −101.5 |
| 8500 | −101.5 |

TABLE 24-continued

ADSL+ over POTS PSD for Cabinet Deployment (Overlapped Mode)

| Frequency (kHz) | Mask (dBm/Hz) |
|---|---|
| 8500 | −103.5 |
| 11040 | −103.5 |

TABLE 25

ADSL+ over POTS PSD for Cabinet Deployment (Non-overlapped Mode)

| Frequency (kHz) | Mask (dBm/Hz) |
|---|---|
| 0 | −97.5 |
| 4 | −97.5 |
| 80 | −72.5 |
| 138 | −56.5 |
| 1104 | −56.5 |
| 2208 | −46.5 |
| 39.25 | −101.5 |
| 8500 | −101.5 |
| 8500 | −103.5 |
| 11040 | −103.5 |

Figure 14:
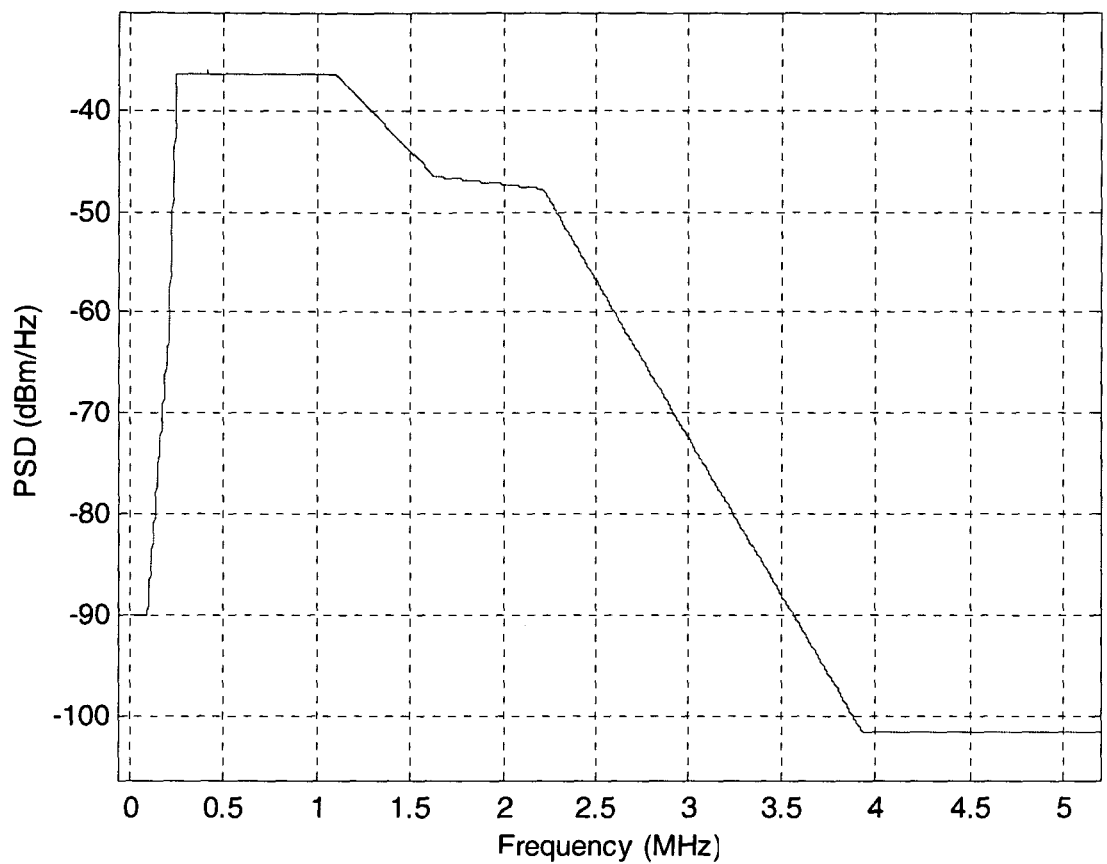
FIG. 14 depicts an ADSL+ Over ISDN PSD mask for CO deployment.

ADSL+ Over ISDN:

Deployment from CO:

Table 26 lists the preferred approximate breakpoints for the overlapped ADSL+ over ISDN PSD Mask for Central Office deployment. This PSD mask is plotted in FIG. 14. The maximum power for this mode of operation may be established, it may be fixed or it may be adaptively determined.

TABLE 26

ADSL+ Over ISDN PSD for CO Deployment

| Frequency (kHz) | Mask (dBm/Hz) |
|---|---|
| 0 | −90 |
| 93.1 | −90 |
| 209 | −62 |
| 255 | −36.5 |
| 1104 | −36.5 |
| 2208 | −46.5 |
| 39.25 | −101.5 |
| 8500 | −101.5 |
| 8500 | −103.5 |
| 11040 | −103.5 |

Deployment from the Cabinet

Figure 15:
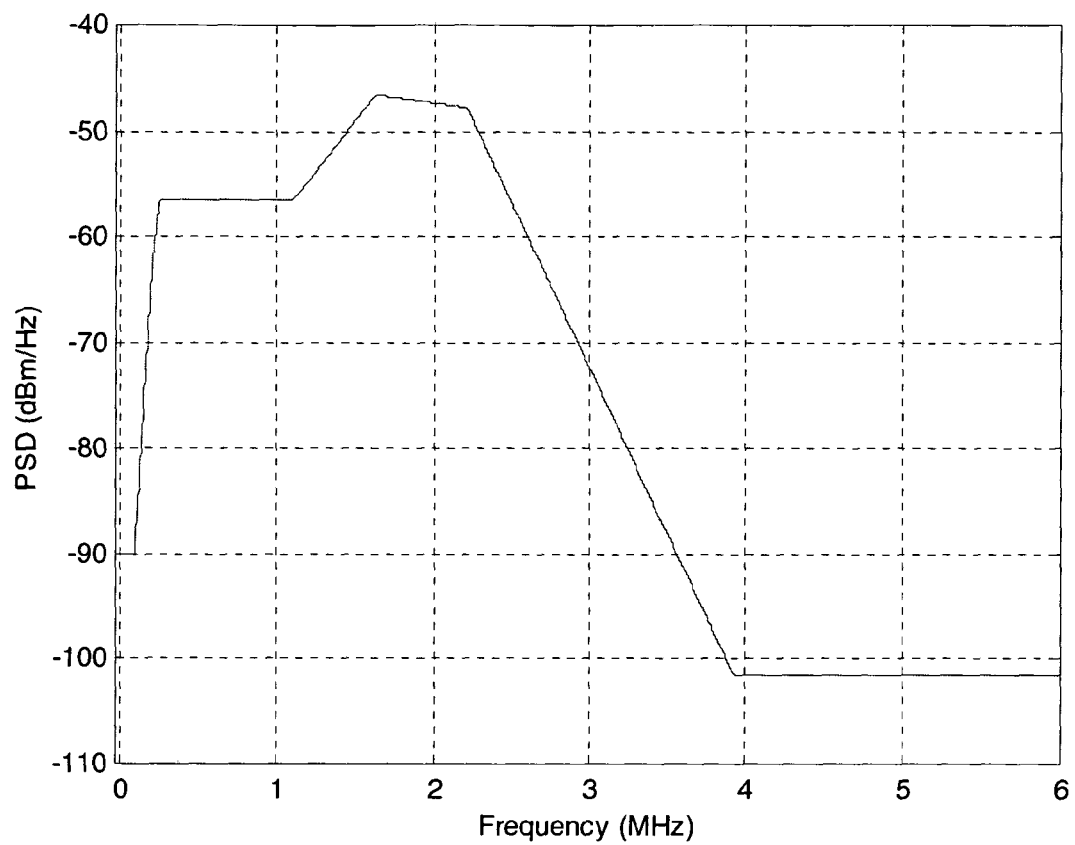
FIG. 15 depicts an ADSL+ Over ISDN PSD mark for cabinet deployment.

Table 27 lists the preferred approximate breakpoints for the non-overlapped ADSL+ over ISDN PSD Mask for Cabinet deployment operating. The mask is plotted in FIG. 15. The maximum power for this mode of operation may be established, it may be fixed or it may be adaptively determined.

TABLE 27

ADSL+ over ISDN PSD for Cabinet Deployment

| Frequency (kHz) | Mask (dBm/Hz) |
|---|---|
| 0 | −90 |
| 93.1 | −90 |
| 209 | −62 |

TABLE 27-continued

ADSL+ over ISDN PSD for Cabinet Deployment

| Frequency (kHz) | Mask (dBm/Hz) |
|---|---|
| 254 | −56.5 |
| 1104 | −56.5 |
| 2208 | −46.5 |
| 39.25 | −101.5 |
| 8500 | −101.5 |
| 8500 | −103.5 |
| 11040 | −103.5 |

In keeping with this embodiment of the present invention, the following PSD Masks defined above for ADSL+ for the different deployment scenarios may be adopted:

ADSL over POTS with overlapping upstream and downstream spectra deployed from the CO ADSL over POTS with non-overlapping upstream and downstream spectra deployed from the CO ADSL over POTS with overlapping upstream and downstream spectra deployed from the Cabinet ADSL over POTS with non-overlapping upstream and downstream spectra deployed from the Cabinet ADSL over ISDN with non-overlapping upstream and downstream spectra deployed from the CO ADSL over ISDN with non-overlapping upstream and downstream spectra deployed from the Cabinet To summarize:

In accordance with one embodiment of the present invention, a power spectral density (PSD) mask for spectral shaping of an asynchronous digital subscriber line (ADSL) overlap spectrum transmission over a plain old telephone system (POTS) is provided. The PSD mask is represented at least in part by a plurality of break points, the plurality of break points including:

approximately −97.5 decibel-milliwatts per hertz (dBm/Hz) at approximately 0 kilohertz (kHz);

approximately −97.5 dBm/Hz at approximately 4 kHz;

approximately −92.5 dBm/Hz at approximately 4 kHz;

approximately −36.5 dBm/Hz at approximately 25 kHz;

approximately −36.5 dBm/Hz at approximately 1104 kHz;

approximately −46.5 dBm/Hz at approximately 2208 kHz;

approximately −101.5 dBm/Hz at approximately 39.25 kHz;

approximately −101.5 dBm/Hz at approximately 8500 kHz;

approximately −103.5 dBm/Hz at approximately 8500 kHz; and approximately −103.5 dBm/Hz at approximately 11040 kHz.

In accordance with another embodiment of the present invention, a power spectral density (PSD) mask for spectral shaping of an asynchronous digital subscriber line (ADSL) non-overlap spectrum over a plain old telephone system (POTS) is provided. The PSD mask may be represented at least in part by a plurality of break points, the plurality of break points including:

approximately −97.5 decibel-milliwatts per hertz (dBm/Hz) at approximately 0 kilohertz (kHz);

approximately −97.5 dBm/Hz at approximately 4 kHz;

approximately −72.5 dBm/Hz at approximately 80 kHz;

approximately −36.5 dBm/Hz at approximately 138 kHz;

approximately −36.5 dBm/Hz at approximately 1104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

In accordance with an additional embodiment of the present invention, a power spectral density (PSD) mask for spectral shaping of an asynchronous digital subscriber line (ADSL) overlap spectrum over a plain old telephone system (POTS) is provided. The PSD mask may be represented at least in part by a plurality of break points, the plurality of break points including:
approximately −97.5 decibel-milliwatts per hertz (dBm/Hz) at approximately 0 kilohertz (kHz);
approximately −97.5 dBm/Hz at approximately 4 kHz;
approximately −92.5 dBm/Hz at approximately 4 kHz;
approximately −56.5 dBm/Hz at approximately 25 kHz;
approximately −56.5 dBm/Hz at approximately 1104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

In accordance with another embodiment of the present invention, a power spectral density (PSD) mask for spectral shaping of an asynchronous digital subscriber line (ADSL) non-overlap spectrum over a plain old telephone system (POTS) is provided. The PSD mask may be represented at least in part by a plurality of break points, the plurality of break points including:
approximately −97.5 decibel-milliwatts per hertz (dBm/Hz) at approximately 0 kilohertz (kHz);
approximately −97.5 dBm/Hz at approximately 4 kHz;
approximately −92.5 dBm/Hz at approximately 80 kHz;
approximately −56.5 dBm/Hz at approximately 138 kHz;
approximately −56.5 dBm/Hz at approximately 1104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

In accordance with yet another embodiment of the present invention, a power spectral density (PSD) mask for spectral shaping of an asynchronous digital subscriber line (ADSL) overlap spectrum over an integrated digital services network (ISDN) is provided. The PSD mask may be represented at least in part by a plurality of break points, the plurality of break points including:
approximately −90 decibel-milliwatts per hertz (dBm/Hz) at approximately 0 kilohertz. (kHz);
approximately −90 dBm/Hz at approximately 93.1 kHz;
approximately −62 dBm/Hz at approximately 209 kHz;
approximately −36.5 dBm/Hz at approximately 255 kHz;
approximately −36.5 dBm/Hz at approximately 1104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

In accordance with another embodiment of the present invention, a power spectral density (PSD) mask for spectral shaping of an asynchronous digital subscriber line (ADSL) overlap spectrum over an integrated digital services network (ISDN) is provided. The PSD mask may be represented at least in part by a plurality of break points, the plurality of break points including:
approximately −90 decibel-milliwatts per hertz (dBm/Hz) at approximately 0 kilohertz (kHz);
approximately −90 dBm/Hz at approximately 93.1 kHz;
approximately −62 dBm/Hz at approximately 209 kHz;
approximately −56.5 dBm/Hz at approximately 255 kHz;
approximately −56.5 dBm/Hz at approximately 1104 kHz;
approximately −46.5 dBm/Hz at approximately 2208 kHz;
approximately −101.5 dBm/Hz at approximately 3925 kHz;
approximately −101.5 dBm/Hz at approximately 8500 kHz;
approximately −103.5 dBm/Hz at approximately 8500 kHz; and
approximately −103.5 dBm/Hz at approximately 11040 kHz.

+++++

In accordance with one embodiment of the present invention, a power spectral density (PSD) mask for spectral shaping of an asynchronous digital subscriber line (ADSL) overlap spectrum transmission over a plain old telephone system (POTS) is provided. The PSD mask is represented at least in part by a plurality of break points, the plurality of break points including:
−97.5±5% decibel-milliwatts per hertz (dBm/Hz) at 0±5% kilohertz (kHz);
−97.5±5% dBm/Hz at 4±5% kHz;
−92.5±5% dBm/Hz at 4±5% kHz;
−36.5±5% dBm/Hz at 25±5% kHz;
−36.5±5% dBm/Hz at 1104±5% kHz;
−46.5±5% dBm/Hz at 2208±5% kHz;
−101.5±5% dBm/Hz at 3925±5% kHz;
−101.5±5% dBm/Hz at 8500±5% kHz;
−103.5±5% dBm/Hz at 8500±5% kHz; and
−103.5±5% dBm/Hz at 11040±5% kHz.

In accordance with another embodiment of the present invention, a power spectral density (PSD) mask for spectral shaping of an asynchronous digital subscriber line (ADSL) non-overlap spectrum over a plain old telephone system (POTS) is provided. The PSD mask may be represented at least in part by a plurality of break points, the plurality of break points including:

−97.5±5% decibel-milliwatts per hertz (dBm/Hz) at 0±5% kilohertz (kHz);
−97.5±5% dBm/Hz at 4±5% kHz;
−72.5±5% dBm/Hz at 80±5% kHz;
−36.5±5% dBm/Hz at 138±5% kHz;
−36.5±5% dBm/Hz at 1104±5% kHz;
−46.5±5% dBm/Hz at 2208±5% kHz;
−101.5±5% dBm/Hz at 3925±5% kHz;
−101.5±5% dBm/Hz at 8500±5% kHz;
−103.5±5% dBm/Hz at 8500±5% kHz; and
−103.5±5% dBm/Hz at 11040±5% kHz.

In accordance with an additional embodiment of the present invention, a power spectral density (PSD) mask for spectral shaping of an asynchronous digital subscriber line (ADSL) overlap spectrum over a plain old telephone system (POTS) is provided. The PSD mask may be represented at least in part by a plurality of break points, the plurality of break points including:
−97.5±5% decibel-milliwatts per hertz (dBm/Hz) at 0±5% kilohertz (kHz);
−97.5±5% dBm/Hz at 4±5% kHz;
−92.5±5% dBm/Hz at 4±5% kHz;
−56.5±5% dBm/Hz at 25±5% kHz;
−56.5±5% dBm/Hz at 1104±5% kHz;
−46.5±5% dBm/Hz at 2208±5% kHz;
−101.5±5% dBm/Hz at 3925±5% kHz;
−101.5±5% dBm/Hz at 8500±5% kHz;
−103.5±5% dBm/Hz at 8500±5% kHz; and
−103.5±5% dBm/Hz at 11040±5% kHz.

In accordance with another embodiment of the present invention, a power spectral density (PSD) mask for spectral shaping of an asynchronous digital subscriber line (ADSL) non-overlap spectrum over a plain old telephone system (POTS) is provided. The PSD mask may be represented at least in part by a plurality of break points, the plurality of break points including:
−97.5±5% decibel-milliwatts per hertz (dBm/Hz) at 0±5% kilohertz (kHz);
−97.5±5% dBm/Hz at 4±5% kHz;
−92.5±5% dBm/Hz at 80±5% kHz;
−56.5±5% dBm/Hz at 138±5% kHz;
−56.5±5% dBm/Hz at 1104±5% kHz;
−46.5±5% dBm/Hz at 2208±5% kHz;
−101.5±5% dBm/Hz at 3925±5% kHz;
−101.5±5% dBm/Hz at 8500±5% kHz;
−103.5±5% dBm/Hz at 8500±5% kHz; and
−103.5±5% dBm/Hz at 11040±5% kHz.

In accordance with yet another embodiment of the present invention, a power spectral density (PSD) mask for spectral shaping of an asynchronous digital subscriber line (ADSL) overlap spectrum over an integrated digital services network (ISDN) is provided. The PSD mask may be represented at least in part by a plurality of break points, the plurality of break points including:
−90±5% decibel-milliwatts per hertz (dBm/Hz) at 0±5% kilohertz (kHz);
−90±5% dBm/Hz at 93.1±5% kHz;
−62±5% dBm/Hz at 209±5% kHz;
−36.5±5% dBm/Hz at 255±5% kHz;
−36.5±5% dBm/Hz at 1104±5% kHz;
−46.5±5% dBm/Hz at 2208±5% kHz;
−101.5±5% dBm/Hz at 3925±5% kHz;
−101.5±5% dBm/Hz at 8500±5% kHz;
−103.5±5% dBm/Hz at 8500±5% kHz; and
−103.5±5% dBm/Hz at 11040±5% kHz.

In accordance with another embodiment of the present invention, a power spectral density (PSD) mask for spectral shaping of an asynchronous digital subscriber line (ADSL) overlap spectrum over an integrated digital services network (ISDN) is provided. The PSD mask may be represented at least in part by a plurality of break points, the plurality of break points including:
−90±5% decibel-milliwatts per hertz (dBm/Hz) at 0±5% kilohertz (kHz);
−90±5% dBm/Hz at 93.1±5% kHz;
−62±5% dBm/Hz at 209±5% kHz;
−56.5±5% dBm/Hz at 255±5% kHz;
−56.5±5% dBm/Hz at 1104±5% kHz;
−46.5±5% dBm/Hz at 2208±5% kHz;
−101.5±5% dBm/Hz at 3925±5% kHz;
−101.5±5% dBm/Hz at 8500±5% kHz;
−103.5±5% dBm/Hz at 8500±5% kHz; and
−103.5±5% dBm/Hz at 11040±5% kHz.

Method and System for Adaptive Shaping:

To further enhance the performance characteristics of the communications system, a method and system for adaptive shaping may be employed. Such a system has broad applicability well beyond the realm of G.992, G.994 and other such standards. This system may be thought of as a "smart" DSL or other such system. In one embodiment, the system utilizes a table or plot for matching optimum or desired systems or masks with corresponding distances. In one respect, key factors or considerations include maximizing downstream data rate, maintaining spectral compliance/compatibility, and minimizing complexity and system requirements. In one example, as shown in Table 28, systems are selected for short loop lengths to maximize data rate and for long loop lengths to maximize reach. As shown in this example, a DBMOL system may be used for relatively short loop length distances of less than, for example, 1.5 km. At distances of between 1.5 km and 2 km, a DBMsOL system or mask is employed. At distances of between 2 km and 3.5 km, an XOL system may be employed. At distances of between 3.5 km and 5 km a XDD system may be employed and at distances greater than 5 km an FBMsOL system may be employed.

TABLE 28

| Loop Distance | System/Mask |
|---|---|
| <1.5 km | DBMOL |
| 1.5-2 km | DBMsOL |
| 2-3.5 km | XOL |
| 3.5-5 km | XDD |
| >5 km | FBMsOL |

A look-up table or plot may be used as a reference and the system. For instance, the central office CO may use the data point msg.ra, as is used from ATU-R to ATU-C, to determine the loop length and from that to select the appropriate system based on the look up table. This is used to optimize overall system performance by weighing competing interests and there differing effects based on system conditions, such as loop length. At short loop lengths, data rate is maximized while at longer loop lengths reach is the primary concern.

Signal Attenuation Considerations:

Reduced Symbol Rates During the Handshaking Process:

Messages in G.994.1 are sent with one or more carrier sets. All carrier frequencies within a carrier set are simultaneously modulated with the same data bits using a Differentially-encoded Binary Phase Shift Keying (DPSK). The signal quality on the carrier frequencies used for signaling in the handshake procedures described in G.994.1 often suffer heavily from TCM-ISDN noise, particularly in the case of longer loops (typically those having a length greater than 5.5 km). According to the G.994.1 standard, the tolerance of the symbol rates and frequency for an HTSU-C are +/−50 parts per million (ppm) and for an HSTU-R are +/−200 ppm during R-TONES-REQ and +/−50 during and after R-TONE1 in duplex transmission mode or R-FLAG1 in half-duplex mode. Although perturbations are minimized, for example, in the carrier sets in the 4.3125 kHz signaling family (carrier sets A43, B43, C43) which uses frequencies less exposed to this type of cross-talk, TCM-ISDN near end cross-talk (NEXT) noise can severely diminish signal quality. For example, in severe cases, six out of eight 4.3125 kHz sub-symbols could be affected by NEXT noise, significantly reducing the quality of the signal.

Accordingly, at least one embodiment of the present invention provides for a process to reduce the effects of noise within loops during G.994.1 handshaking procedures by reducing the symbol rate during the handshaking process. The symbol rate preferably is reduced by one-half. To illustrate, for carrier sets A43 and C43, the symbol rate of 539.0625 (4312.5/8) symbols per second. However, by reducing the rate to 269.53125 (4312.5/16) symbols per second, at least four sub-symbols of every symbol will lie outside the NEXT duration and therefore may only be affected by far-end crosstalk (FEXT) noise. However, a phase change detector operating on four sub-symbols typically is robust in FEXT noise environments, thereby limiting the effects of FEXT noise.

The process by which the reduced symbol rate is implemented can be implemented in a variety of ways. In one embodiment, a HSTU-C which opts to select, for example, carrier sets A43 and C43 with reduced symbol rate (269.53125 symbols per second) can be adapted to respond to R-TONE1 by transmitting Galfs (an octet of value $81_{16}$, i.e., the ones-complement of an HDLC flag) on modulated carriers (C-GALF1) using the selected reduced symbol rate. C-GALF1 is an octet of value $81_{16}$, resulting in a phase transition at the beginning and at the end of each octet transmitted. By counting these transitions the HSTU-R can be adapted to determine the symbol rate the HSTU-C has selected in a reliable way. This ensures that the HSTU-C keeps control of the mode and in particular if the HSTU-C is in the current standard mode then the HSTU-R will not transition to a reduced rate mode thereby ensuring backward compatibility. The HSTU-C then would maintain this reduced symbol rate throughout the subsequent handshake procedure.

Similarly, the corresponding HSTU-R capable of operation in reduced symbol rate mode could be adapted to respond to C-GALF1 by transmitting, for example, Flags on modulated carriers (R-FLAG1) using the reduced symbol rate detected in C-GALF1. The HSTU-R typically would maintain this reduced symbol rate throughout the subsequent handshake procedure. If an HSTU-R is not capable of operation in reduced symbol rate mode, the HSTU-R could switch to state R-SILENT0.

It may be desirable to maintain a backward compatibility with HSTU-Rs that are not capable of the desired reduced symbol rate mode. Accordingly, the HSTU-C capable of reduced symbol rate mode can be adapted to toggle between regular rate and reduced rate after each failed handshake attempt to ensure backward compatibility. Furthermore, should multiple reduced symbol rates be available for the handshake process, the HSTU-C could be adapted to cycle through all available symbol rates after each failed handshake attempt until a symbol rate compatible with the corresponding HSTU-R is found. In at least one embodiment, the reduced symbol rate mode during handshaking can be achieved without prior synchronization with a signal sent by an ATU-C.

The reduced symbol rate handshake process describe above may be implemented for carrier sets A43 and C43 using the following exemplary changes to the ITU G.994.1 standard:

The insertion of the following sub-section 6.1.1.1 below section 6.1.1 in G.994.1—6.1.1.1 Optional reduction of symbol rate For carrier sets A43 and C43, a symbol rate of 4312.5/ 16≡269.53125 symbols per second may be used.

The insertion of the following section 11.1.3 below section 11.1.2 in G.994.1—11.1.3 Duplex start-up procedure with reduced symbol rate A HSTU-C which chooses to select carrier sets A43 and C43 with reduced symbol rate (269.53125 symbols per second) may respond to R-TONE1 by transmitting Galfs on modulated carriers (C-GALF1) using the reduced symbol rate. C-GALF1 is an octet of value $81_{16}$, i.e. a phase transition at the beginning and at the end of each octet will be transmitted. By counting these transitions, the HSTU-R can determine the symbol rate the HSTU-C has chosen in a reliable way. This ensures the HSTU-C keeps control of the mode and, in particular, if the HSTU-C is in the current standard mode then the HSTU-R will not transition to a reduced rate mode thereby ensuring backward compatibility. It may maintain this symbol rate throughout the subsequent handshake procedure.

A HSTU-R capable of operation in reduced symbol rate mode may respond to C-GALF1 by transmitting Flags on modulated carriers (R-FLAG1) using the symbol rate detected in C-GALF1. It may maintain this symbol rate throughout the subsequent handshake procedure. A HSTU-R which is not capable of operation in reduced symbol rate mode may switch to state R-SILENT0. A HSTU-C capable of reduced symbol rate mode may toggle between regular rate and reduced rate after each failed handshake attempt to ensure backward compatibility.

Figure 16:
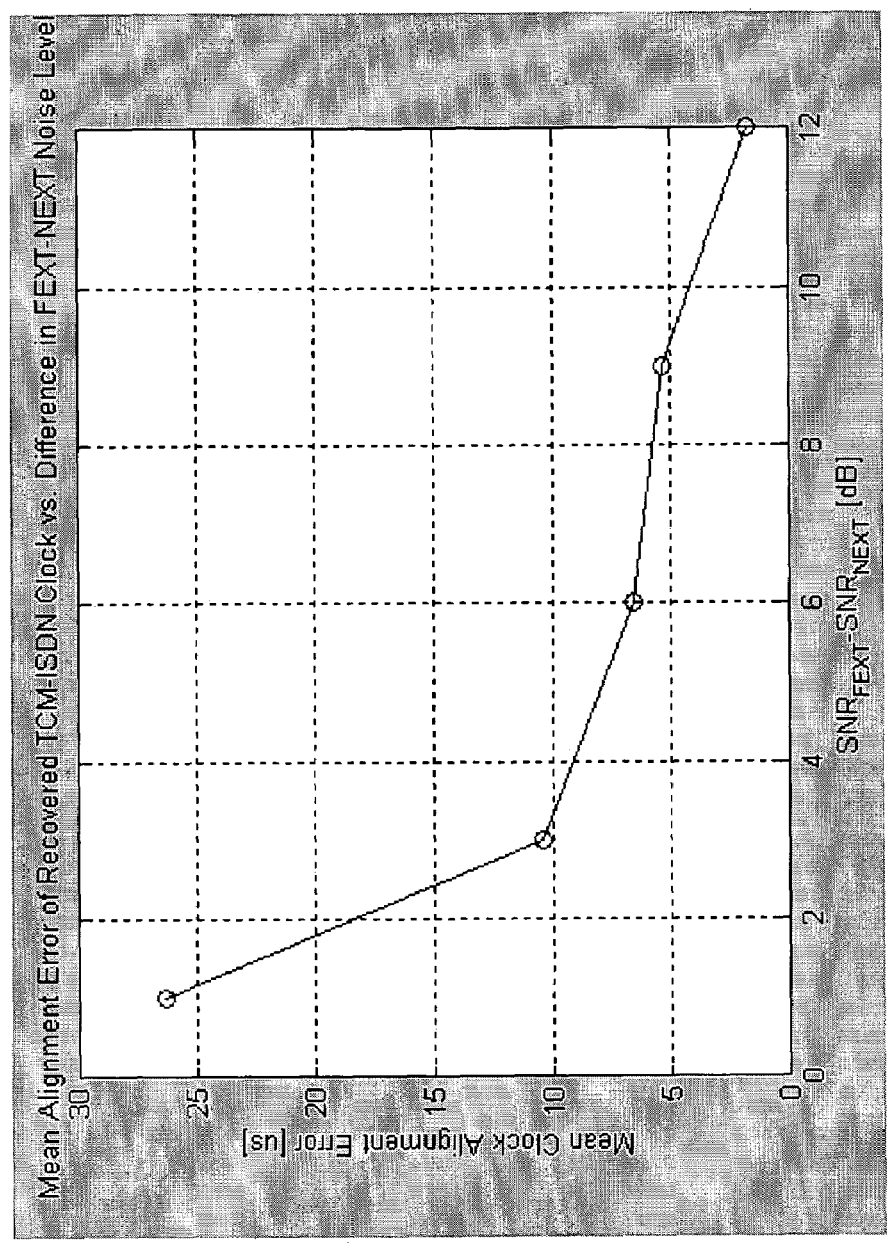
FIG. 16 illustrates exemplary results obtained using averaging over 32 TCM-ISDN periods (80 ms).

The reduced symbol rate handshake procedure detailed above often overcomes the shortcomings of a receiver during handshaking under strong TCM-ISDN conditions. Therefore receiver-focused reduced symbol rate technique can be applied to complete a robust handshake. In this case, an HSTU-R can be adapted to derive a 400 Hz local reference clock by monitoring the TCM-ISDN noise level when the difference between the FEXT and NEXT noise levels is, for example, at least 3 dB. FIG. 16 illustrates exemplary results obtained using averaging over 32 TCM-ISDN periods (80 ms).

The HTSU-R then can discard the stronger NEXT-phase and retain only the FEXT-phase throughout the handshake procedure. In the case of stationary white noise (difference between NEXT and FEXT noise levels of, for example, less than 3 dB), above "noise gating" may not be applied and the HTSU-R can use all sixteen 4.3125 kHz sub-symbols within one handshake symbol. The advantage of this procedure is the performance improvement with respect to the handshake currently defined by the G.994.1 standard as well as with respect to the case where only FEXT sub-symbols are processed.

Figure 17:
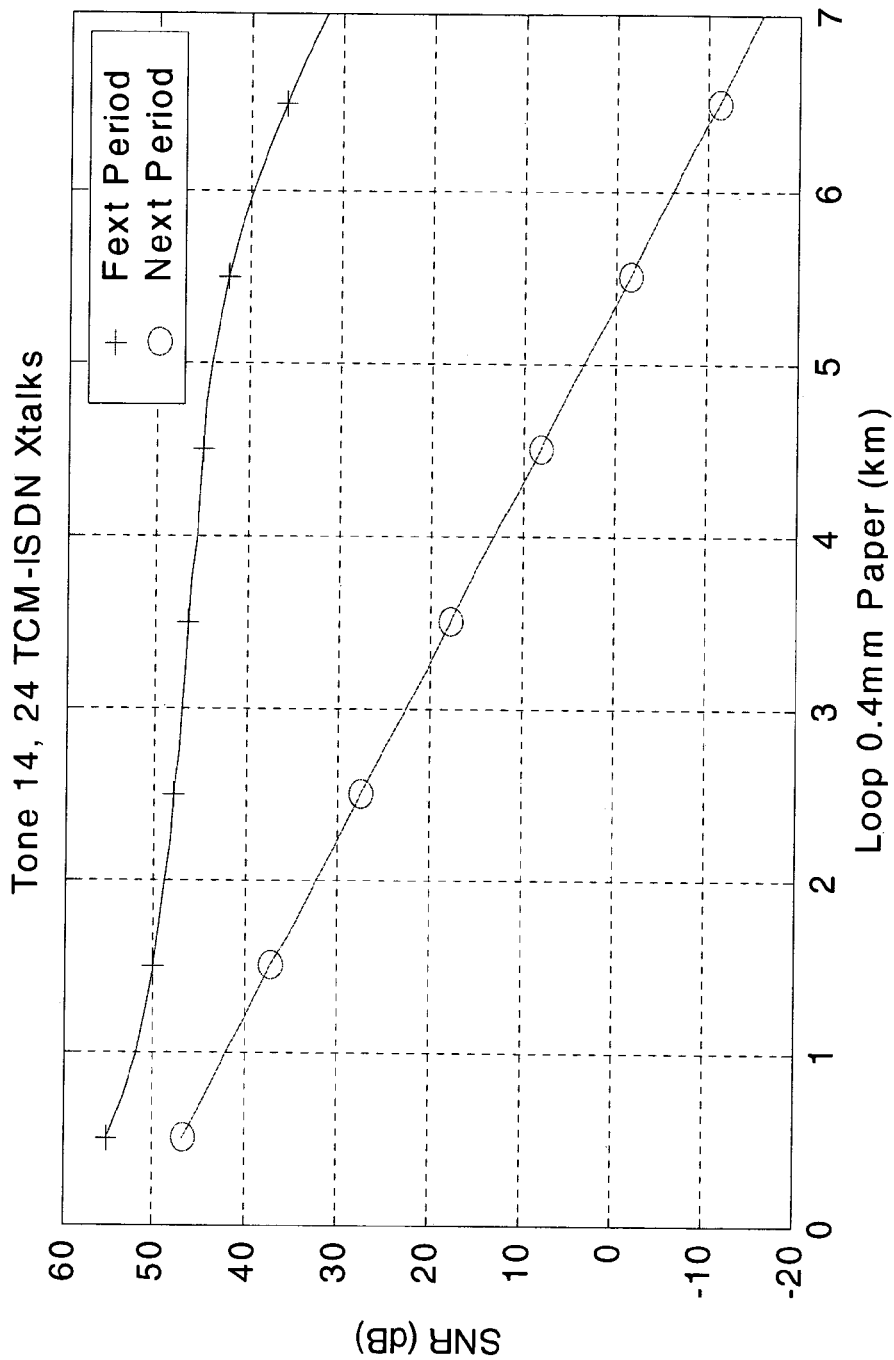
FIG. 17 illustrates a simulated performance of an exemplary HTSU-R receiver utilizing a handshake symbol reduction rate of one-half for carrier set C43.

FIG. 17 illustrates a simulated performance of an exemplary HTSU-R receiver utilizing a handshake symbol reduction rate of one-half for carrier set C43. In the illustrated simulation, the signal-to-noise (SNR) on tone 14 ($2^{nd}$ down stream tone in carrier set C43) in the presence of 24 TCM-ISDN disturbers is assumed to be approximately −16 dB during NEXTR phases and greater than 30 dB during $FEXT_R$ periods at a distance of 7 km. The simulated HSTU-R receiver, as illustrated, works sufficiently at an $SNR_{FEXT}$ of 6 dB, an $SNR_{NEXT}$ of −16 dB. Also included in the simulation is the case where the local 400 Hz TCM-ISDN clock at the HSTU-R has a phase offset with respect to the TCM-ISDN noise (i.e. the noise gate will let sub-symbols partially affected by NEXT noise pass and will block others that lie entirely with in the FEXT duration). FIG. 17 illustrates that the reduced symbol rate in the simulated HTSU-R receiver works reliably under SNR conditions and a TCM-ISDN phase offset of ⅛ of a 4.3125 kHz sub-symbol (29 μs). Under stationary white noise conditions, the receiver works well at a signal-to-noise ratio (SNR) of 3 dB.

Figure 18:
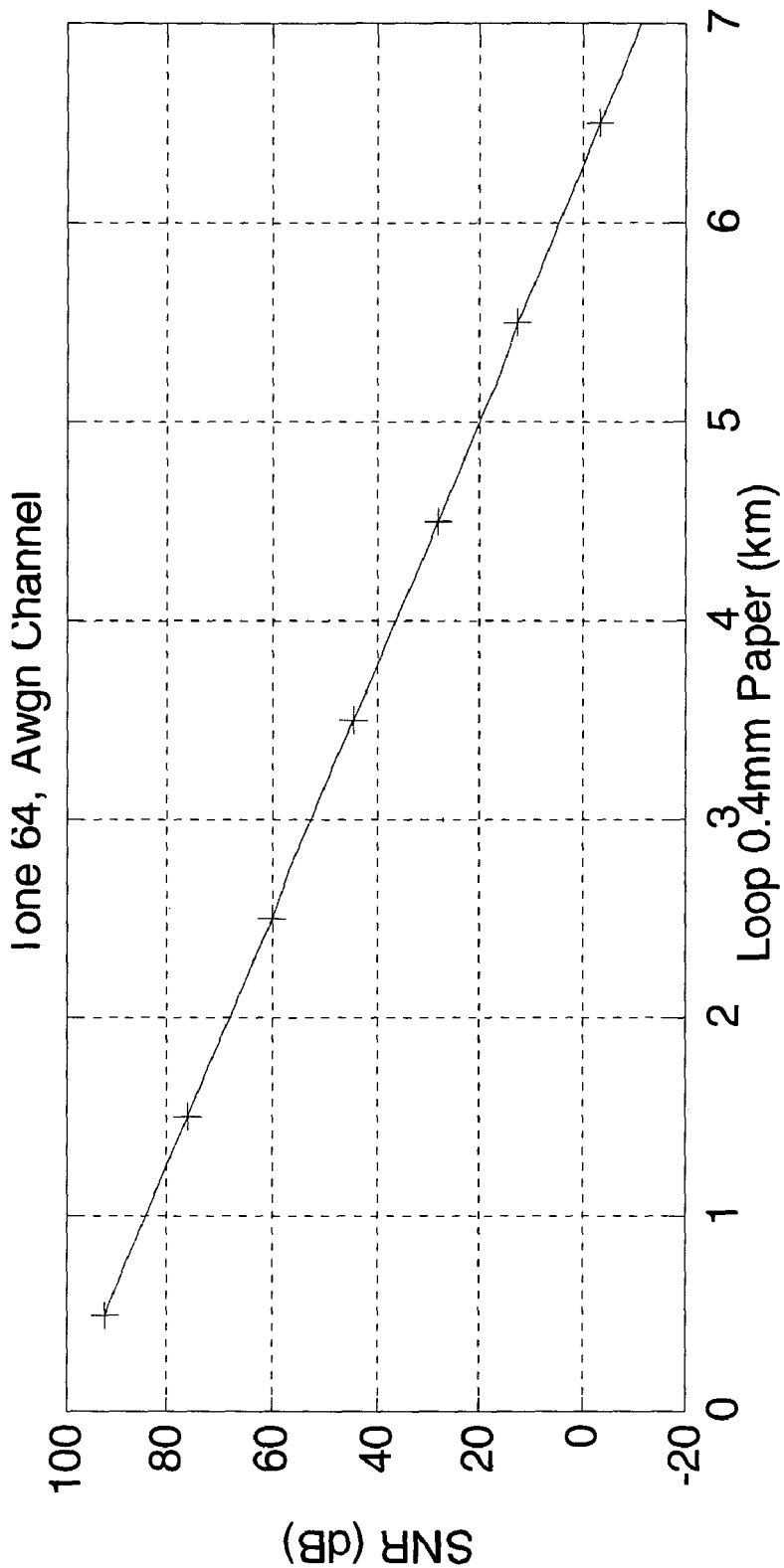
FIG. 18 illustrates PILOT 64 SNR vs. distance.
Figure 19:
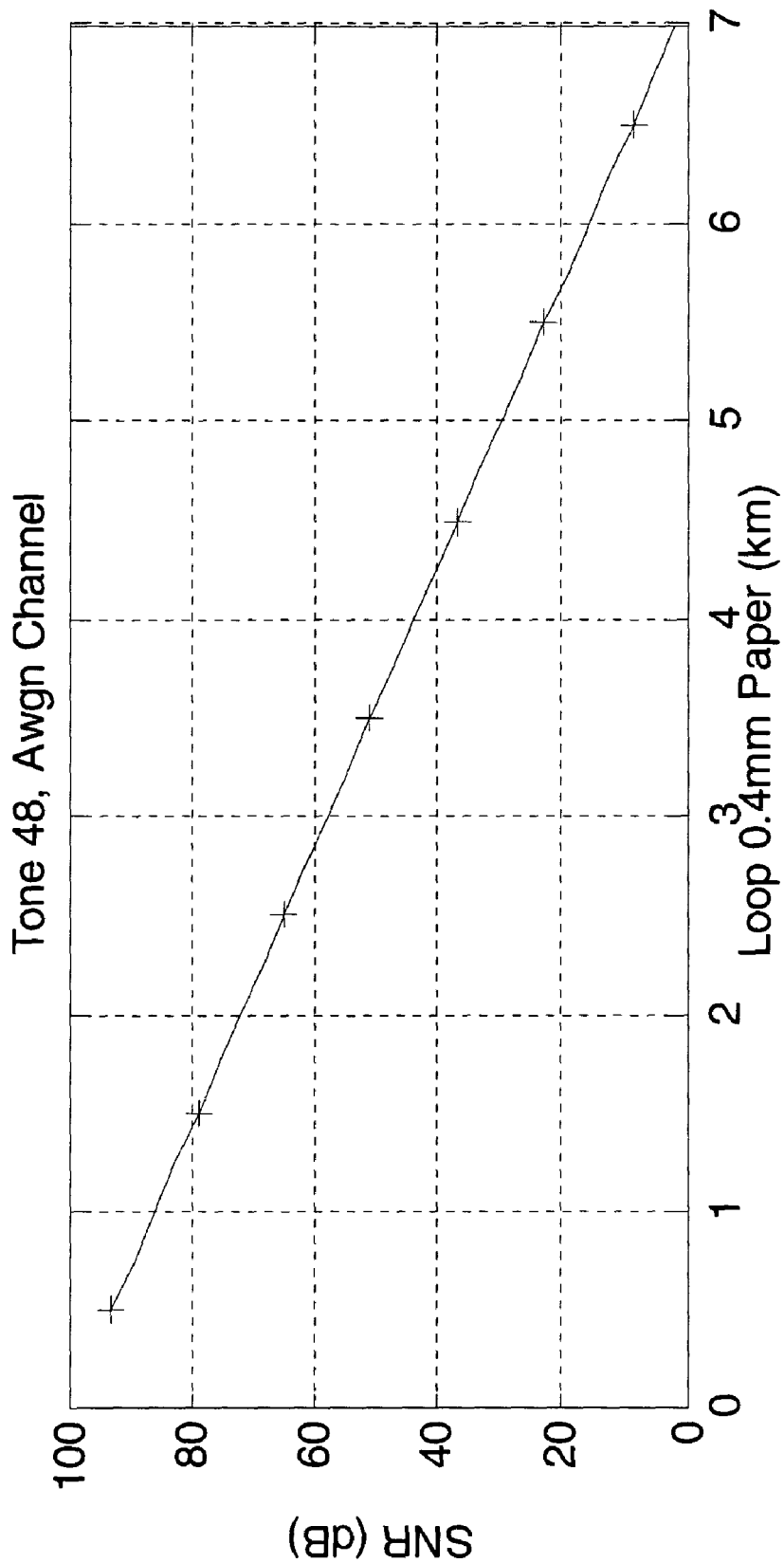
FIG. 19 illustrates TTR 48 SNR vs. distance.
Figure 20:
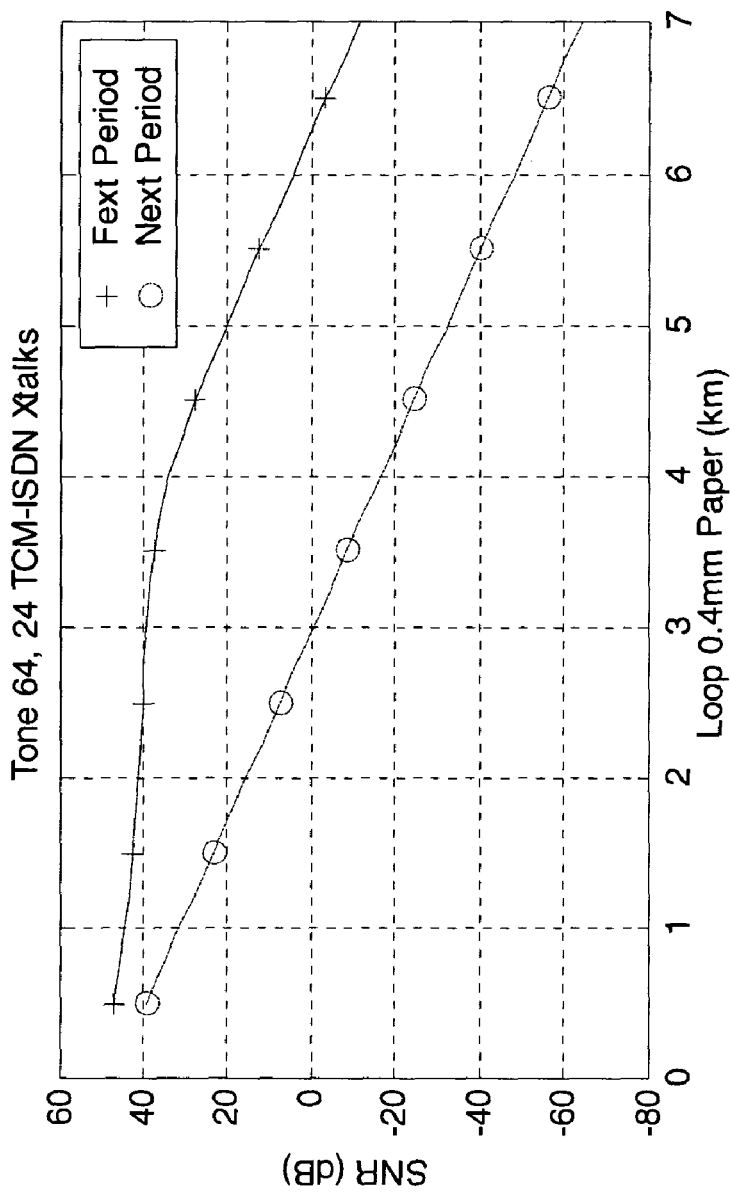
FIG. 20 illustrates PILOT 64 SNR vs. distance.
Figure 21:
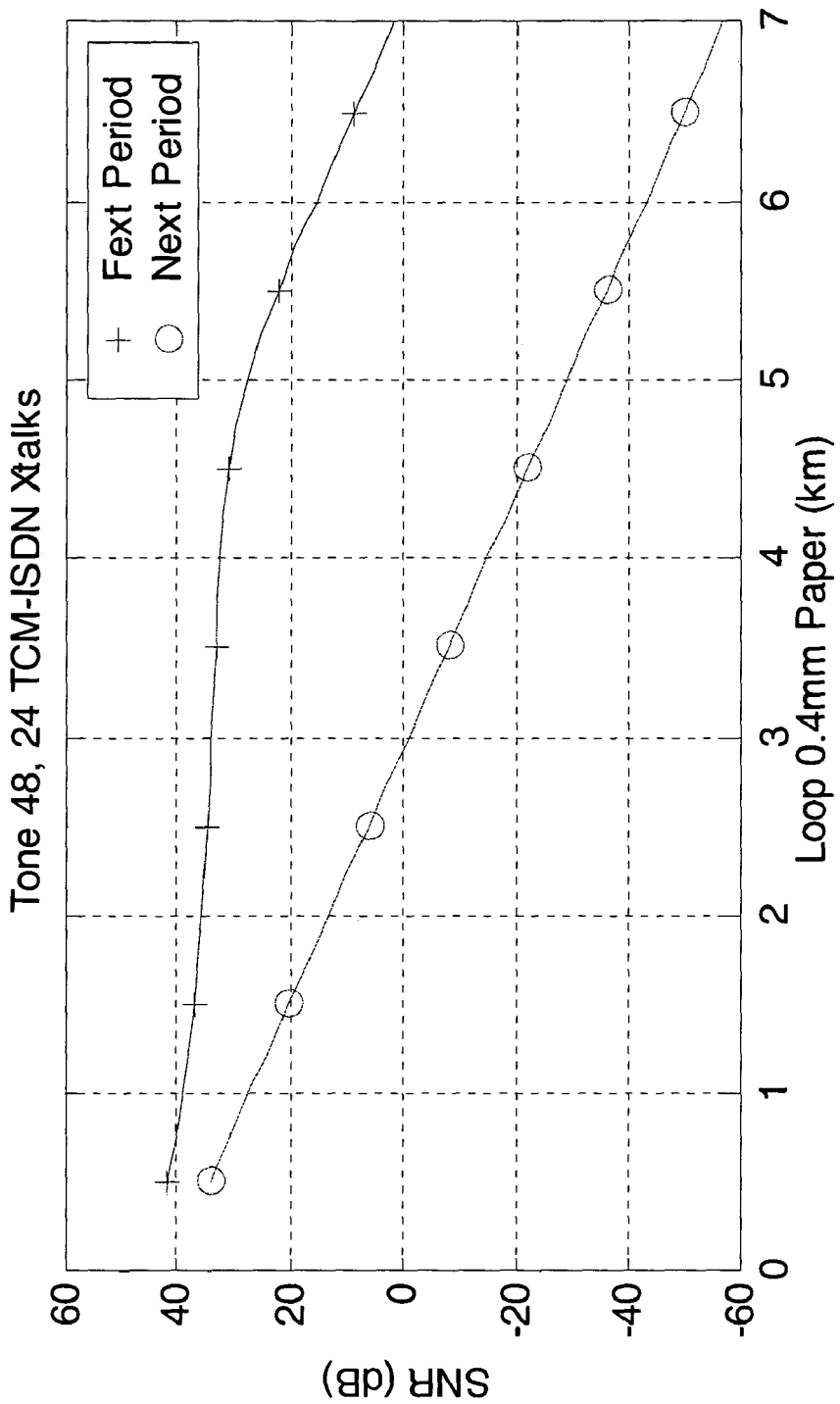
FIG. 21 illustrates TTR 48 SNR vs. distance.

Modification of TTR and Pilot Tones for Extended Reach Applications:

G.992.1 Annex C compliant extended reach systems often utilize overlap mode to increase the downstream bandwidth in data mode. At very long distances (typically greater than 6 km), certain tones, such as the PILOT 64 and TTR 48, exhibit considerable drop in their SNR, resulting in faulty operation and/or substandard performance of the system. To illustrate, FIGS. 18 and 19 display exemplary plots of, respectively, PILOT 64 and TTR 48 SNR versus distance in the presence of −140 dBm/Hz white noise when using 0.4 mm paper insulated cable. FIGS. 20 and 21 display, respectively, exemplary plots of PILOT 64 and TTR 48 SNR versus distance in the presence of 24 TCM-ISDN disturbers.

Figure 22:
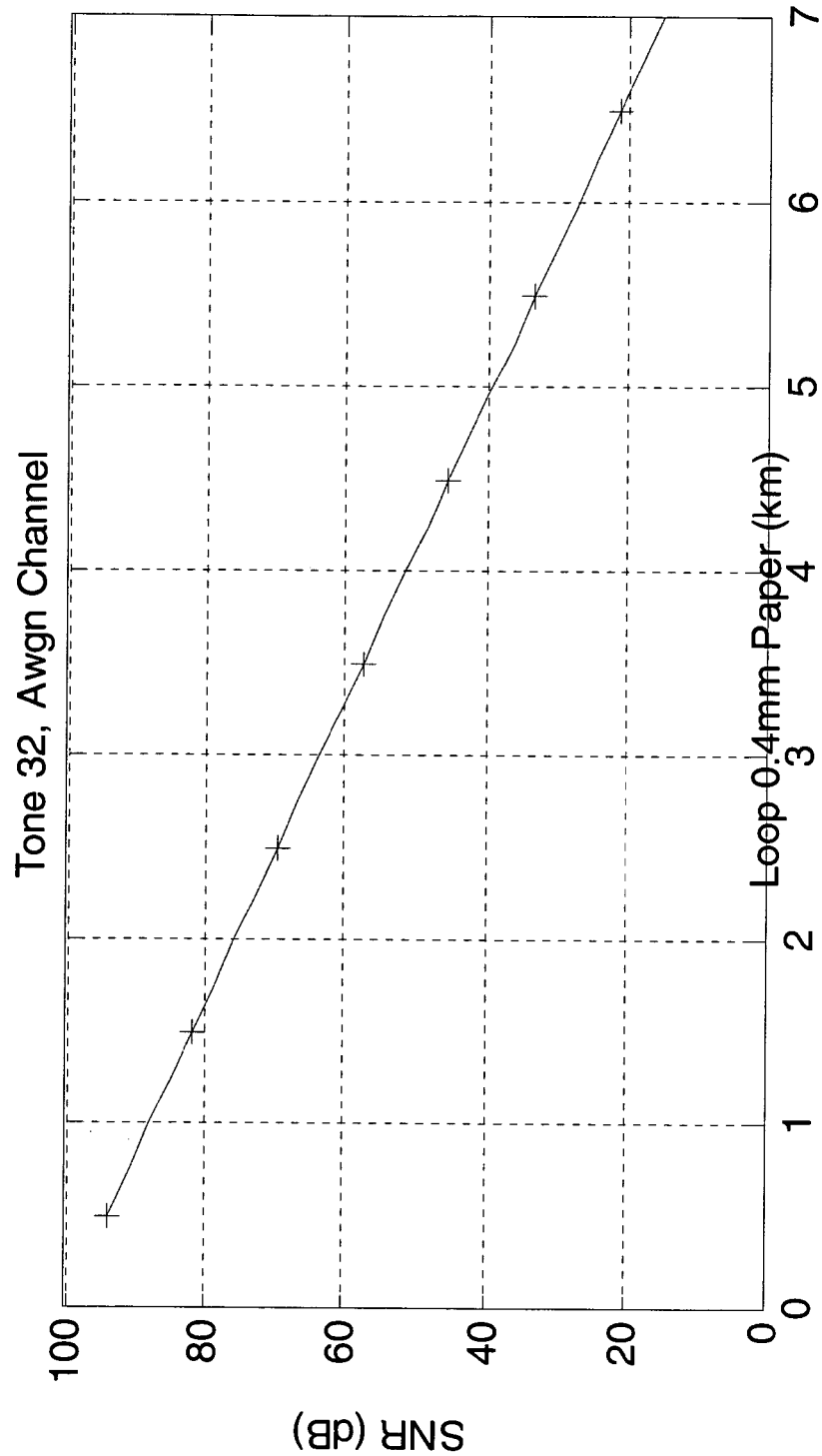
FIG. 22 illustrates PILOT 32 SNR vs. distance.
Figure 23:
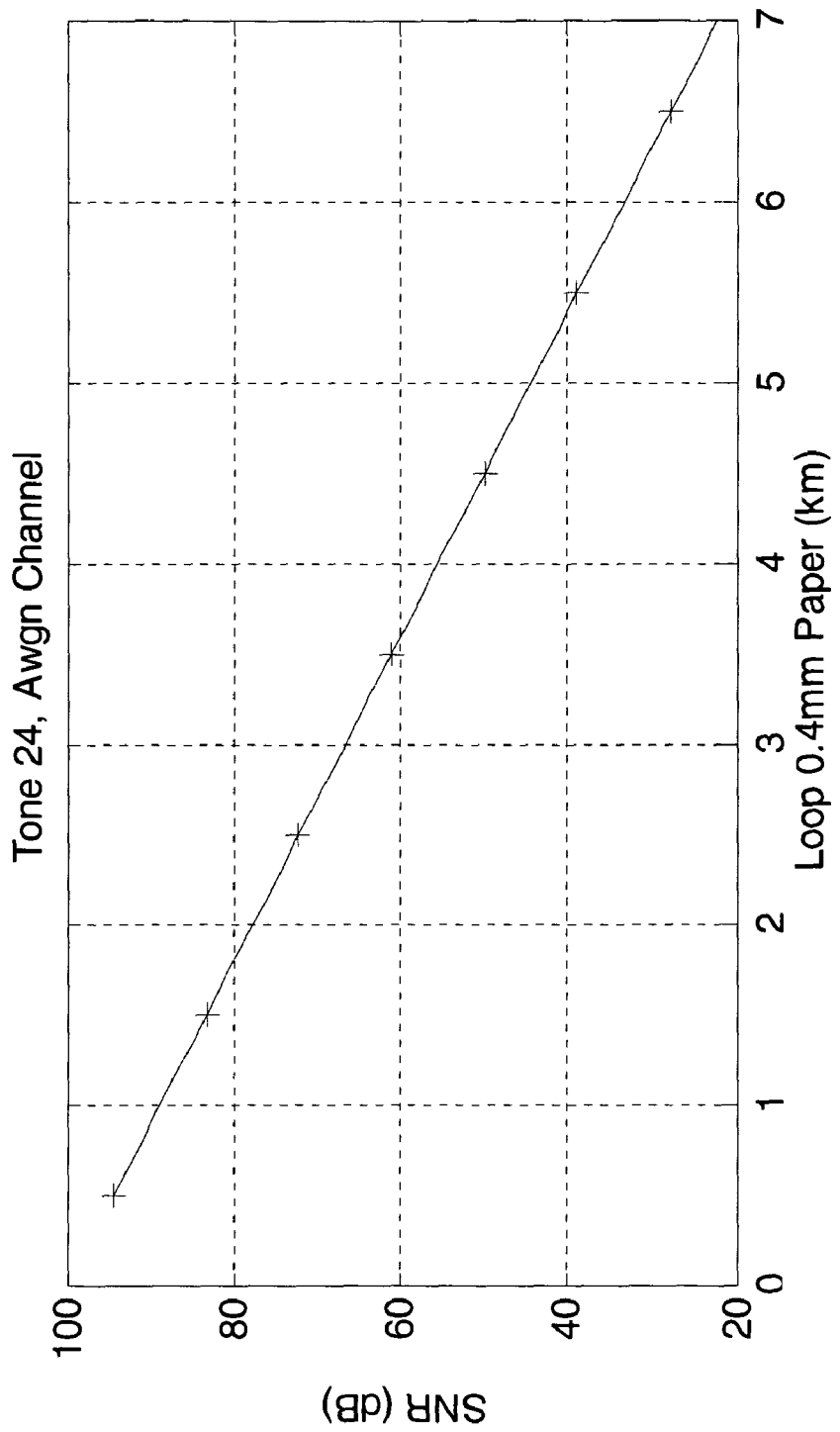
FIG. 23 illustrates TTR 24 SNR vs. distance.
Figure 24:
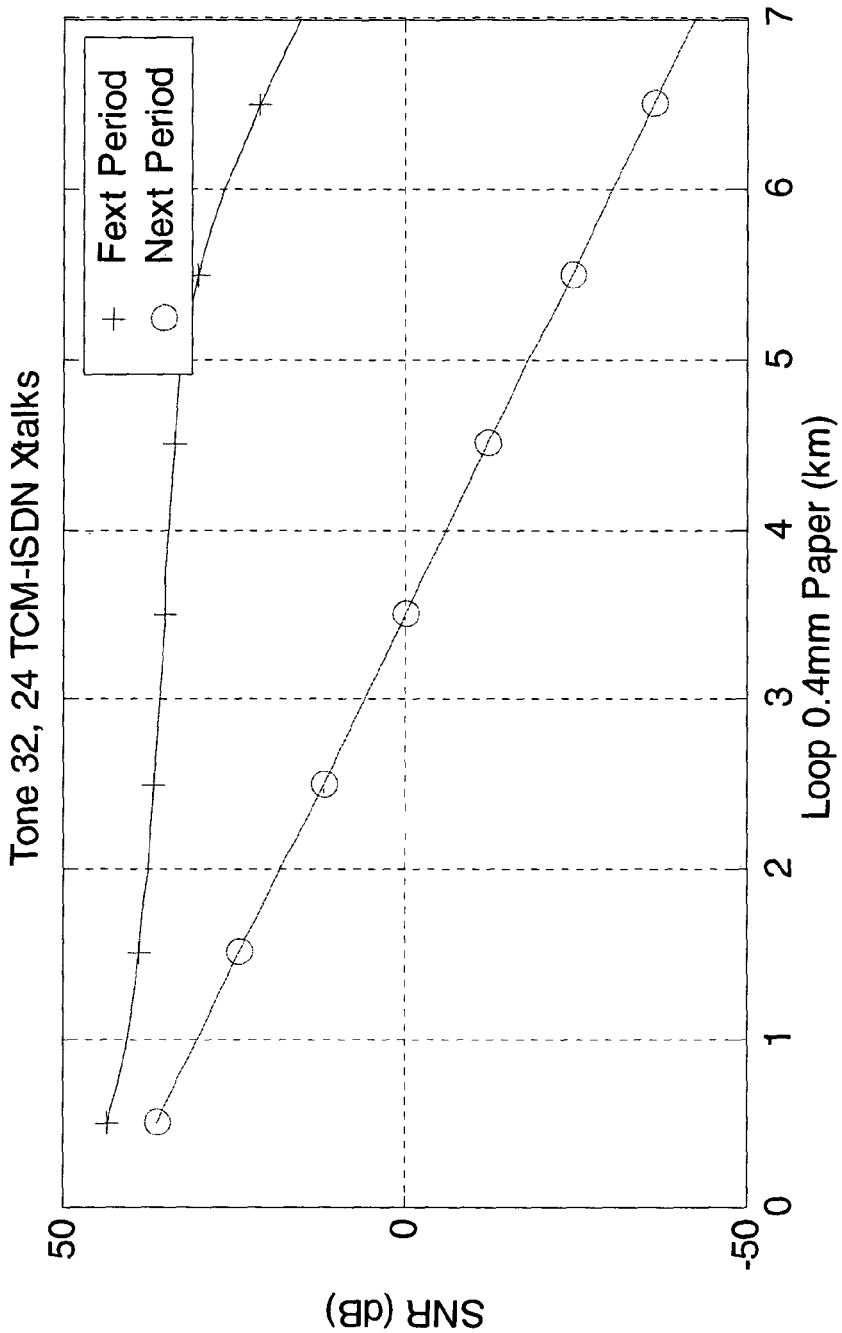
FIG. 24 illustrates PILOT 32 SNR vs. distance.
Figure 25:
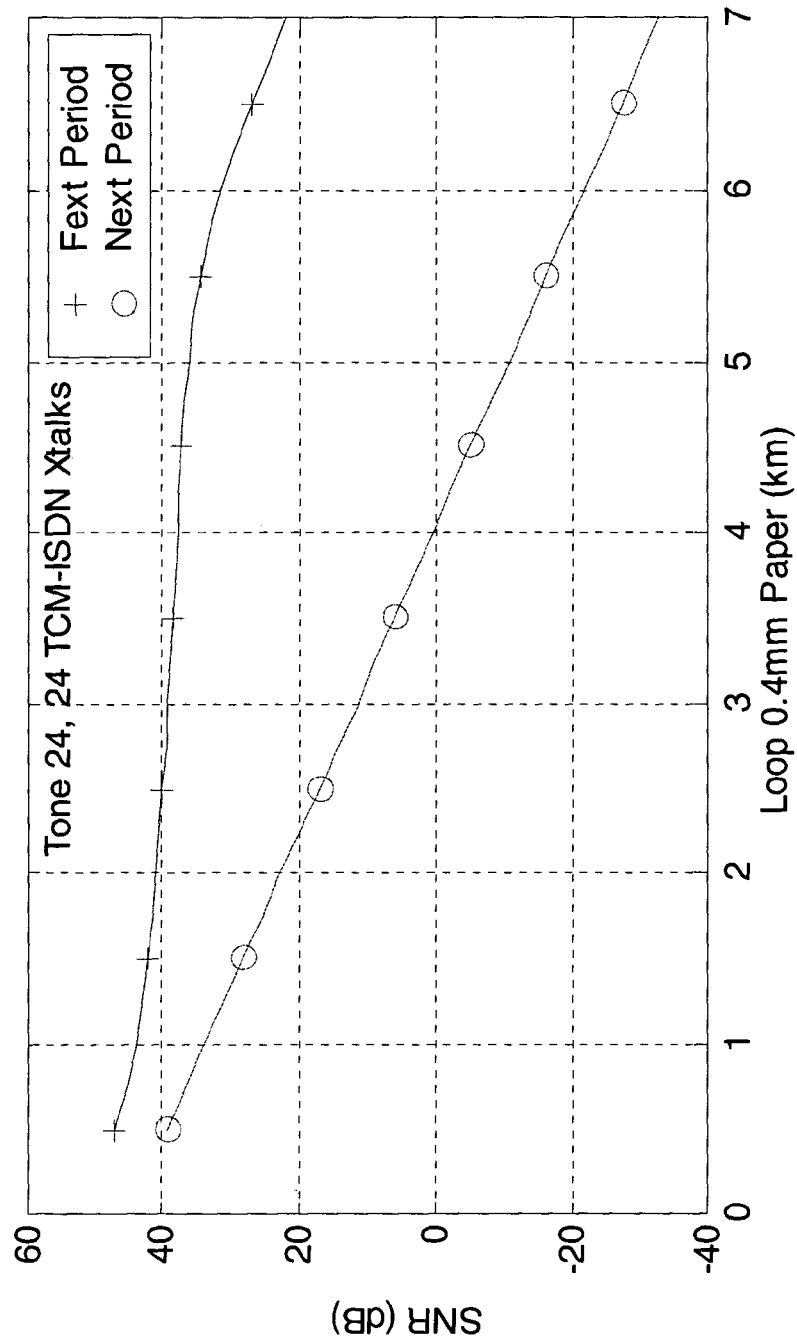
FIG. 25 illustrates TTR 24 SNR vs. distance.

The illustrated results of laboratory testing has shown that in the presence of −140 dBm/Hz white noise, TTR & Pilot detection algorithms using tones PILOT 64 and TTR 48 generally only work up to about 6.2 km when 0.4 mm paper insulated cable is used. To extend the possible range during TTR and Pilot detection, the present invention provides for a process for using alternate tones, such as PILOT 34 and TTR 24, in extended reach systems due to the less significant drop in SNR exhibited by these tones over long distances. FIGS. 22 and 23 display exemplary plots of, respectively, PILOT 32 and TTR 24 SNR versus distance in the presence of −140 dBm/Hz white noise using 0.4 mm paper insulated cable. FIGS. 24 and 25 display exemplary plots of, respectively, PILOT 32 and TTR 24 SNR versus distance in the presence of 24 TCM-ISDN disturbers.

As FIGS. 22-25 illustrate, the PILOT 32 tone and the TTR 24 tone exhibit significantly better SNR at extended distances compared to the PILOT 32 and TTR 24 tones, respectively. For example, the PILOT tone 64 SNR is about 0 dB at approximately 6.2 km in the presence of white noise whereas the PILOT tone 32 SNR is about +15 dB at about 7.0 km. Likewise, the TTR 48 SNR is equal to about +13 dB at approximately 6.2 km in the presence of the white noise whereas the TTR 24 SNR is equal to about +25 dB at approximately 7.0 km. Accordingly, the PILOT 32 and TTR 24 tones can be expected to reach about 7 km, whereas the PILOT 64 and TTR 48 can be expected to reach only about 6.2 km.

Pilot 64 and TTR 48 Limitations in FDM Mode:

FDM-compliant systems often are limited to less than 4 km in noise-laden environments, such as Japan. Accordingly, Pilot 64 and TTR 48 detection techniques may fail in the FDM mode in such instances. Reasons that may lead to TTR & PILOT failures include the presence of 24 TCM-ISDN; several bridge taps zeroing the spectrum in the vicinity of tones 48 & 64; the loop plant of the system being close to the 4 km limit; and the like. Accordingly, a testing scenario that would sufficiently assess PILOT 64 and TTR 48 limitations in the FCM mode typically would include features such as: a 4 km long loop; 0.4 mm paper insulated cable; 24 TCM-ISDN cross talks; an increasing number of ~190 m long bridge taps (190 m long bridge tap zeroes the loop frequency response in the vicinity of tones 64 & 48); and the like.

Figure 26:
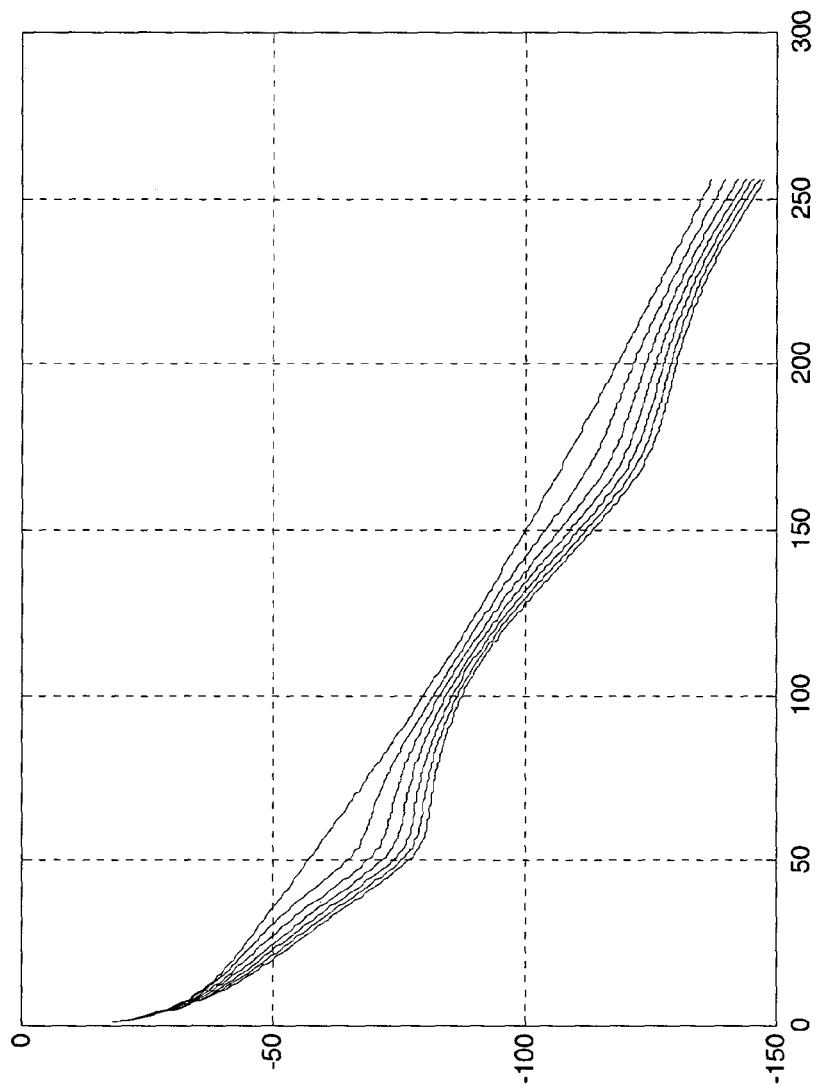
FIG. 26 illustrates the loop attenuation vs. frequency according to the number of bridge taps.

FIG. 26 illustrates the loop attenuation vs. frequency according to the number of bridge taps in such a testing scenario. This testing scenario typically represents a negligible fraction of the factors that reduce signal quality in actual field implementations. Straight 0.4 mm paper loops in Japan and combined with six bridge taps zeroing exactly the vicinity of tones 64 and 48 decreases the likelihood of such a case even more. Therefore, although it is always possible to define a scenario that leads to TTR 48 and PILOT 64 failures in the FDM mode, the high margin exhibited even in this optimistic loop scenario is indicative of implementation limitations rather than physical layer intrinsic bounds.

Tables 29 and 30 illustrate exemplary TTR 48 and PILOT 64 SNR both in the white noise scenario and in the presence of 24 TCM-ISDN versus the number of bridge taps. These tables illustrate that TTR 48 and PILOT 64 exhibit more than 10 dB margin with respect to the minimum required SNR.

TABLE 29

TTR 48 Bridge Taps

| BT number | AWGN | 24 TCM-ISDN | |
| --- | --- | --- | --- |
| | | FEXT | NEXT |
| 0 | 43.85 | 32.85 | −14.95 |
| 1 | 36.66 | 31.59 | −22.14 |
| 2 | 32.62 | 29.90 | −26.17 |
| 3 | 29.86 | 28.21 | −28.93 |
| 4 | 27.76 | 26.67 | −31.03 |
| 5 | 26.07 | 25.30 | −32.72 |
| 6 | 24.65 | 24.09 | −34.14 |

TABLE 30

Tone Pilot 64 Bridge Taps

| number | AWGN | TCM-ISDN | |
| --- | --- | --- | --- |
| | | FEXT | NEXT |
| 0 | 36.28 | 34.31 | −16.39 |
| 1 | 30.37 | 29.78 | −22.30 |
| 2 | 26.74 | 26.47 | −25.93 |
| 3 | 24.16 | 24.01 | −28.51 |
| 4 | 22.17 | 22.07 | −30.50 |
| 5 | 20.55 | 20.48 | −32.13 |
| 6 | 19.18 | 19.13 | −33.50 |

To allow the optional use of the PILOT 32 tone and the TTR 24 tone as additional or alternate tones for extended reach respectively for pilot tone and TTR signal the following exemplary amendments and additions to the G.994.1 and G.992.1 standards can be implemented.

Changes in G.994.1:

In G.994.1, a code point can be added to signal to HTU-R/HTU-C to provide the capability of transmitting/receiving Pilot Tone on tone 32 and TTR tone on A24. The following Tables 31 and 31 illustrate the addition of the code point.

TABLE 31

Standard information field - G.992.1 Annex C SPar(2) coding

| Bits | | | | | | | | G.992.1 Annex C SPar(2)s |
|---|---|---|---|---|---|---|---|---|
| 8 | 7 | 6 | 5 | 4 | 3 | 2 | 1 | |
| x | x | x | x | x | x | x | 1 | Sub-channel information |
| x | x | x | x | x | x | 1 | x | Spectrum frequency upstream |
| x | x | x | x | x | 1 | x | x | Spectrum frequency downstream |
| x | x | x | x | 1 | x | x | x | C-PILOT |
| x | x | x | 1 | x | x | x | x | Reserved for allocation by the ITU-T |
| x | x | 1 | x | x | x | x | x | Reserved for allocation by the ITU-T |
| x | x | 0 | 0 | 0 | 0 | 0 | 0 | No parameters in this octet |

TABLE 32

Standard information field - G.992.1 Annex C C-PILOT NPar(3) coding

| Bits | | | | | | | | G.992.1 Annex C C-PILOT NPar(3)s |
|---|---|---|---|---|---|---|---|---|
| 8 | 7 | 6 | 5 | 4 | 3 | 2 | 1 | |
| x | x | x | x | x | X | x | 1 | $n_{C\text{-}PILOT1} = 32$ |
| x | x | x | x | x | X | 1 | x | $A_{24}$ |
| x | x | x | x | x | 1 | x | x | Reserved for allocation by the ITU-T |
| x | x | x | x | 1 | X | x | x | Reserved for allocation by the ITU-T |
| x | x | x | 1 | x | X | x | x | Reserved for allocation by the ITU-T |
| x | x | 1 | x | x | X | x | x | Reserved for allocation by the ITU-T |
| x | x | 0 | 0 | 0 | 0 | 0 | 0 | No parameters in this octet |

Changes in G.992.1:

The following bit definitions can be supplemented as follows:

In Annex C.7.2—Handshake—ATU-C (Supplements § 10.2):

C.7.2.1CL messages (supplements § 10.2.1) can be supplemented as illustrated in Table 33.

TABLE 33

ATU-C CL message NPar(3) bit definitions for Annex C

| NPar(3) bit | Definition |
|---|---|
| $n_{C\text{-}PILOT1} = 32$ | If set to ZERO, this bit may indicate that the ATU-C will transmit the default pilot tone 64 in training and data mode. If set to ONE, this bit may indicate that the ATU-C will transmit the optional pilot tone 32 instead of pilot tone 64. Note: to ensure backward compatibility the ATU-C will only set this bits to ONE if the corresponding Npar(3) bit in CLR is set to ONE. |
| A24 | If set to ZERO, this bit may indicate that the ATU-C will transmit the default TTR tone 48 in C-Pilot1A. If set to ONE, this bit may indicate that the ATU-C will transmit the optional TTR tone 24 instead of TTR tone 48 in C-Pilot1A. Note: to ensure backward compatibility the ATU_C will only set this bits to ONE if the corresponding Npar(3) bit in CLR is set to ONE. |

In Annex C.7.3—Handshake—ATU-R (Supplements § 10.3):

C.7.3.1CLR messages (supplements § 10.3.1) can be supplemented as illustrated by Table 34.

TABLE 34

ATU-R CLR message NPar(3) bit definitions for Annex C

| NPar(3) bit | Definition |
|---|---|
| $n_{C\text{-}PILOT1} = 32$ | If set to ZERO, this bit may indicate that the ATU-R is not capable of receiving pilot tone 32, besides pilot tone 64. If set to ONE, this bit may indicate that the ATU-R is capable of receiving pilot tone 32, besides pilot tone 64.<br>Note: to ensure backward compatibility the ATU_R may only assume that ATU-C will transmit on pilot tone 32, only if the corresponding Npar(3) bit in CL is set to ONE. |
| A24 | If set to ZERO, this bit may indicate that the ATU-R is not capable of receiving TTR tone A24, besides TTR tone A48 in C-pilot1A. If set to ONE, this bit may indicate that the ATU-R is capable of receiving TTR tone A24, besides TTR tone A48.<br>Note: to ensure backward compatibility the ATU_R may assume that ATU-C will transmit on TTR Tone A24, if the corresponding Npar(3) bit in CL is set to ONE. |

The present invention provides for the tones PILOT 32 and TTR 24 to be used as optional tones in the Annex C overlap mode for extended reach beyond, for example, 6.2 km as under this reach the current definition of these tones are sufficient for a robust startup. Based on these practical reaches and the SNR of tones 64 & 48 dependency versus distance as described in the above figures, practical SNR tones limitations both in the white noise case scenario and in the presence of 24 TCM-ISDN interferers can be determined.

To summarize, one embodiment of the present invention provided for a method in an asynchronous digital subscriber line (ADSL) system comprising a central office ADSL Terminating Unit (ATU-C) in bi-directional overlap spectrum discrete multitone (DMT) communication with a remote ADSL Terminating Unit (ATU-R). The method comprises the step of transmitting a first handshake tone at either a first DMT tone or a second DMT tone based at least in part on a distance between the ATU-C and ATU-R. In one embodiment, the first handshake tone is transmitted at the first DMT tone when the distance between the ATU-C and ATU-R is less than 6.2 kilometers and the first handshake tone is transmitted at the second DMT tone when the distance between the ATU-C and ATU-R is greater than or equal to 6.2 kilometers. In one embodiment, the first handshake tone is a Pilot tone, the first DMT tone is tone 64 and the second DMT tone is tone 32. In another embodiment, the first handshake tone is a TCM-ISDN Timing Reference (TTR) tone, the first DMT tone is tone 48 and the second DMT tone is tone 24. The ATU-C and the ATU-R preferably are in bidirectional communication via a TCM-ISDN network.

The method further may comprise the step of transmitting a second handshake tone at either a third DMT tone or a fourth DMT tone based at least in part on the distance between the ATU-C and ATU-R. The second handshake tone may be transmitted at the third DMT tone when the distance between the ATU-C and ATU-R may be less than 6.2 kilometers and the second handshake tone is transmitted at the fourth DMT tone when the distance between the ATU-C and ATU-R is greater than or equal to 6.2 kilometers. In one embodiment, the first handshake tone is a Pilot tone and the second handshake tone is a TCM-ISDN Timing Reference (TTR) tone, the first DMT tone is tone 64, the second DMT tone is tone 32, the third DMT tone is tone 48 and the fourth DMT tone is tone 24.

To further summarize, an asynchronous digital subscriber line (ADSL) system is provided in accordance with an additional embodiment of the present invention. The ADSL system comprises a central office ADSL Terminating Unit (ATU-C) and a remote ADSL Terminating Unit (ATU-R) in bi-directional overlap spectrum discrete multitone (DMT) communication with the ATU-C. The ATU-C is adapted to transmit a first handshake tone at either a first DMT tone or a second DMT tone based at least in part on a distance between the ATU-C and ATU-R and the ATU-R is adapted to receive the first handshake tone at either the first DMT tone or the second DMT tone. In one embodiment, the first handshake tone is transmitted at the first DMT tone when the distance between the ATU-C and ATU-R is less than 6.2 kilometers and the first handshake tone is transmitted at the second DMT tone when the distance between the ATU-C and ATU-R is greater than or equal to 6.2 kilometers. In one embodiment, the first handshake tone is a Pilot tone, the first DMT tone is tone 64 and the second DMT tone is tone 32. In another embodiment, the first handshake tone is a TCM-ISDN Timing Reference (TTR) tone, the first DMT tone is tone 48 and the second DMT tone is tone 24. The ATU-C and the ATU-R preferably are in bidirectional communication via a TCM-ISDN network.

The ATU-C further may be adapted to transmit a second handshake tone at either a third DMT tone or a fourth DMT tone based at least in part on the distance between the ATU-C and ATU-R. The second handshake tone may be transmitted at the third DMT tone when the distance between the ATU-C and ATU-R may be less than 6.2 kilometers and the second handshake tone is transmitted at the fourth DMT tone when the distance between the ATU-C and ATU-R is greater than or equal to 6.2 kilometers. In one embodiment, the first handshake tone is a Pilot tone and the second handshake tone is a TCM-ISDN Timing Reference (TTR) tone, the first DMT tone is tone 64, the second DMT tone is tone 32, the third DMT tone is tone 48 and the fourth DMT tone is tone 24.

Further, the ATU-C may be adapted to transmit the first handshake tone at the first DMT tone when the distance between the ATU-C and ATU-R is less than 6.2 kilometers and transmit the first handshake tone at the second DMT tone when the distance between the ATU-C and ATU-R is greater than or equal to 6.2 kilometers.

Detection and Determination of Symbol Rate of C-GALF1 in G.994.1 Handshake Procedure:

In accordance with yet another embodiment of the present invention, the symbol rate of the 4.3125 kHz signaling family described in section 6.1 of ITU recommendation G.994.1 (Handshake procedures for digital subscriber line (DSL) transceivers) is optionally lowered from 4312.5/8≡539.0625 to 4312.5/16≡269.53125 symbols per second. The HSTU-C (CO) selects one of the two rates and transmits at this rate beginning with C-GALF1. The HSTU-R then derives the selected rate by monitoring C-GALF1 and responds by sending R-FLAG1 at this rate. The purpose of lowering the symbol rate is to achieve greater robustness of handshake procedures especially in the presence of TCM-ISDN noise. In accordance with this embodiment, a new type of detector at the HSTU-R is described herein to detect reliably C-GALF1, based on transition counts. This new detector will then be essential in determining the symbol rate the HSTU-C has chosen for transmission of C-GALF1.

Detection of a C-GALF1 Based on a Transition Counts:

The modulation employed in the G.994.1 Recommendation is Differentially encoded binary Phase Shift Keying (DPSK), where a transmit bit of value 1 is transmitted as 180° phase shift, and a value of 0 is transmitted as 0° phase shift, applied simultaneously to all carriers of the carrier set.

For demodulation in the receiver, the time-domain signal is divided into sub-symbols of 231.88 μs (1/43125 Hz) duration, each of which is then the input of an FFT (Fast Fourier Transform). The FFT rate is thus 8 or 16 times the handshake symbol rate. Eight consecutive FFT output bins at carrier frequencies C(k) are then summed and multiplied with the sum of the eight previous sub-symbols:

$$d(n) = \sum_{k=n}^{n-7} C(k) \cdot \sum_{k=n-8}^{n-15} C(k) \qquad \text{EQ. 18}$$

where $$A \cdot B = \text{Re}\{A\} \cdot \text{Re}\{B\} + \text{Im}\{A\} \cdot \text{Im}\{B\}. \qquad \text{EQ. 19}$$

The sign of d(n) will be negative at each phase change of the carrier signal. C-GALF is an octet of value $81_{16}$ and contains two phase changes. Since the symbol alignment is unknown at this point, the receiver may simply count the number of sub-symbols with negative d(n) within a given time window in order to determine the presence of C-GALF and to discriminate it from noise or any other received signal. Alternatively, in a "Dual-Rate" C-GALF1, there can be either 5 or 3 phase changes within 20 sub-symbols following the first phase transition, depending on the symbol rate from the HSTU-C. The receiver may switch into the "C-GALF1 detected" state if it has detected a minimum of 3 phase changes within 20 sub-symbols.

Detection of a "Dual-Rate" C-GALF1 & Determination of the Symbol Rate:

In detection of a "Dual-Rate" C-GALF1, the HSTU-R detector of the present invention counts the negative pulses of d(n) over a determined time span in order to determine the symbol rate. Section 11.1.1 of the G.994.1 Recommendation specifies that the HSTU-R must respond within 500 ms ($\tau_1$<500 ms) after the beginning of C-GALF1. After having detected the presence of C-GALF1 as explained above in section 1, the HSTU-R counts the transitions which occur within e.g., 2048 sub-symbols (≈475 ms) and decides upon the counter value which symbol rate the HSTU-C has selected. The counter will have a value of 32 if the symbol rate selected is 269.53125, and 64 if the symbol rate is 539.0625. Any period shorter than 475 ms may also be used.

To summarize:

In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection is provided in accordance with an additional embodiment. The method comprises transmitting handshake signaling from the HSTU-C to the HSTU-R via a first subset of carrier sets at a first symbol rate and transmitting handshake signaling from the HSTU-C to the HSTU-R via a second subset of carrier sets at a second symbol rate, the second symbol rate being less than the first symbol rate. The first symbol rate preferably is 539.0625 symbols per second and the second symbol rate preferably is 269.53125 symbols per second. In one embodiment, the handshake signaling is transmitted via the second subset of carrier sets at the second symbol rate after a handshake attempt between the HSTU-C and the HSTU-R performed at the first symbol rate for both the first and second carrier sets has failed. The second subset of carrier sets includes carrier sets with noise greater than noise present in the first subset of carrier sets, where the noise includes near end cross talk. The second subset of carrier sets preferably includes carrier set C43 and the second subset of carrier sets preferably includes carrier set A43. The HSTU-C and HSTU-R preferably are in bidirectional communication via a TCM-ISDN network.

The method further may comprise the step of detecting, at the HSTU-R, a number of phase changes in a given time window of the handshake signaling transmitted by the HSTU-C via the second subset of carrier sets to identify the second symbol rate. The method also may comprise the step of receiving, at the HSTU-C, at least one handshake symbol from the HSTU-R at the identified handshake symbol transmission rate. The step of detecting the number of phase changes in a given time window of the handshake signaling includes separating the handshake signaling transmitted by the HSTU-C into a first set of sub-symbols and a second set of sub-symbols for a given time window, the second set of sub-symbols following the first set of sub-symbols, performing a fast fourier transform on each of the first set of sub-symbols, performing a fast fourier transform on each of the second set of sub-symbols, summing a result of the fast fourier transforms performed on the first set of sub-symbols, summing a result of the fast fourier transforms performed on the second set of sub-symbols, and multiplying the summed result from the first set of sub-symbols with the summed result of the second set of sub-symbols to determine the number of phase changes in the handshake signaling within the time window. The number of phase changes detected within the time window may be proportional to the identified second symbol rate or the second symbol rate may be identified by the HSTU-R when the number of phase changes is at or above a minimum number of phase changes associated with second symbol rate.

In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection robustness is provided. The method comprises transmitting handshake signaling via a first subset of carrier sets of a DMT transmission bandwidth between the HSTU-C and HSTU-R at a first symbol rate, determining a presence of near end cross talk (NEXT) in a second subset of carrier sets of the DMT transmission bandwidth, and transmitting the at least one handshake symbol via the second subset of carrier sets at a second symbol rate so that at least one sub-symbol of the at least one handshake symbol transmitted over the second subset of carrier sets is substantially unaffected by near end cross talk. The first symbol rate preferably is 539.0625 symbols per second and the second symbol rate preferably is 269.53125 symbols per second. The second subset of carrier sets preferably includes carrier sets C43 and/or A43.

In accordance with an additional embodiment of the present invention, an asynchronous digital subscriber line (ADSL) system is provided. The ADSL system comprises a central office High Speed ADSL Terminating Unit (HSTU-C) and a remote High Speed ADSL Terminating Unit (HSTU-R) in bi-directional discrete multitone (DMT) communication with the HSTU-C. The HSTU-C is adapted to transmit handshake signaling to the HSTU-R via a first subset of carrier sets at a first symbol rate and transmit handshake signaling to the HSTU-R via a second subset of carrier sets at a second symbol rate, the second rate being less than the first rate. The first symbol rate preferably is 539.0625 symbols per second and the second symbol rate preferably is 269.53125 symbols per second. The HSTU-C may be further adapted to transmit the handshake signaling via the second subset of carrier sets at the second rate after a handshake attempt between the HSTU-C and the HSTU-R performed at the first rate for both the first and second carrier sets has failed. The second subset of carrier sets preferably includes carrier set C43 and/or A43.

In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection is provided in accordance with yet another embodiment of the present invention. The method comprises detecting, at the HSTU-R, a number of phase changes in a given time window of a handshake signaling transmitted by the HSTU-C to identify a symbol rate of the handshake signaling. The method further may comprise transmitting an acknowledgement symbol from the HSTU-R to the HSTU-C at the identified symbol rate. The method additionally may comprise receiving, at the HSTU-C, at least one handshake symbol at the HSTU-R at the identified symbol rate.

The step of detecting the number of phase changes in a given time window of the handshake signaling transmitted by the HSTU-C to identify a symbol rate of the handshake signaling preferably includes separating the handshake signaling transmitted by the HSTU-C into a first set of sub-symbols and a second set of sub-symbols for a given time window, the second set of sub-symbols following the first set of sub-symbols, performing a fast fourier transform on each of the first set of sub-symbols, performing a fast fourier transform on each of the second set of sub-symbols, summing a result of the fast fourier transforms performed on the first set of sub-symbols, summing a result of the fast fourier transforms performed on the second set of sub-symbols, and multiplying the summed result from the first set of sub-symbols with the summed result of the second set of sub-symbols to determine the number of phase changes of the handshake signaling within the time window. The number of phase changes detected within the time window may be proportional to the identified symbol rate or the identified symbol rate may be identified by the HSTU-R when the number of phase changes is at or above a minimum number of phase changes associated with the identified symbol rate.

While the foregoing description includes many details and specificities, it is to be understood that these have been included for purposes of explanation only, and are not to be interpreted as limitations of the present invention. Many modifications to the embodiments described above can be made without departing from the spirit and scope of the present invention.

What is claimed is:

1. In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection comprising:

transmitting handshake signaling from the HSTU-C to the HSTU-R via a first subset of carrier sets at a first symbol rate; and transmitting handshake signaling from the HSTU-C to the HSTU-R via a second subset of carrier sets at a second symbol rate, the second symbol rate being less than the first symbol rate, wherein the handshake signaling is transmitted via the second subset of carrier sets at the second symbol rate after a handshake attempt between the HSTU-C and the HSTU-R performed at the first symbol rate for both the first and second subsets of carrier sets has failed.

2. In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection comprising:

transmitting handshake signaling from the HSTU-C to the HSTU-R via a first subset of carrier sets at a first symbol rate;

transmitting handshake signaling from the HSTU-C to the HSTU-R via a second subset of carrier sets at a second symbol rate, the second symbol rate being less than the first symbol rate; and detecting, at the HSTU-R, a number of phase changes in a given time window of the handshake signaling transmitted by the HSTU-C via the second subset of carrier sets to identify the second symbol rate.

3. The method of claim 2, further comprising the step of;

receiving, at the HSTU-C, at least one handshake symbol from the HSTU-R at an identified handshake symbol transmission rate.

4. The method as in claim 2, wherein the step of detecting the number of phase changes in the given time window of the handshake signaling includes:

separating the handshake signaling transmitted by the HSTU-C into a first set of sub-symbols and a second set of sub-symbols for a given time window, the second set of sub-symbols following the first set of sub-symbols;

performing a fast fourier transform on each of the first set of sub-symbols;

performing a fast fourier transform on each of the second set of sub-symbols;

summing a result of the fast fourier transforms performed on the first set of sub-symbols;

summing a result of the fast fourier transforms performed on the second set of sub-symbols;

multiplying the summed result from the first set of sub-symbols with the summed result of the second set of sub-symbols to determine the number of phase changes in the handshake signaling within the time window.

5. The method of claim 4, wherein the number of phase changes detected within the time window is proportional to the identified second symbol rate.

6. The method of claim 4, wherein the second symbol rate is identified by the HSTU-R when the number of phase changes is at or above a minimum number of phase changes associated with second symbol rate.

7. In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection robustness comprising:
   transmitting handshake signaling via a first subset of carrier sets of a DMT transmission bandwidth between the HSTU-C and the HSTU-R at a first symbol rate;
   determining a presence of near end cross talk (NEXT) in a second subset of carrier sets of the DMT transmission bandwidth; and
   transmitting the at least one handshake symbol via the second subset of carrier sets at a second symbol rate so that at least one sub-symbol of the at least one handshake symbol transmitted over the second subset of carrier sets is substantially unaffected by near end cross talk.

8. The method as in claim 7, wherein the first symbol rate is 539.0625 symbols per second.

9. The method as in claim 8, wherein the second symbol rate is 269.53125 symbols per second.

10. The method as in claim 7, wherein the second symbol rate is 269.53125 symbols per second.

11. The method as in claim 7, wherein the second subset of carrier sets includes carrier set C43.

12. The method as in claim 7, wherein the second subset of carrier sets includes carrier set A43.

13. An asynchronous digital subscriber line (ADSL) system comprising:
   a central office High Speed ADSL Terminating Unit (HSTU-C); and
   a remote High Speed ADSL Terminating Unit (HSTU-R) in bi-directional discrete multitone (DMT) communication with the HSTU-C;
   wherein the HSTU-C is adapted to:
      transmit handshake signaling to the HSTU-R via a first subset of carrier sets at a first symbol rate; and
      transmit handshake signaling to the HSTU-R via a second subset of carrier sets at a second symbol rate, the second rate being less than the first rate; and
   transmit the handshake signaling via a second subset of carrier sets at the second symbol rate after a handshake attempt between the HSTU-C and the HSTU-R performed at the first symbol rate for both the first and second subsets of carrier sets has failed.

14. In an asynchronous digital subscriber line (ADSL) system comprising a central office High Speed ADSL Terminating Unit (HSTU-C) in bi-directional discrete multitone (DMT) communication with a remote High Speed ADSL Terminating Unit (HSTU-R), a method for improving handshake detection comprising:
   detecting, at the HSTU-R, a number of phase changes in a given time window of a handshake signaling transmitted by the HSTU-C to identify a symbol rate of the handshake signaling.

15. The method of claim 14, further comprising the step of:
   transmitting an acknowledgement symbol from the HSTU-R to the HSTU-C at the identified symbol rate.

16. The method of claim 14, further comprising the step of:
   receiving, at the HSTU-C, at least one handshake symbol at the HSTU-R at the identified symbol rate.

17. The method as in claim 14, wherein the step of detecting the number of phase changes in a given time window of the handshake signaling transmitted by the, HSTU-C to identify a symbol rate of the handshake signaling includes:
   separating the handshake signaling transmitted by the HSTU-C into a first set of sub-symbols and a second set of sub-symbols for a given time window, the second set of sub-symbols following the first set of sub-symbols;
   performing a fast fourier transform on each of the first set of sub-symbols;
   performing a fast fourier transform on each of the second set of sub-symbols;
   summing a result of the fast fourier transforms performed on the first set of sub-symbols;
   summing a result of the fast fourier transforms performed on the second set of sub-symbols;
   multiplying the summed result from the first set of sub-symbols with the summed result of the second set of sub-symbols to determine the number of phase changes of the handshake signaling within the time window.

18. The method of claim 14, wherein the number of phase changes detected within the time window is proportional to the identified symbol rate.

19. The method of claim 14, wherein the identified symbol rate is identified by the HSTU-R when the number of phase changes is at or above a minimum number of phase changes associated with the identified symbol rate.

* * * * *